(12) United States Patent
Ofalt et al.

(10) Patent No.: US 7,756,418 B2
(45) Date of Patent: Jul. 13, 2010

(54) PASSIVE OPTICAL NETWORK LOSS TEST APPARATUS AND METHOD OF USE THEREOF

(75) Inventors: Martin Matthew Ofalt, Holland Patent, NY (US); Howard D. Sins, New Hartford, NY (US); Sergey Panasyuk, Utica, NY (US); Lars D. Pedersen, Baldwinsville, NY (US)

(73) Assignee: Anritsu Instruments Company, Utica, NY (US)

( * ) Notice: Subject to any disclaimer, the term of this patent is extended or adjusted under 35 U.S.C. 154(b) by 1049 days.

(21) Appl. No.: 11/370,078

(22) Filed: Mar. 7, 2006

(65) Prior Publication Data

US 2006/0198634 A1  Sep. 7, 2006

Related U.S. Application Data

(60) Provisional application No. 60/659,837, filed on Mar. 7, 2005.

(51) Int. Cl.
H04B 10/08 (2006.01)

(52) U.S. Cl. ............... 398/25; 398/16; 398/28; 398/30; 356/73.1

(58) Field of Classification Search ........ 398/9, 398/25, 16, 28, 26, 27, 31, 135, 151, 30, 398/32, 33, 34, 38, 140, 141; 356/73.1
See application file for complete search history.

(56) References Cited

U.S. PATENT DOCUMENTS

| | | | |
|---|---|---|---|
| 4,234,253 A | 11/1980 | Higginbotham et al. | |
| 4,673,291 A | 6/1987 | Heckmann | |
| 4,726,676 A | 2/1988 | Maslaney et al. | |
| 4,737,026 A | 4/1988 | Dalgoutte et al. | |
| 4,737,027 A | 4/1988 | Maeda | |
| 4,799,790 A | 1/1989 | Tsukamoto et al. | |
| 4,901,003 A | 2/1990 | Clegg | |
| 5,305,078 A | 4/1994 | Lamonde | |
| 5,455,672 A | 10/1995 | Lamonde et al. | |
| 5,535,038 A | 7/1996 | Hinch | |
| 5,592,284 A * | 1/1997 | Bedard | 356/73.1 |
| 5,696,707 A | 12/1997 | Hentschel et al. | |
| 6,188,509 B1 | 2/2001 | Lee et al. | |
| 6,600,594 B1 | 7/2003 | Ko et al. | |
| 7,187,861 B2 | 3/2007 | Ruchet | |
| 7,434,116 B2 * | 10/2008 | Franke et al. | 714/704 |
| 2004/0037556 A1 | 2/2004 | Matz et al. | |
| 2004/0146306 A1 | 7/2004 | Muzicant et al. | |
| 2004/0208507 A1 | 10/2004 | Saunders et al. | |

FOREIGN PATENT DOCUMENTS

WO  WO-9967609  12/1999
WO  WO-2004019074 A2  3/2004

OTHER PUBLICATIONS

International Search Report (6 pgs.) for PCT/US2006/007922, filed Mar. 7, 2006, Patent Treaty Cooperation and Written Opinion (10 pgs.) for PCT/US2006/007922, filed Mar. 7, 2006.

* cited by examiner

*Primary Examiner*—Hanh Phan
(74) *Attorney, Agent, or Firm*—Marjama Muldoon Blasiak & Sullivan, LLP

(57) ABSTRACT

An apparatus and methods for testing a passive optical network with regard to fiber connectivity and attenuation losses, and with regard to the proper operation of packet-based communication protocols thereon.

19 Claims, 26 Drawing Sheets

Table. I

| PONs | BPON (Broadband PON) | EPON (Ethernet PON) | GPON (Gigabite-capable PON) | Active FTTx (Ethernet over point-to-point fiber) |
|---|---|---|---|---|
| Standard | ITU-T G.983 | IEEE803.2ah | ITU-T G.984 | IEEE803.2ah |
| Committee / website | FSAN / www.isnweb.org | EFM / www.ieee802.org/3/efm/ | FSN / www.fsanweb.org | EFM / www.ieee802.org/3/efm/ |
| Data Packet Cell Size | 53 bytes (48 payload and 5 overload) | 1,518 bytes | variable size, from 53 bytes up to 1,518 | 1,518 bytes |
| Downstream Linerate | 155 Mbit/s 622 Mbit/s or 1.25 Gbit/s | 1.25 Gbit/s | Configurable from 1.25 Gbit/s to 2.5 Gbit/s | 1.25 Gbit/s |
| Upstream Linerate | 155 Mbit/s 622 Mbit/s | 1.25 Gbit/s | Configurable from 155 Mbit/s, 6.22 Mbit/s, 1.25 Gbit/s or 2.5 Gbit/s | 1.25 Gbit/s |
| Line Coding | NRZ | 8b/10b (FEC supported) | NRZ (FEC supported) | 8b/10b (FEC supported) |
| Downstream Wavelength | 1490±10 nm | 1490±10 nm | 1490±10 nm | 1480 nm to 1580 nm |
| Upstream Wavelength | 1260 nm to 1360 nm | 1260 nm to 1360 nm | 1260 nm to 1360 nm | 1260 nm to 1360 nm |
| Traffic Modes | ATM | Ethernet | ATM, Ethernet, TDM | Ethernet |
| Voice | VoATM | VoIP or TDM | Native TDM | VoIP or TDM |
| Video | 1550 nm overlay | 1550 nm overlay | Either as RF or over IP | 1550 nm overlay |
| ODN Classes (Dynamic Range) | A(5-20dB), B(10-25dB), and C(15-30dB) | 1000Base-PX10 (up to 23dB), -PX20 (up to 26dB) | A(5-20dB), B(10-25dB), and C(15-30dB) | 1000Base BX10 (up to 11dB) |
| Minimum Source Power (upstream) | -5.5dBm (155 Mbits/sec: Class B*) | -1dBm (PX10) | -2dBm (1.25 Gbits/sec: Class B) | -9dBm (BX10) |
| (downstream) | -31.5dBm (622 Mbits/sec: Class B*) | -3dBm (PX10) | +1dBm (1.25 Gbits/sec: Class B) | -9dBm (BX10) |
| Worst Case Receiver (upstream) | -31.5dBm (155 Mbits/sec: Class B*) | -24dBm (PX10) | -28dBm (1.25 Gbits/sec: Class B) | -20dBm (BX10) |
| Sensitivity (downstream) | -26.5dBm (622 Mbits/sec: Class B*) | -24dBm (PX10) | -25dBm (1.25 Gbits/sec: Class B) | -20dBm (BX10) |
| Fiber Type | Single ITU-T G.652 | Single or dual ITU-T G.652 | Single or dual ITU-T G.652 | Single or dual ITU-T G.652 |
| Max ONT-OLT distance | 20km | 10km or 20km | 20km | 10km (from router to ONT) |
| PON Splits | 32 to 64 | 16 to 32 | 64 to 128 | No Split |

*983.3 recommendation allowing for Enhanced Band (i.e. Video)

Table II

Transmission Hierarchies

| Single | BIT RATE (MBPS) | Voice Channel | Medulim |
|---|---|---|---|
| DS0 | 0.064 | 1 | Twisted Pair |
| DS1 | 1.544 | 24 | Twisted Pair |
| E1 | 2.048 | 30 | Twisted Pair |
| DS2 | 6.312 | 96 | Twisted Pair |
| E2 | 8.448 | 120 | Coaxial Cable |
| E3 | 34.368 | 480 | Coaxial Cable |
| DS3 | 44.736 | 672 | Coaxial Cable |
| (STM-1) STS-3 | 155.520 | 2016 | Coaxial Cable |
| E4 | 139.264 | 2176 | Fiber Optic Cable |
| STS-1/OC-1 | 51.840 | 627 | Fiber Optic Cable |
| (STM-1) STS-3/OC-3 | 155.520 | 2016 | Fiber Optic Cable |
| (STM-4) STS-12/OC-12 | 622.080 | 8064 | Fiber Optic Cable |
| (STM-16) STS-48/OC-48 | 2488.320 | 32,256 | Fiber Optic Cable |
| (STM-64) STS-192/OC-192 | 9953.280 | 129,024 | Fiber Optic Cable |

Table IIIA

| Opitical Budget Calculation |
|---|
| Launch Power |
| • Fiber Loss |
| • Splice Loss |
| • Splitter Loss |
| • Connector Loss |
| • Dispersion Penalty[1] |
| • Fiber Nonlinearity Penalty[1] |
| • Component Aging Penalty |
| • Receiver Sensitivity |
| System Margin |

[1]Typically FTTx networks do not need to take these into account

Table IIIB

| Sample Optical Budget Calculation | | |
|---|---|---|
| Factor | 1310 nm | 1550 nm |
| Launch power Ⓐ | -2 dBm | 0 dBm |
| Fiber Loss (6.5km feeder) Ⓑ-Ⓐ | 2.145 dB | 1.235 dB |
| Splice for splitter Ⓒ-Ⓑ | 0.1 dB | 0.1 dB |
| 1:32 Splitter Ⓔ-Ⓓ | 16.5 dB | 16.5 dB |
| Connector for distribution fiber Ⓖ-Ⓕ | 0.4 dB | 0.4 dB |
| Fiber Loss (1km distribution) Ⓗ-Ⓖ | 0.33 dB | 0.19 dB |
| Transceiver Aging Penalty | 0.2 dB | 0.2 dB |
| Receiver Sensitivity | -29 dBm | -29 dBm |
| System Margin | +7.325 dB | +10.375 dB |

Table IIIC

| Troubleshooting a live PON system | | | |
|---|---|---|---|
| All customers are out | OTDR test from CO | | |
| One or more customers are out | Verify 1550/1490 power at customer premise | | |
| | Power Low | Power OK | No Power |
| | Verify Splitter w/Power Meter | Verify ONT | Verify distribution cable w/OTDR |

Table IVA

| Gain Conversion | |
|---|---|
| Gain | ~ Gain (dB) |
| x 2 | 3.0 dB |
| x 3 | 4.8 dB |
| x 4 | 6.0 dB |
| x 5 | 7.0 dB |
| x 6 | 7.8 dB |
| x 7 | 8.5 dB |
| x 8 | 9.0 dB |
| x 9 | 9.5 dB |
| x 10 | 10 dB |

Table IVB

| Number of Ports vs. Loss | |
|---|---|
| Number of Ports | Ideal Splitter (Excluding excess loss) |
| 2 | 3 dB |
| 4 | 6 dB |
| 8 | 9 dB |
| 16 | 12 dB |
| 32 | 15 dB |
| 64 | 18 dB |

Table IVC

| Loss Conversion | |
|---|---|
| Loss (%) | ~ Loss (dB) |
| 10% | -0.5 dB |
| 20% | -1 dB |
| 30% | -1.5 dB |
| 40% | -2.2 dB |
| 50% | -3.0 dB |
| 60% | -4.0 dB |
| 70% | -5.2 dB |
| 80% | -7.0 dB |
| 90% | -10 dB |

Table IVD

| Typical Zero Water Peak Fiber Attenuation | |
|---|---|
| Wavelength | Typical Attenuation |
| 850 nm | 1.81 dB/km |
| 1310 nm | 0.33 dB/km |
| 1383 nm | 0.28 dB/km |
| 1490 nm | 0.21 dB/km |
| 1550 nm | 0.19 dB/km |
| 1625 nm | 0.21 dB/km |

Table IVE

| Powers | |
|---|---|
| 20 dBm | 100 mW |
| 13 dBm | 20 mW |
| 10 dBm | 10 mW |
| 0 dBm | 1 mW |
| -3 dBm | 500 μW |
| -6 dBm | 250 μW |
| -10 dBm | 100 μW |
| -13 dBm | 50 μW |
| -20 dBm | 10 μW |
| -23 dBm | 5 μW |
| -30 dBm | 1 μW |
| $P(dBm) = 10 \, Log\,[P(mW)]$ | |
| $P(mW) = 10^{\left[\frac{P(dBm)}{10}\right]}$ | |

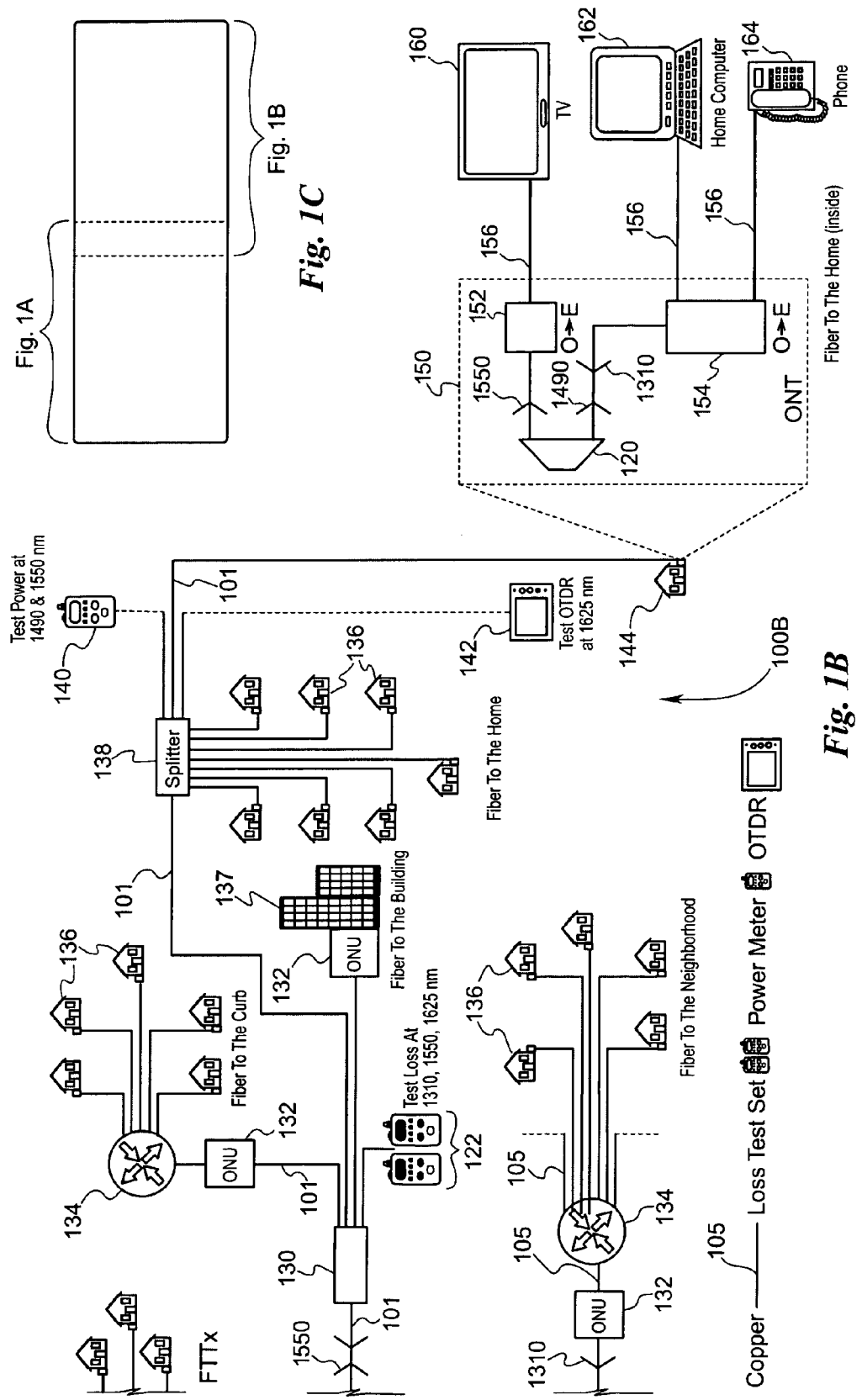

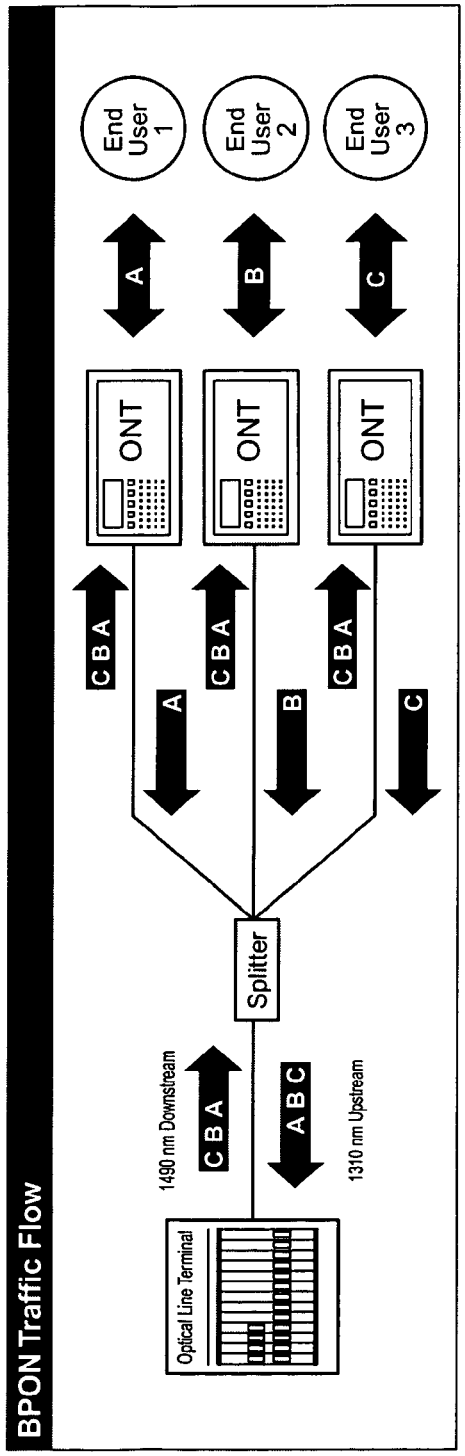
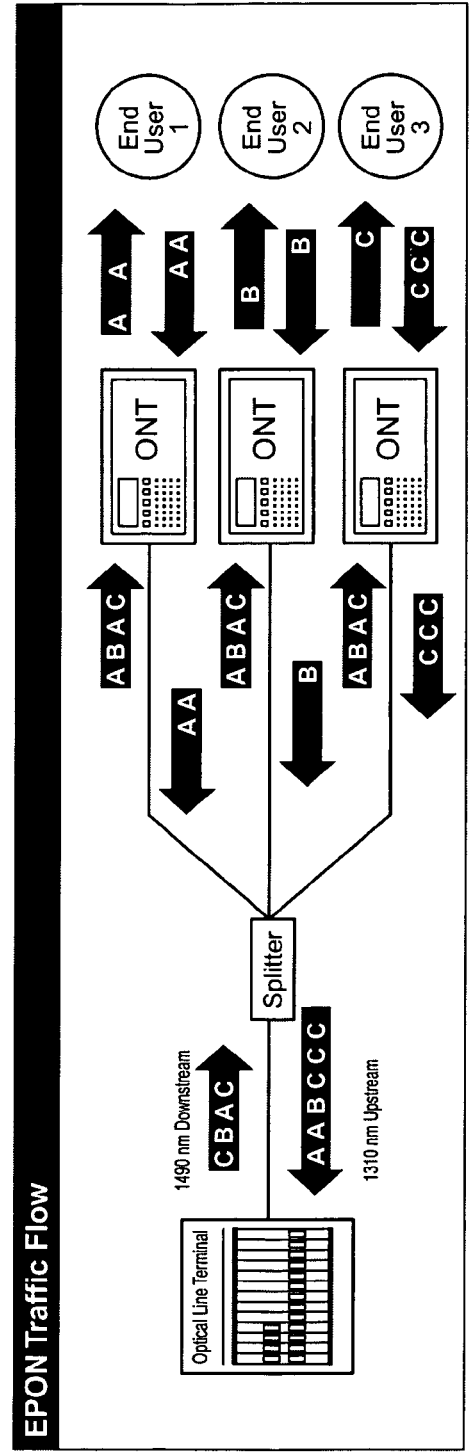
Fig. 2
Fig. 3

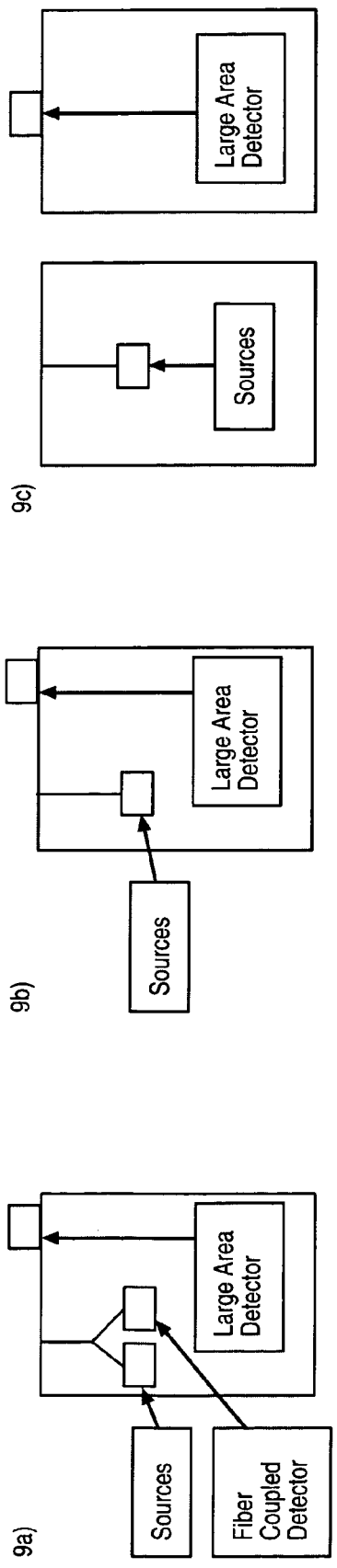
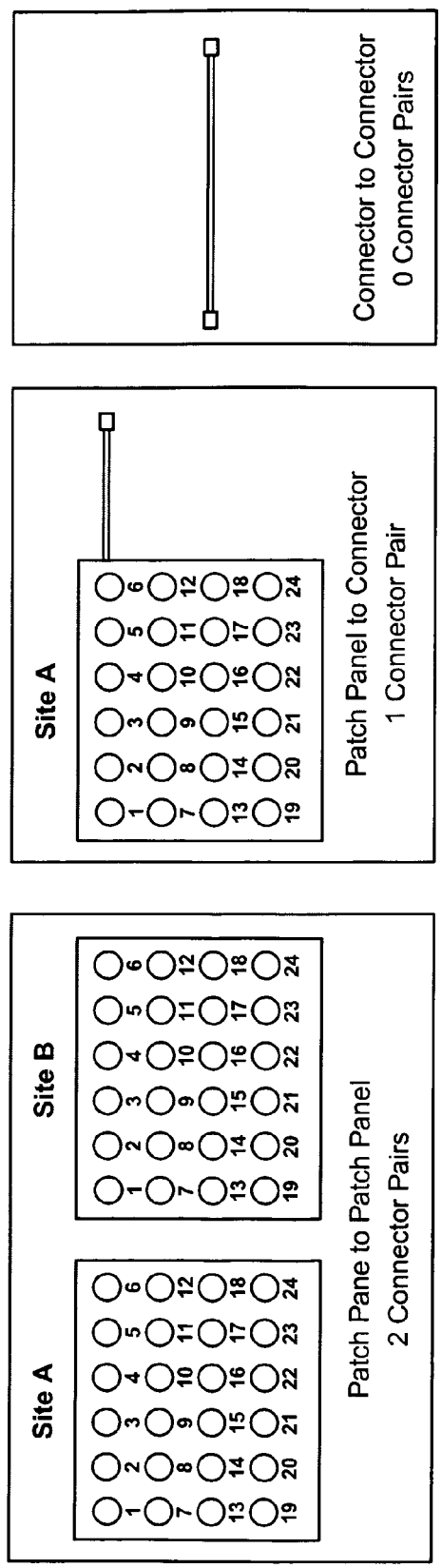
Fig. 9A  Fig. 9B  Fig. 9C  Fig. 9D

Fig. 12

| PREAMBLE | DESTINATION ADDRESS | SOURCE ADDRESS | CONTROL FIELD | DATA | PAD | FRAME CHECK SEQUENCE | END FRAME DELIMITER |
|---|---|---|---|---|---|---|---|

Fig. 13

| PREAMBLE (7-BYTES) | START FRAME DELIMITER (1-BYTE) | DEST. MAC ADDRESS (6-BYTES) | SOURCE MAC ADDRESS (6-BYTES) | LENGTH /TYPE (2-BYTES) | MAC CLIENT DATA (0-n BYTES) | PAD (0-p BYTES) | FRAME CHECK SEQUENCE (4-BYTES) |
|---|---|---|---|---|---|---|---|

Fig. 14

| PREAMBLE (7-BYTES) | START FRAME DELIMITER (1-BYTE) | DEST. MAC ADDRESS (6-BYTES) | SOURCE MAC ADDRESS (6-BYTES) | LENGTH/TYP = 802.1Q TAG TYPE (2-BYTES) | TAG CONTROL INFORMATION (2-BYTES) | LENGTH /TYPE (2-BYTES) | MAC CLIENT DATA (0-n BYTES) | PAD (0-p BYTES) | FRAME CHECK SEQUENCE (4-BYTES) |
|---|---|---|---|---|---|---|---|---|---|

| 0 | 4 | 8 | 16 | 19 | 31 |
|---|---|---|---|---|---|
| VERSION | IHL | TYPE OF SERVICE | colspan="3" | TOTAL LENGTH |

| 0 | | 4 | | 8 | | 16 | | 19 | | 31 |
|---|---|---|---|---|---|---|---|---|---|---|

| VERSION | IHL | TYPE OF SERVICE | TOTAL LENGTH ||
|---|---|---|---|---|
| IDENTIFICATION ||| FLAGS | FRAGMENT OFFSET |
| TIME TO LIVE || PROTOCOL | HEADER CHECKSUM ||
| SOURCE IP ADDRESS |||||
| DESTINATION IP ADDRESS |||||
| OPTIONS |||| PADDING |

UNIT A
In this example, nominal output Power of unit A is assumed to be -8.0dB and J1 loss is 0.1dB. Reference is stored as -8.1dB.

UNIT B
Nominal output Power is -9.0dB and J1 loss is .2dB. Reference is stored as -9.2dB.

UNIT A
J2 is connected and Loss = -0.5dB. This is saved in Unit A memory as J2 Loss. Reference is reestablished as -8.5dB and is saved in Unit A memory.

UNIT B
J2 is connected and Loss = -1.2dB. This is saved in Unit B memory as J2 Loss. Reference is reestablished as -10.2dB and is saved in Unit B memory.

PASSIVE OPTICAL NETWORK LOSS TEST APPARATUS AND METHOD OF USE THEREOF

CROSS-REFERENCE TO RELATED APPLICATIONS

This application claims priority to and the benefit of co-pending U.S. provisional patent application Ser. No. 60/659,837, filed Mar. 7, 2005, which application is incorporated herein by reference in its entirety. This application is related to copending U.S. utility patent application Ser. No. 10/847,790, entitled "Improved Accuracy Automated Optical Time Domain Reflectometry Optical Return Loss Measurements Using A "Smart" Test Fiber Module," filed May 18, 2004, which application is incorporated herein by reference in its entirety, and which application is assigned to the assignee of the present application.

FIELD OF THE INVENTION

The invention relates to passive optical network test apparatus in general and particularly to a passive optical network test apparatus that allows testing while the network remains operational.

BACKGROUND OF THE INVENTION

Passive Optical Networks ("PON") are used for communication purposes because they offer extremely large bandwidth in single fibers. Optical Distribution Networks ("ODN") make it possible to send communications at rates of billions of bits per second to locations far removed from the sender, at a relatively low price, with great accuracy, and with high security and with little possibility of electromagnetic interference. In particular, as we become more dependent of communication systems that employ optical fiber in the form of fiber optic cables that are subject to accidents, and that can become degraded in their performance, it is important to be able to test both the communication media and systems to assure that faults are rapidly detected, located efficiently, and quickly fixed.

A wide variety of test apparatus for testing optical fibers have been developed and used heretofore. However, such apparatus are often expensive, complicated to use, and require careful reference measurement to be carried out. In addition, there are instruments available to test the various features of communications protocols. However, when systems that are expected to communicate fail, there are multiple possible locations and different types of faults that can be considered as causes of the failure. For example, a communication can be interrupted because either the sending or the receiving apparatus has failed, because the transmission medium has failed, or because there is a flaw relating to the communication protocols that are being employed. In fact, there can be multiple faults at one time. Testing all of the possibilities to identify and correct a communication system failure can easily become a difficult, time-consuming, and costly matter, given the divergent kinds of tests and test apparatus that may be required.

There is a need for apparatus and methods to provide an inexpensive, expeditious, and simple suite of tests to identify the possible faults in modern communication systems.

SUMMARY OF THE INVENTION

In one aspect, the invention relates to a multi-frequency tap apparatus. The multifrequency tap apparatus comprises a tap that extracts an optical test signal from a communication signal traveling in a first direction and having a wavelength of substantially 1310 nm; and at least one of a tap that extracts an optical test signal from a communication signal traveling in a second direction and having a wavelength of substantially 1490 nm and a tap that extracts an optical test signal from a communication signal traveling in the second direction and having a wavelength of substantially 1550 nm, wherein each of the optical test signals provided by the multi-frequency tap apparatus represents a portion of the respective communication signal of sufficiently small magnitude to avoid impeding a communication.

In one embodiment, the portion of the respective communication signal of sufficiently small magnitude to avoid impeding a communication represents not more than ten percent of the communication signal. In one embodiment, multi-frequency tap apparatus can measure at least two of the optical test signals simultaneously. In one embodiment, the multi-frequency tap apparatus further comprises a wavelength independent power measurement device for measuring the optical test signals. In one embodiment, the communication signal traveling in a first direction and having a wavelength of substantially 1310 nm is present as a response to at least one of the communication signals traveling in the second direction. In one embodiment, the multi-frequency tap apparatus further comprises first and second connectors, the connectors adapted to permit coupling of the multi-frequency tap apparatus in an in-line configuration with respect to an optical communication system. In one embodiment, the multi-frequency tap apparatus further comprises a detector for detecting at least one of the optical test signals and for providing an electrical signal responsive to the test signal; a variable integration transimpedance amplifier (VI-TIA) that receives the electrical signal and amplifies the electrical signal to provide a measurement signal; and a measurement device that receives and measures the measurement signal. In one embodiment, the measurement device comprising a peak power level detector. In one embodiment, the measurement device comprising a minimum burst width detector.

In one embodiment, the multi-frequency tap apparatus further comprises a first detector for receiving and detecting the optical test signal having a wavelength of substantially 1310 nm; a signal splitter for separating the optical test signal having a wavelength of substantially 1490 nm from the optical test signal having a wavelength of substantially 1550 nm; a second detector for receiving and detecting the optical test signal having a wavelength of substantially 1490 nm; a third detector for receiving and detecting the optical test signal having a wavelength of substantially 1550 nm; at least one laser for providing an output signal of known wavelength; and a light source port for conveying the at least one output signal of known wavelength to another device. The test apparatus is configured as a power meter to measure power losses in a communication system employing at least two frequencies.

In one embodiment, the multi-frequency tap apparatus further comprises a first detector for receiving and detecting the optical test signal having a wavelength of substantially 1310 nm; a signal splitter for separating the optical test signal having a wavelength of substantially 1490 nm from the optical test signal having a wavelength of substantially 1550 nm; a second detector for receiving and detecting the optical test signal having a wavelength of substantially 1490 nm; a third detector for receiving and detecting the optical test signal having a wavelength of substantially 1550 nm; at least one laser for providing an output signal of known wavelength; a large area detector for detecting optical radiation; and a light source port for conveying the at least one output signal of known wavelength to another device. The test apparatus is configured as a power meter to measure losses in a communication system employing at least two frequencies.

In one embodiment, the multi-frequency tap apparatus further comprises a network interface controller, the network interface controller configured to transmit a packet-based message in accordance with a level of a communication system that complies with a packet-based communication standard. The packet based message is useful for testing a communication system operating according to a packet-based communication protocol. In one embodiment, the multi-frequency tap apparatus further comprises a network interface controller, the network interface controller configured to receive a packet-based message in accordance with a level of a communication system that complies with a packet-based communication standard.

In one embodiment, the multi-frequency tap apparatus further comprises a network interface controller, the network interface controller configured to receive a packet-based message in accordance with a level of a communication system that complies with a packet-based communication standard and to transmit a packet-based message in accordance with a level of a communication system that complies with a packet-based communication standard. In one embodiment, the multi-frequency tap apparatus further comprises hardware and software configured to perform a test of Ethernet transport.

In one embodiment, a test of Ethernet transport is any of: auto-negotiation to determine speed and duplexity (HDX, FDX) and other parameters of the adjacent network device; determining link availability, in either or both the Upstream and/or Downstream directions; performing and maintaining a count of valid Ethernet frames transmitted and received; performing and maintaining a count of errored Ethernet frames received; performing and maintaining byte count total of frames transmitted and received; providing a traffic generation function; controlling the format and content of transmitted Ethernet frames; and generating errored (invalid) Ethernet frames.

In one embodiment, the multi-frequency tap apparatus further comprises hardware and software configured to request the MAC address of a network device, including the capability to initiate the request, and to respond to the request.

In one embodiment, the multi-frequency tap apparatus further comprises hardware and software configured perform at least one of accepting an IP address and accepting a netmask.

In one embodiment, the multi-frequency tap apparatus further comprises hardware and software configured perform at least one of initiating a Ping request and responding to a Ping request.

In one embodiment, the multi-frequency tap apparatus further comprises hardware and software configured perform at least one of initiating a DHCP request to dynamically obtain an IP address from a DHCP server, and dynamically determining the address of a DHCP server.

In one embodiment, the multi-frequency tap apparatus further comprises hardware and software configured perform at least one of establishing connectivity to a DNS server through an ISP, functioning as a Web server, and displaying full or partial Web pages.

In another aspect, the invention features methods of performing tests according to the capabilities of the apparatus described immediately hereinbefore.

In a further aspect, the invention relates to a method of measuring attenuation of an optical fiber having a first end and a second end. The method comprises the steps of: connecting with a first jumper a first test apparatus at said first end of said optical fiber, a reference loss value for at least said first jumper being accessible to said first test apparatus; connecting with a second jumper a second test apparatus at said second end of said optical fiber, a reference loss value for at least said second jumper being accessible to said second test apparatus; performing a synchronization between said first test apparatus and said second test apparatus; transmitting at least one continuous wave test signal from said first test apparatus acting as a transmitter by way of said optical fiber to said second test apparatus acting as a receiver, said at least one continuous wave test signal having a specified wavelength; receiving at said second apparatus said at least one continuous wave test signal; measuring an apparent strength of said at least one continuous wave test signal received at said second apparatus; subtracting from said apparent strength of said received at least one continuous wave test signal said reference loss value for at least said jumper connected to said second test apparatus; digitally communicating from said second test apparatus to said first test apparatus a value representing said apparent strength of said received at least one continuous wave test signal less said reference loss value for at least said jumper connected to said second test apparatus; as necessary, depending on the referencing method used to measure said reference loss values for said first jumper and said second jumper, subtracting at said first test apparatus a reference loss value for said first jumper to provide a resultant value; and as necessary, communicating said resultant value digitally to said second test apparatus. By this process, said first test apparatus and said second test apparatus each has available for display an attenuation value for said optical fiber measured from said first end to said second end.

In one embodiment, the method further comprises the additional steps of transmitting at least one continuous wave test signal from said second test apparatus acting as a transmitter by way of said optical fiber to said first test apparatus acting as a receiver, said at least one continuous wave test signal having a specified wavelength; receiving at said first apparatus said at least one continuous wave test signal; measuring an apparent strength of said at least one continuous wave test signal received at said first test apparatus; subtracting from said apparent strength of said received at least one continuous wave test signal said reference loss value for at least said jumper connected to said first test apparatus; digitally communicating from said first test apparatus to said second test apparatus a value representing said apparent strength of said received at least one continuous wave test signal less said reference loss value for at least said jumper connected to said first test apparatus; as necessary, depending on the referencing method used to measure said reference loss values for said first jumper and said second jumper, subtracting at said second test apparatus a reference loss value for said second jumper to provide a resultant value; and as necessary, communicating said resultant value digitally to said first test apparatus. By this process, said first test apparatus and said second test apparatus each has available for display an attenuation value for said optical fiber measured from said second end to said first end.

In one embodiment, the step of performing a synchronization between said first test apparatus and said second test apparatus comprises sending a first digital signal from one test apparatus to the other test apparatus, said digital signal representing a handshake signal; receiving at said one test apparatus a return handshake signal from said other test apparatus; sending a second digital signal representing an acknowledgment of said second handshake signal from said one test apparatus to said other test apparatus; sending a digital signal representing a desired sequence of test wavelengths from said one test apparatus to said other test apparatus; and receiving at said one test apparatus a digital signal representing an acknowledgement that said other test apparatus can perform tests using the desired sequence of test wavelengths.

In one embodiment, said digital signal representing a desired sequence of test wavelengths is a packet based digital signal that includes at least one of a value representing at least one type of test to be performed, a value representing a number of wavelengths to be used in a test, a value representing the sequence of wavelengths to be used, and a value representing a fiber to be tested. In one embodiment, the step of digitally communicating from said second test apparatus to said first test apparatus a value representing said apparent strength of said received at least one continuous wave test signal less said reference loss value for at least said jumper connected to said second test apparatus comprises transmitting digital information that include a value representing the number of the optical fiber, a value that permits correlation of the wavelength used, and a value representing the loss measurement. In one embodiment, said value representing said apparent strength of said received at least one continuous wave test signal less said reference loss value for at least said jumper connected to said second test apparatus is expressed according to a logarithmic scale. In one embodiment, said value representing said apparent strength of said received at least one continuous wave test signal less said reference loss value for at least said jumper connected to said second test apparatus is expressed according to a linear scale. In one embodiment, the step of measuring an apparent strength of said at least one continuous wave test signal comprises performing an autorange step and a loss measurement calculation. In one embodiment, the optical fiber is a selected one of a continuous optical fiber and an optical fiber having a plurality of optical fiber segments serially connected so as to have a first end and a second end. In one embodiment, said at least one continuous wave test signal having a specified wavelength is defined by a pointer to a look-up table.

In another aspect, the invention features a test apparatus, useful for bidirectional attenuation testing of an optical fiber. When said test apparatus is performing said bidirectional attenuation testing it is connected to a first end of said optical fiber by way of a calibrated jumper and communicating via said optical fiber with a second similar test apparatus connected to a second end of said optical fiber by way of a calibrated jumper. The test apparatus comprises a microprocessor-based programmable computer having input and output capability including a user interface, and having memory for holding programs and data; a source of at least one continuous wave optical signal having a specified wavelength in electrical communication with and controlled by said microprocessor-based programmable computer, said source configured to be connected to an end of an optical fiber under test; an optical detector configured to detect radiation at said specified wavelength in electrical communication with and controlled by said microprocessor-based programmable computer, said optical detector configured to be connected to said end of an optical fiber under test; a bidirectional digital communication port in electrical communication with and controlled by said microprocessor-based programmable computer; and a computer program module recorded on a machine-readable medium. When the computer program module is operating on said programmable computer to test said optical fiber in a direction from said first test apparatus to said second similar test apparatus, it controls the steps of performing a synchronization between said test apparatus and said second similar test apparatus; transmitting at least one continuous wave test signal from said test apparatus acting as a transmitter by way of said optical fiber to said second similar test apparatus acting as a receiver, said at least one continuous wave test signal having a specified wavelength; receiving at said test apparatus a digital communication from said second similar test apparatus a value representing an apparent strength of said at least one continuous wave test signal less said reference loss value for at least said jumper connected to said second similar test apparatus; as necessary, depending on the referencing method used to measure said reference loss values for said first jumper and said second jumper, subtracting at said first test apparatus a reference loss value for said first jumper to provide a resultant value; and as necessary, communicating said resultant value digitally to said second similar test apparatus.

In one embodiment, when said optical fiber is being tested in a direction from said second similar test apparatus to said test apparatus, said computer program module controls the steps of receiving at said test apparatus said at least one continuous wave test signal; measuring an apparent strength of said at least one continuous wave test signal received at said test apparatus; subtracting from said apparent strength of said received at least one continuous wave test signal said reference loss value for at least said jumper connected to said test apparatus; and digitally communicating from said test apparatus to said second similar apparatus a value representing said apparent strength of said received at least one continuous wave test signal less said reference loss value for at least said jumper connected to said test apparatus.

In one embodiment, the step of performing a synchronization between said first test apparatus and said second similar test apparatus comprises sending a first digital signal from said test apparatus to said second similar test apparatus, said digital signal representing a handshake signal; receiving at said test apparatus a return handshake signal from said second similar test apparatus; sending a second digital signal representing an acknowledgment of said second handshake signal from said test apparatus to said second similar test apparatus; sending a digital signal representing a desired sequence of test wavelengths from said test apparatus to said second similar test apparatus; and receiving at said test apparatus a digital signal representing an acknowledgement that said second similar test apparatus can perform tests using the desired sequence of test wavelengths.

In one embodiment, said a bidirectional digital communication port comprises a UART. In one embodiment said at least one continuous wave optical signal having a specified wavelength is defined by a pointer to a look-up table. In one embodiment, during said step of measuring an apparent strength of said at least one continuous wave test signal, said computer program module controls an autorange step and a loss measurement calculation.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings and tables described below, and the claims. The drawings are not necessarily to scale, emphasis instead generally being placed upon illustrating the principles of the invention. In the drawings, like numerals are used to indicate like parts throughout the various views.

FIGS. 1A and 1B show a communication system in high level schematic form;

FIG. 1C shows the relationship between FIGS. 1A and 1B;

FIG. 2 is a schematic diagram that illustrates the traffic flow in a Broadband PON ("BPON");

FIG. 3. is a schematic diagram that illustrates the traffic flow in an Ethernet Passive Optical Network ("EPON");

Figure 4:
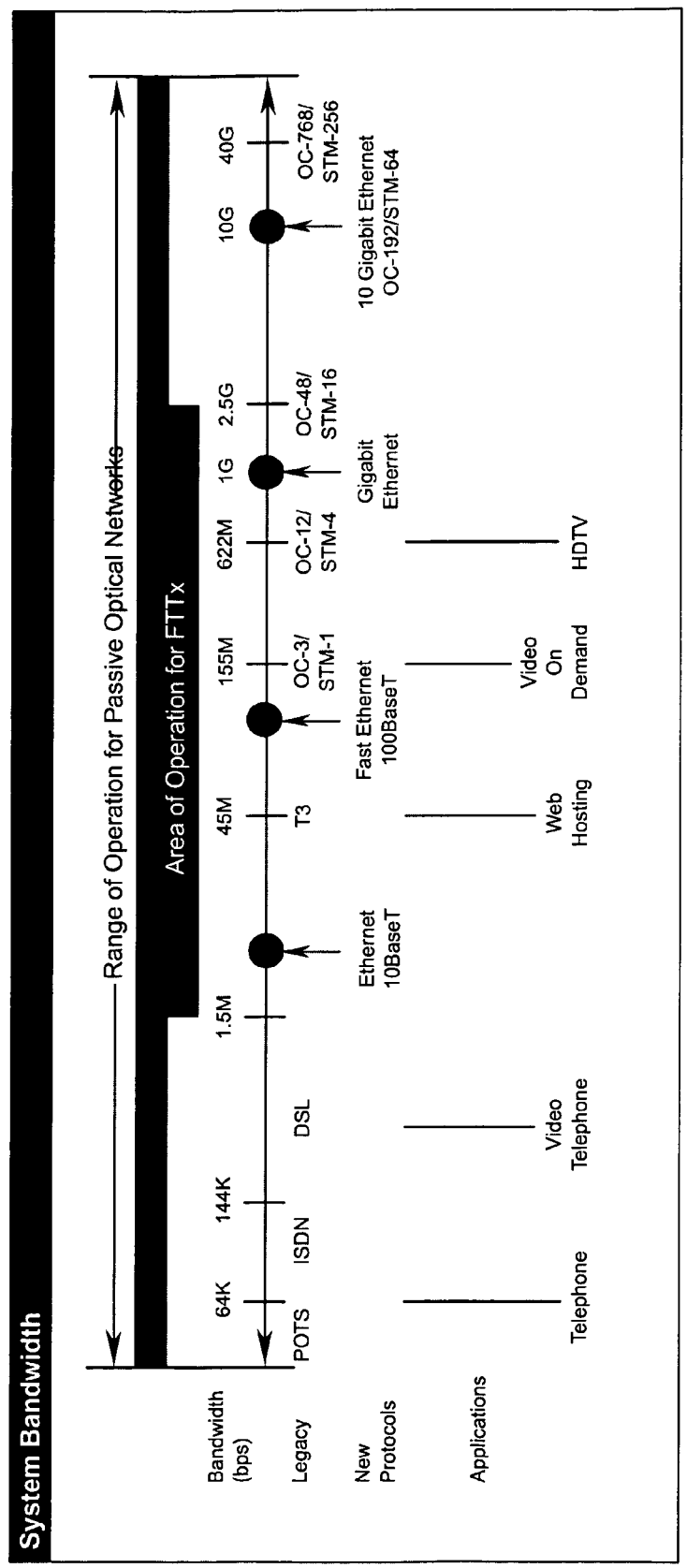
Figure 5:
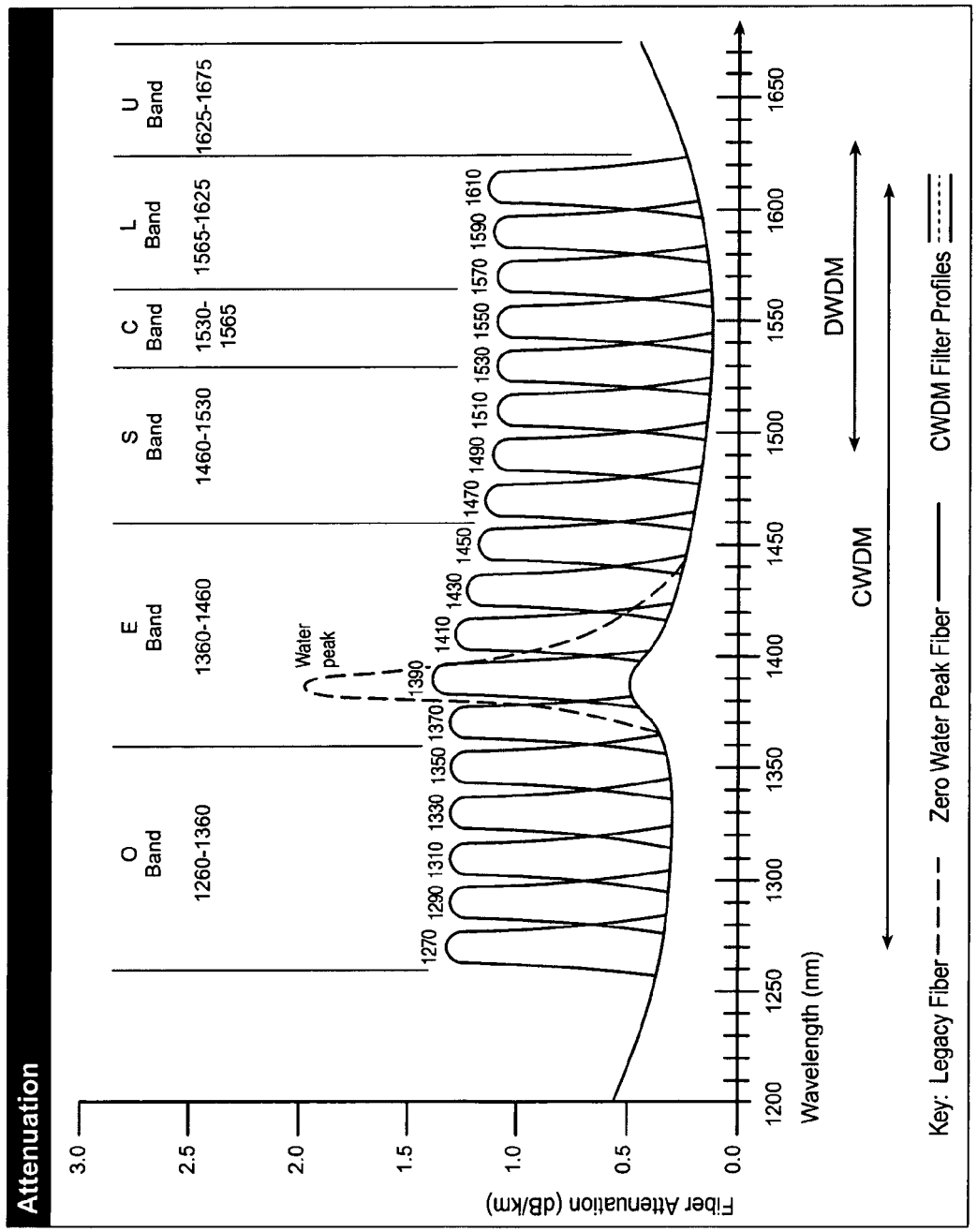
Figure 6:
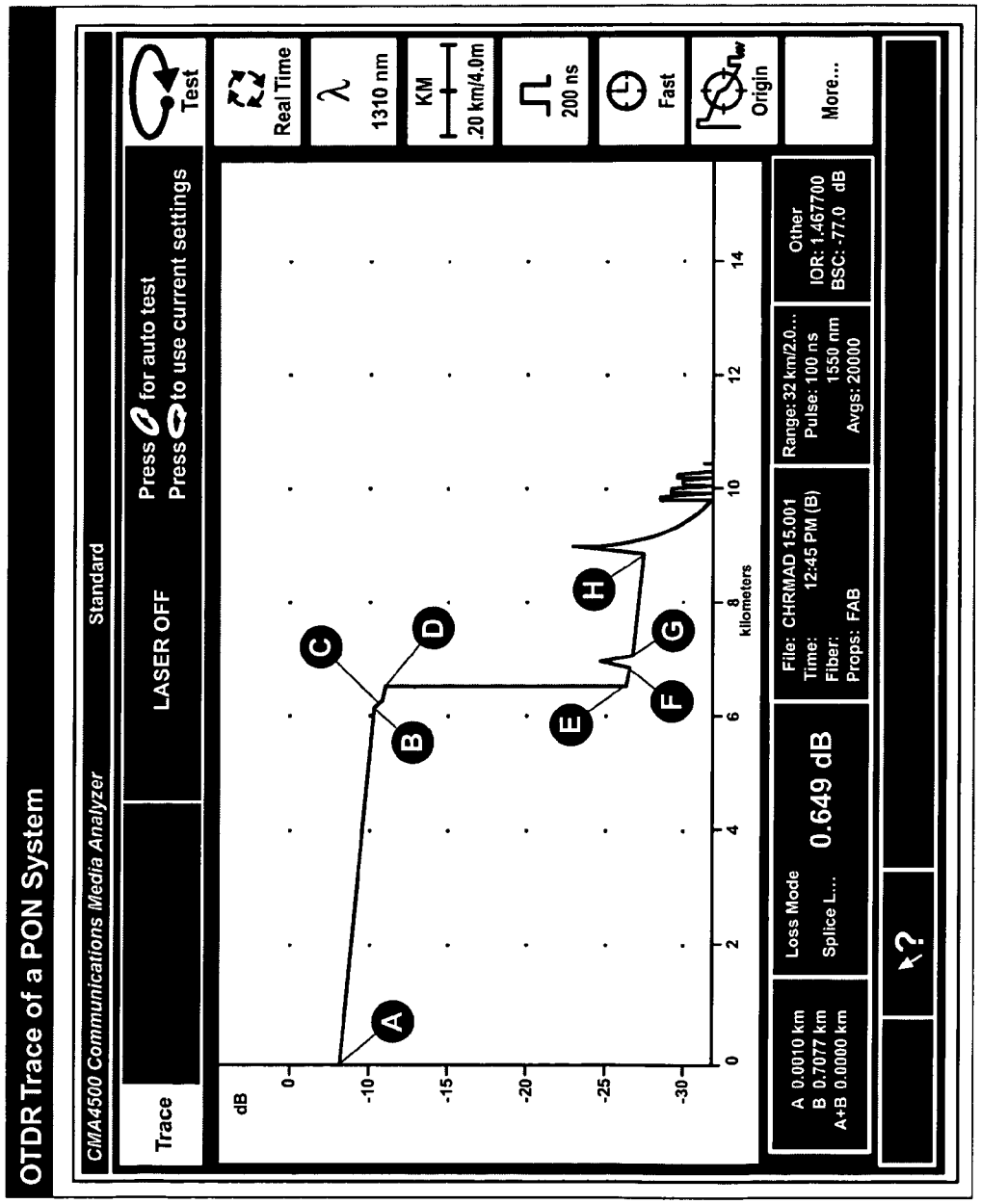
Figure 7:
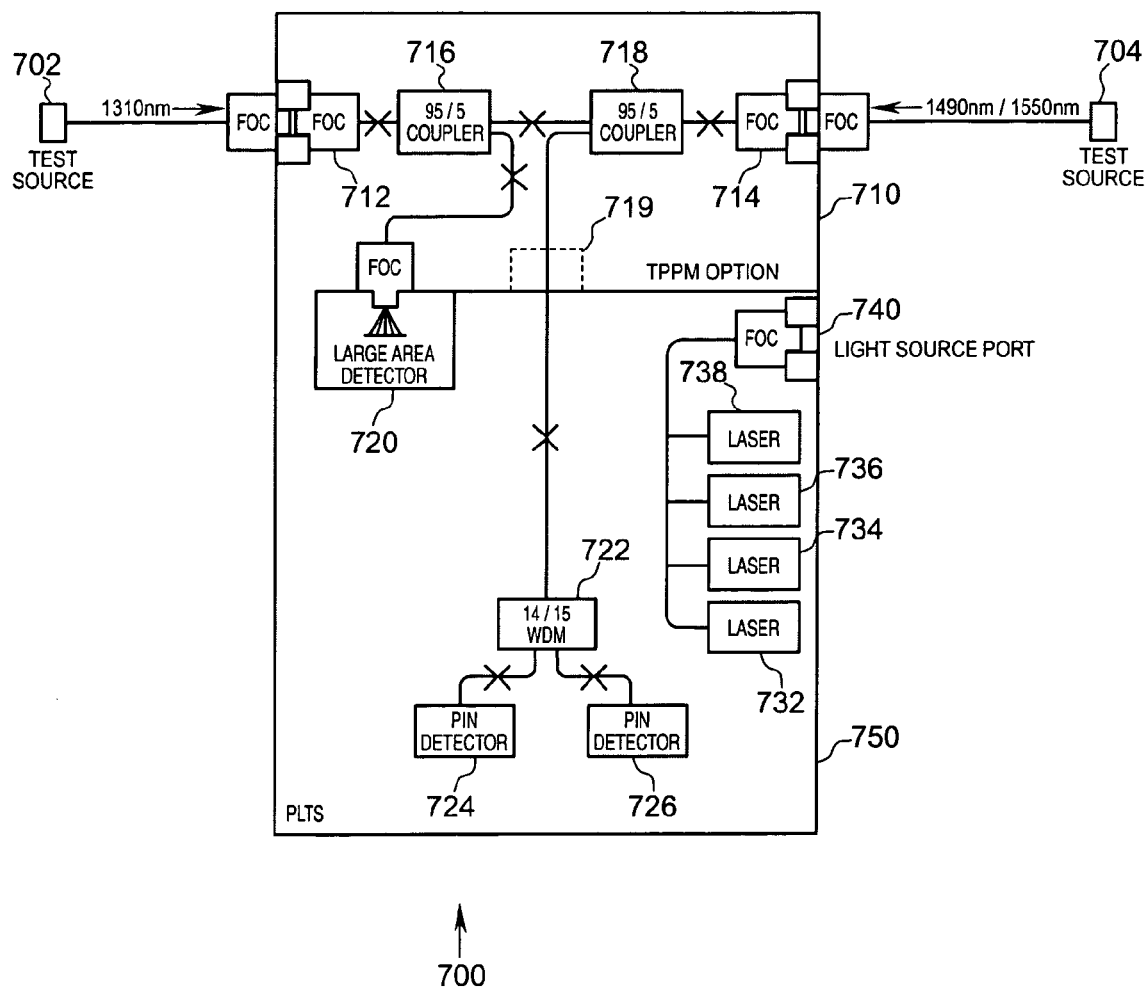
Figure 8:
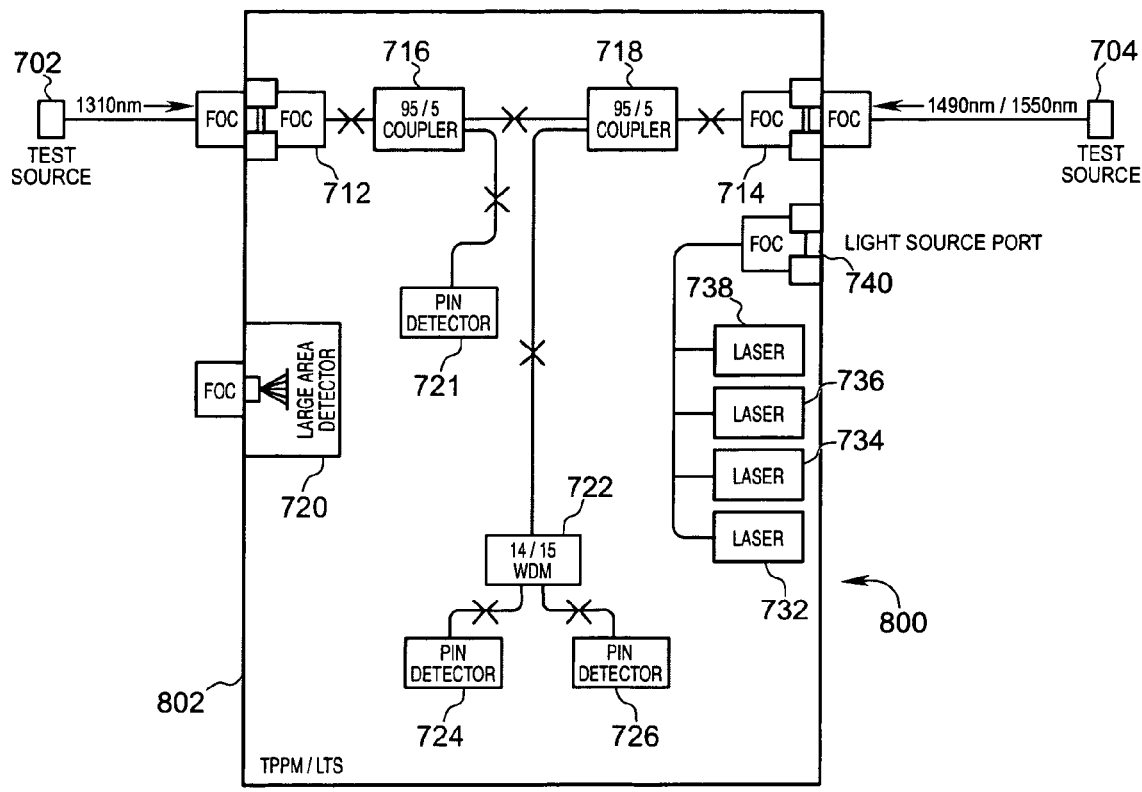
Figure 9:
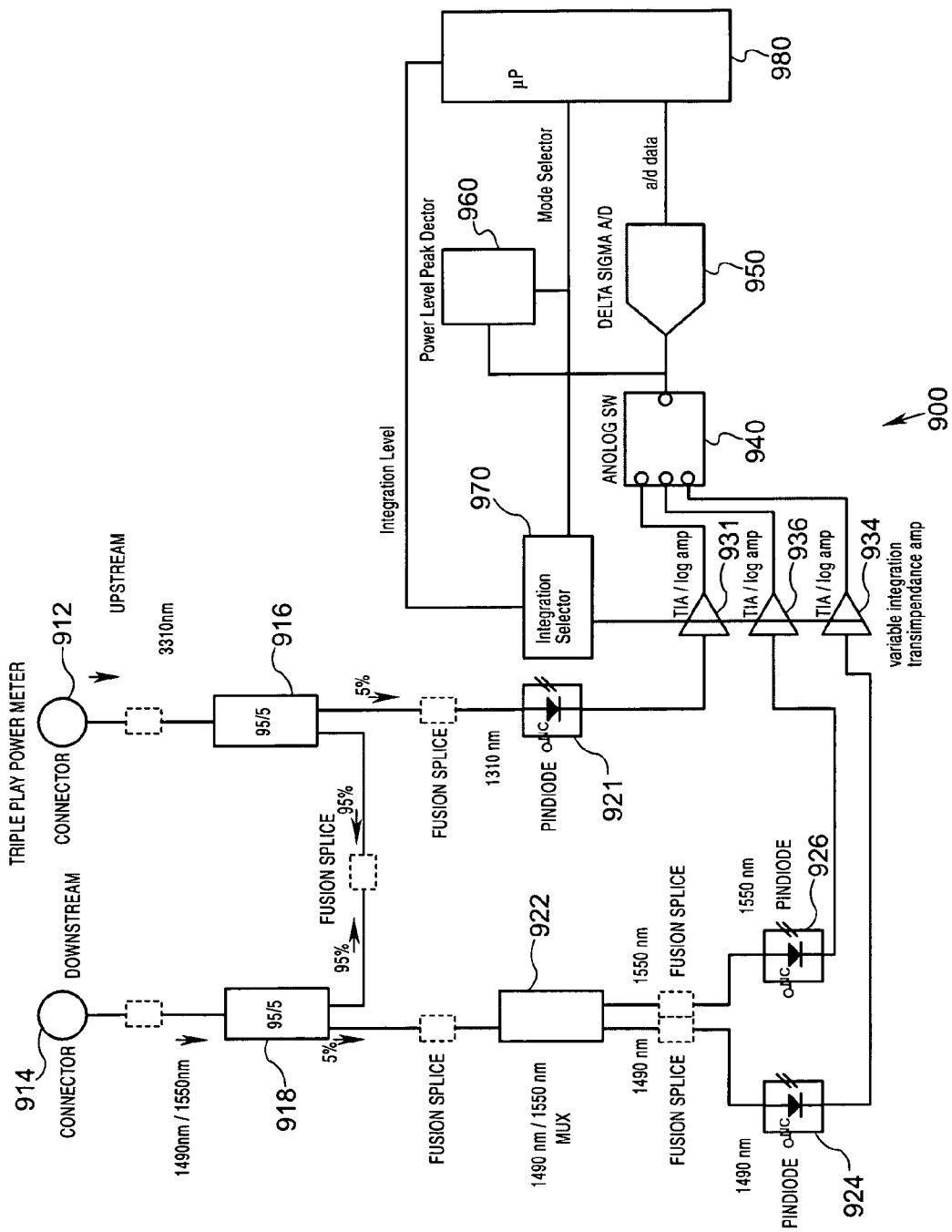
Figure 9E:
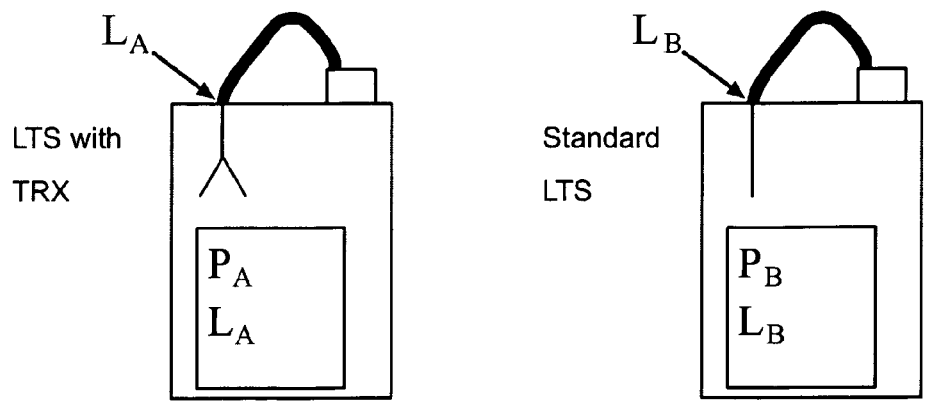
Figure 9F:
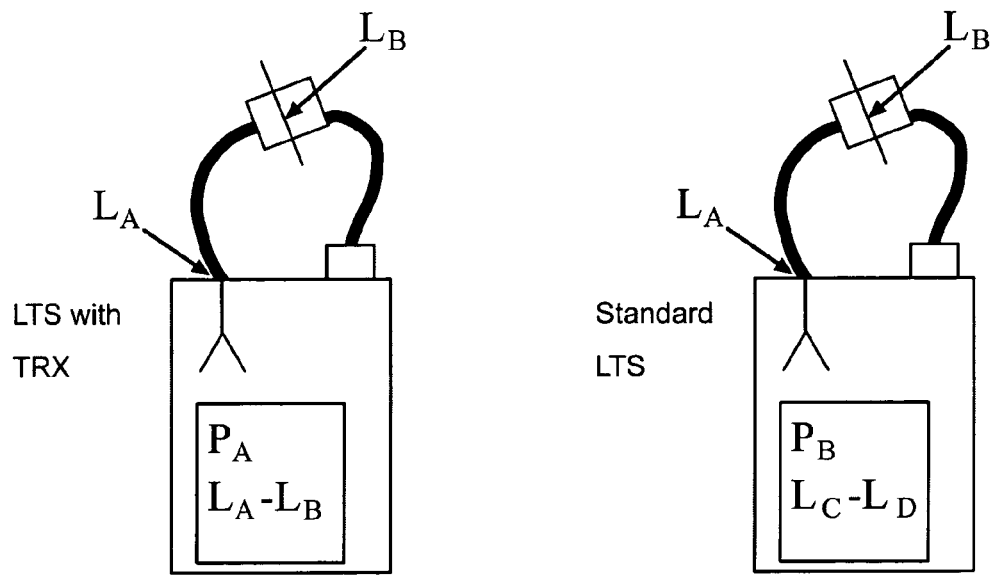
Figure 9G:
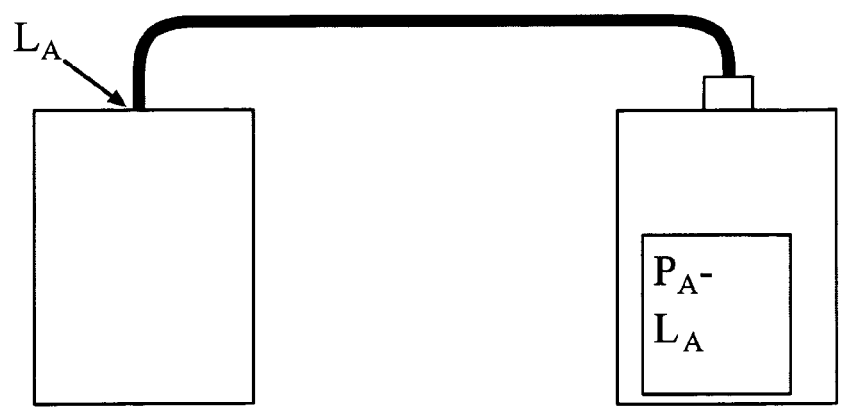
Figure 9H:
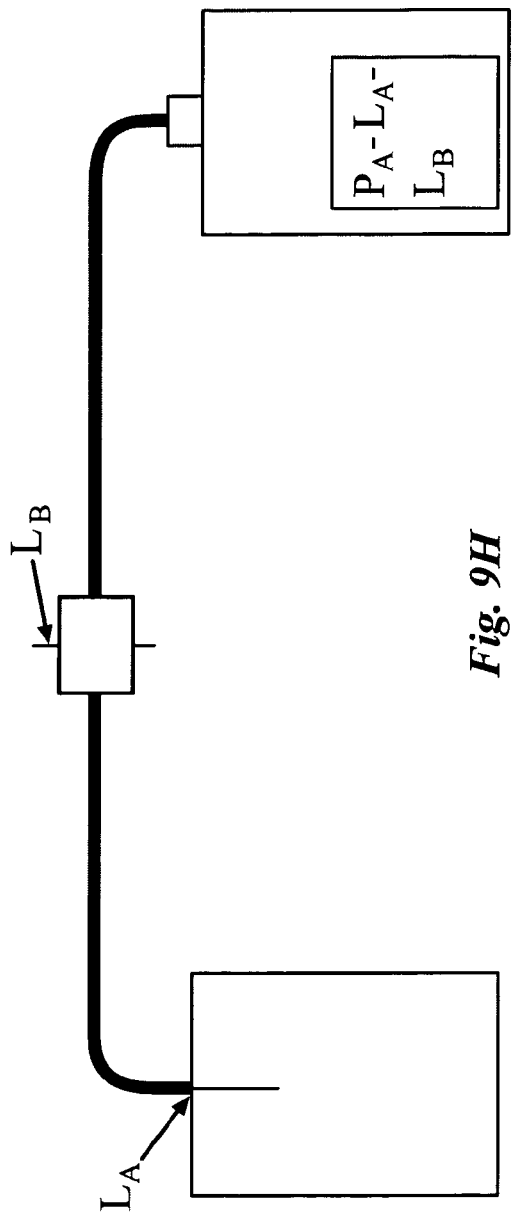
Figure 9I:
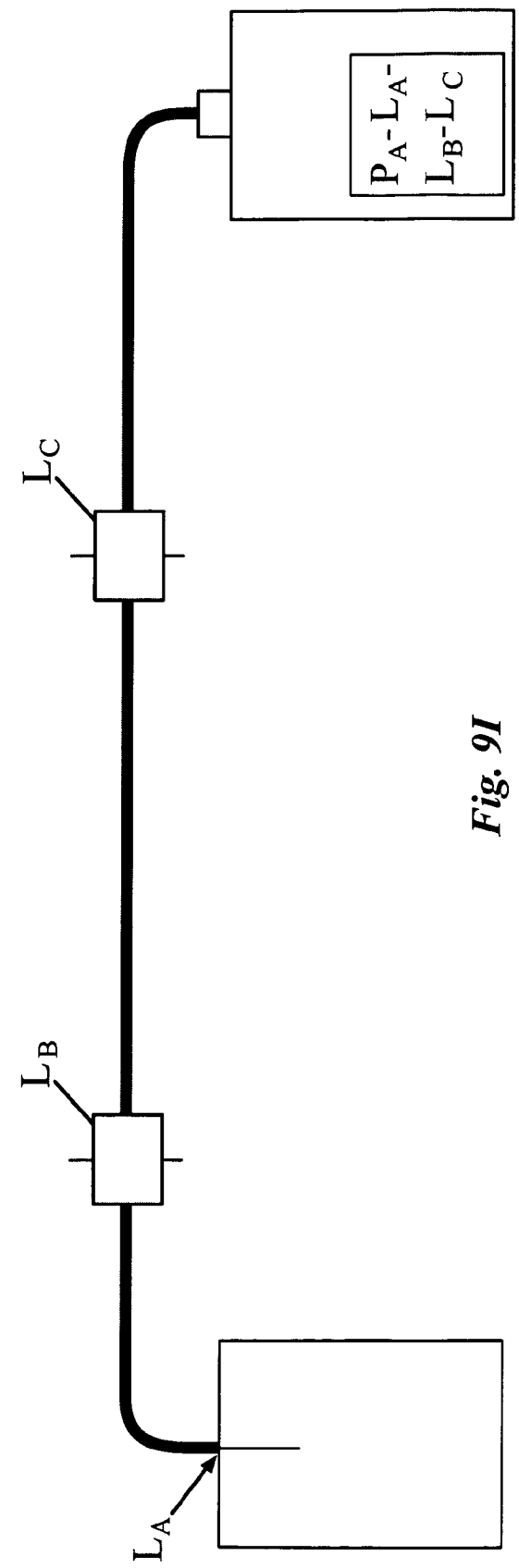
Figure 9J:
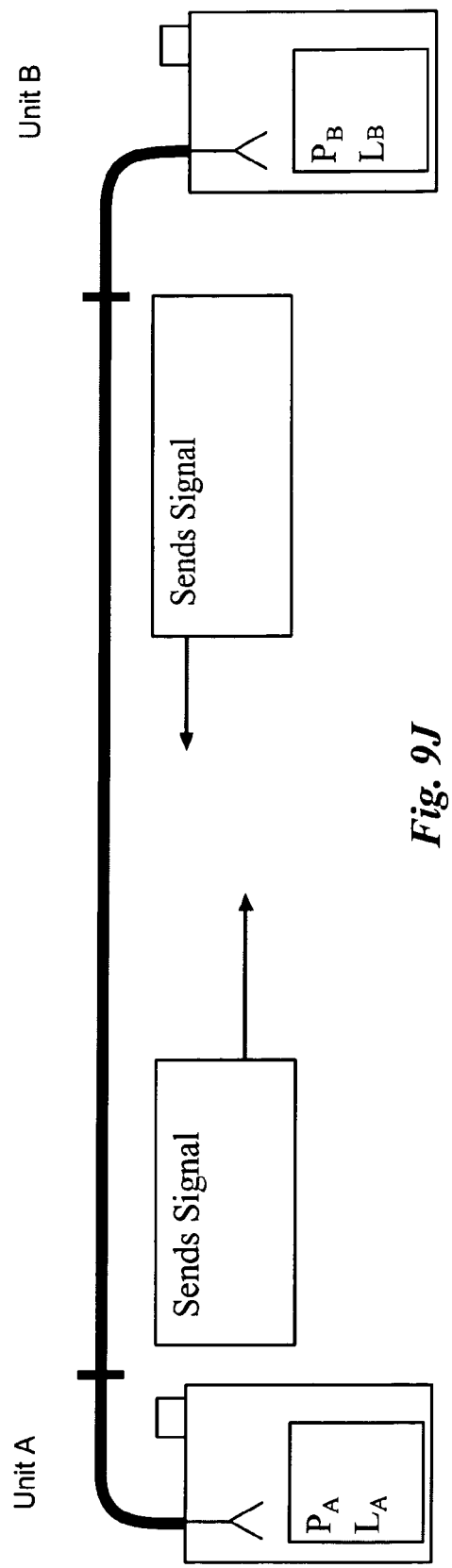
Figure 9K:
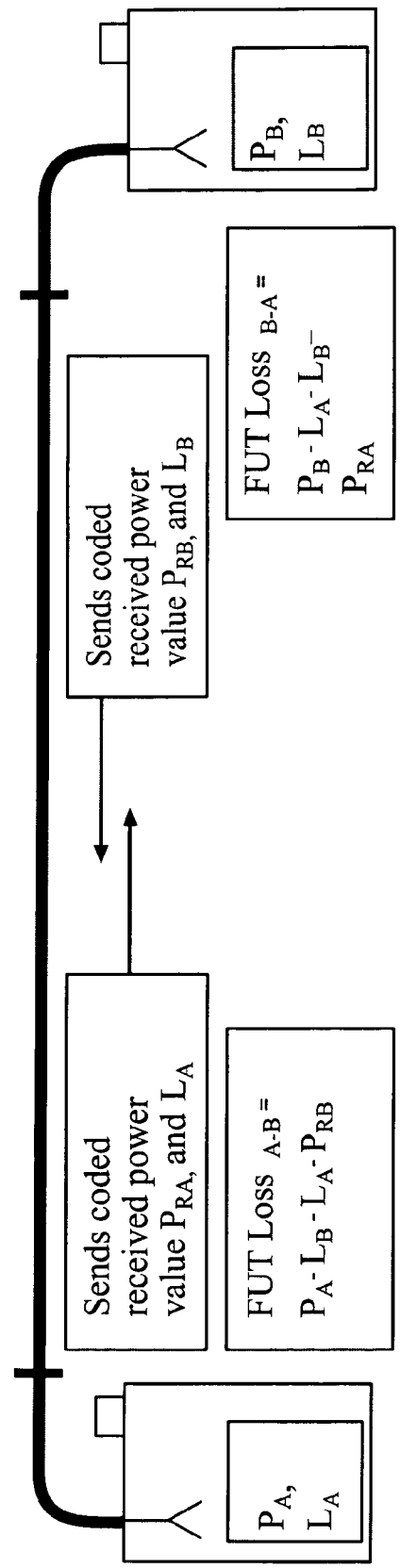
Figure 9L:
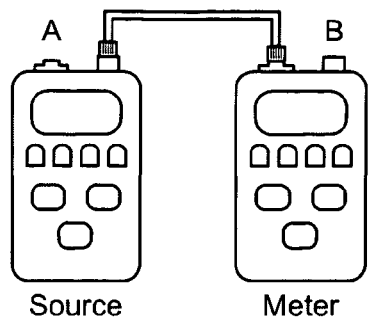
Figure 9M:
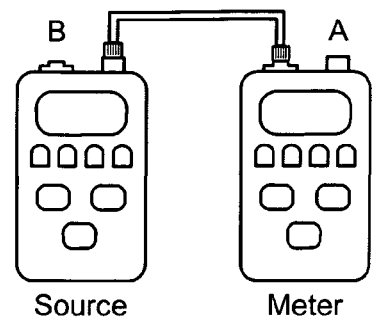
Figure 9N:
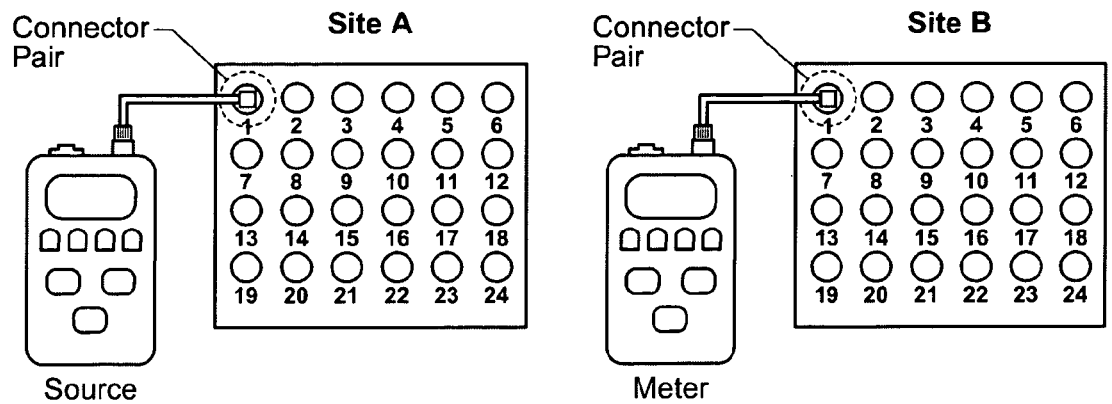
Figure 9O:
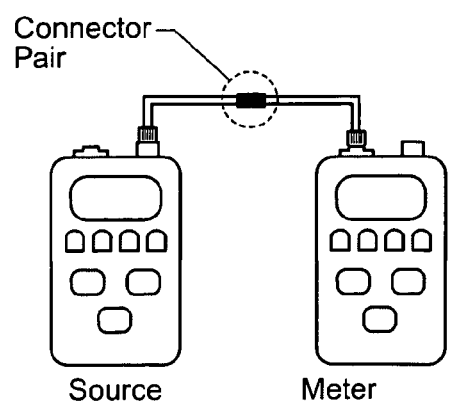
Figure 9P:
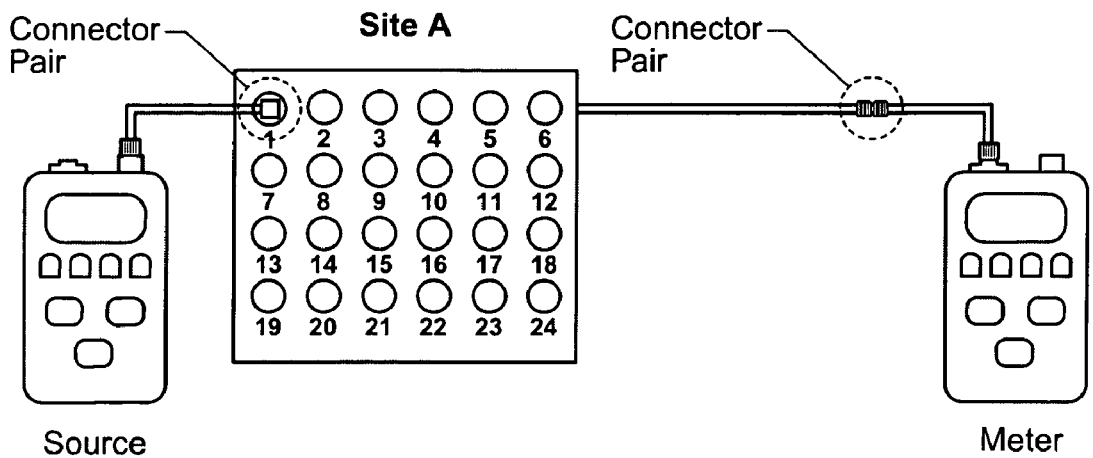
Figure 9Q:
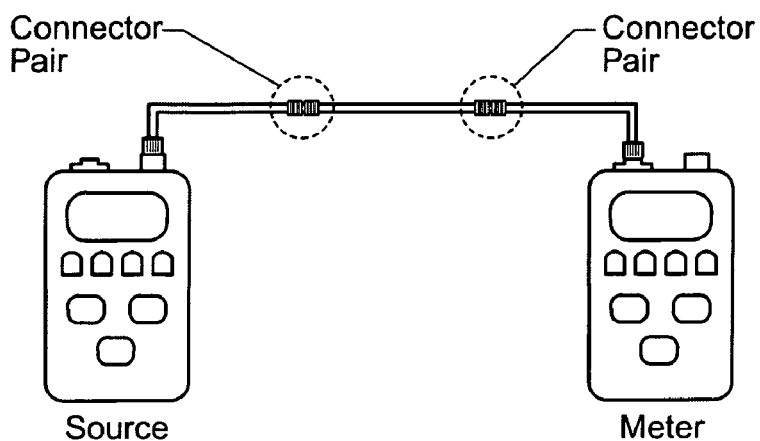
Figure 10:
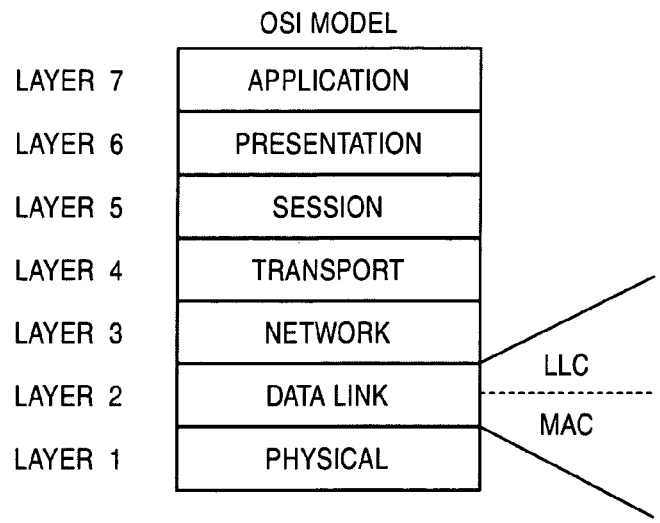
Figure 11:
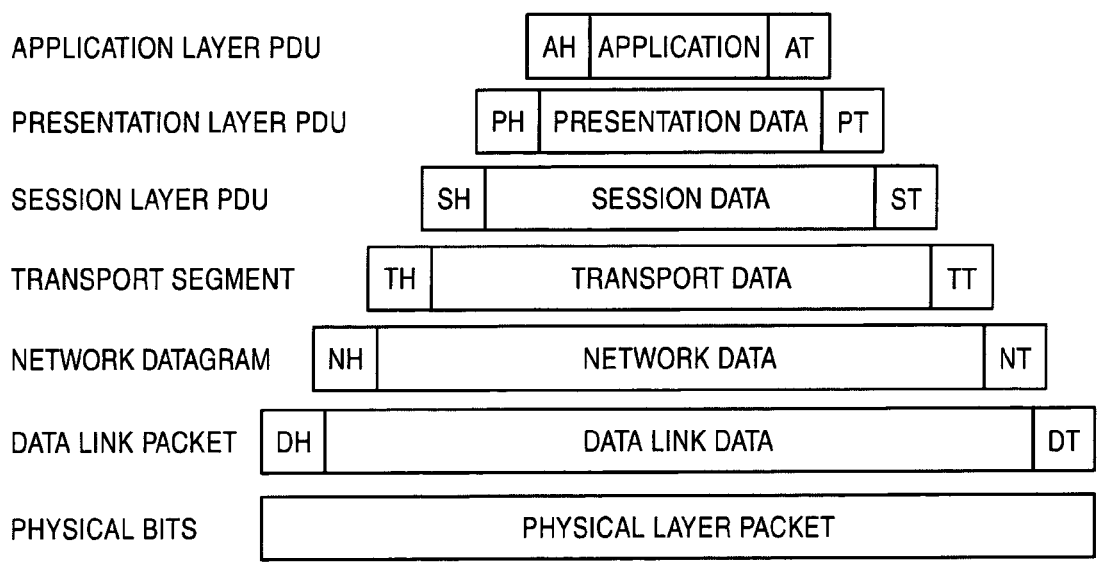
Figures 15, 16:
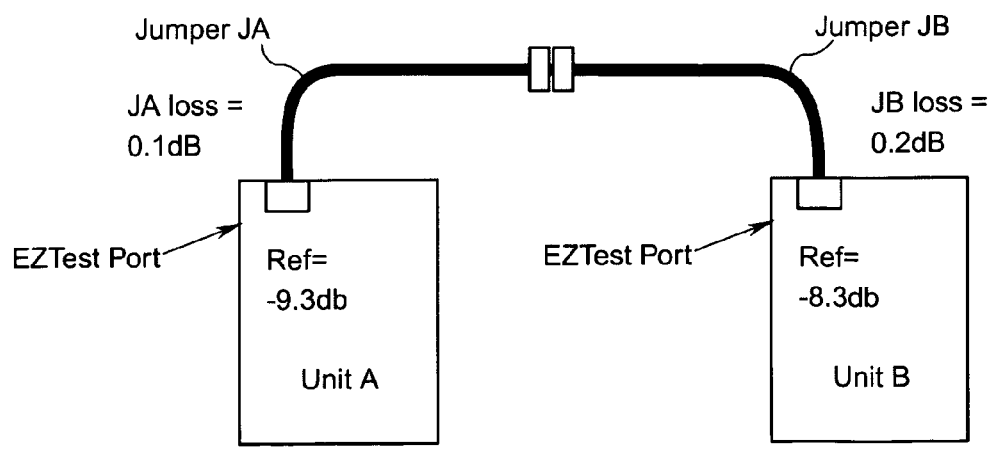
Figure 17:
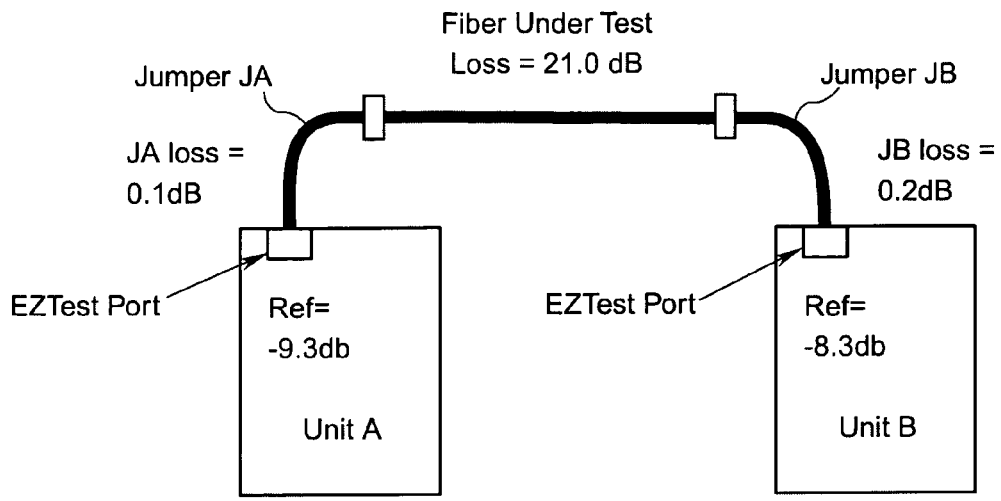
Figure 18:
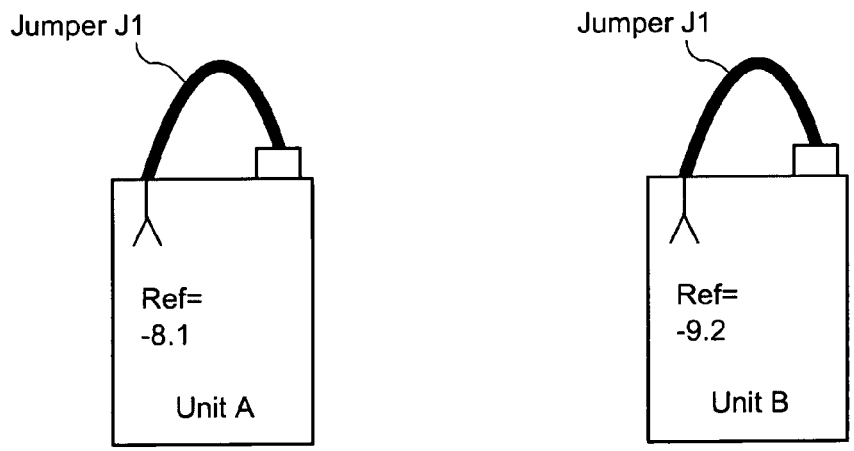
Figure 19:
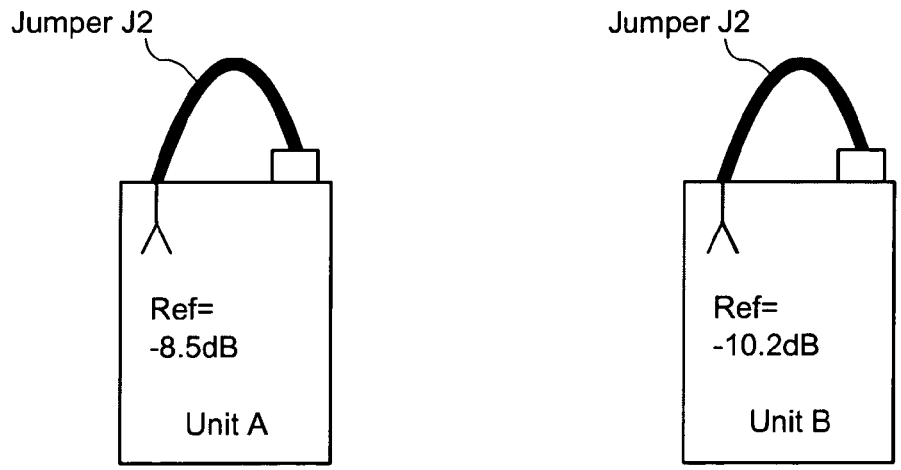
Figure 20:
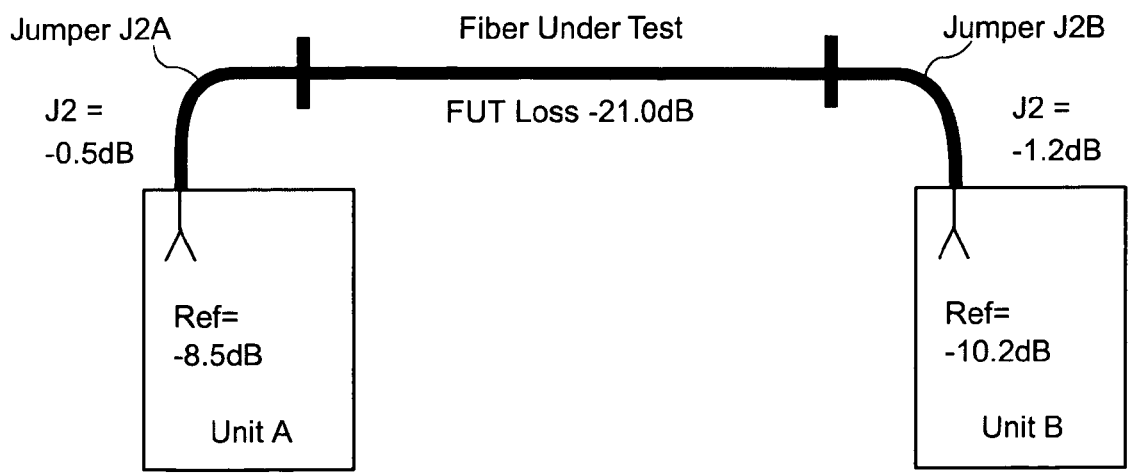
Figure 21:
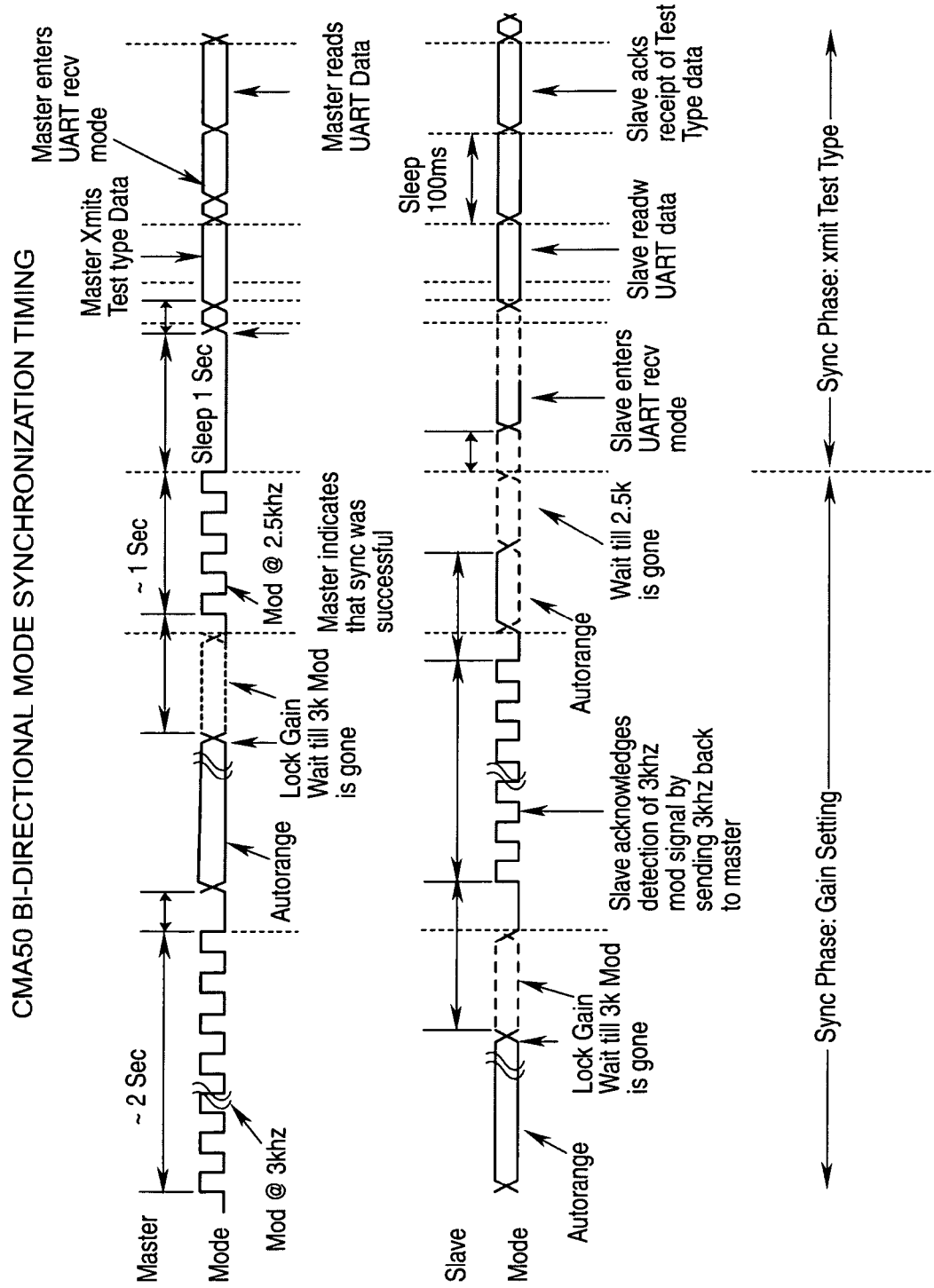
Figure 22:
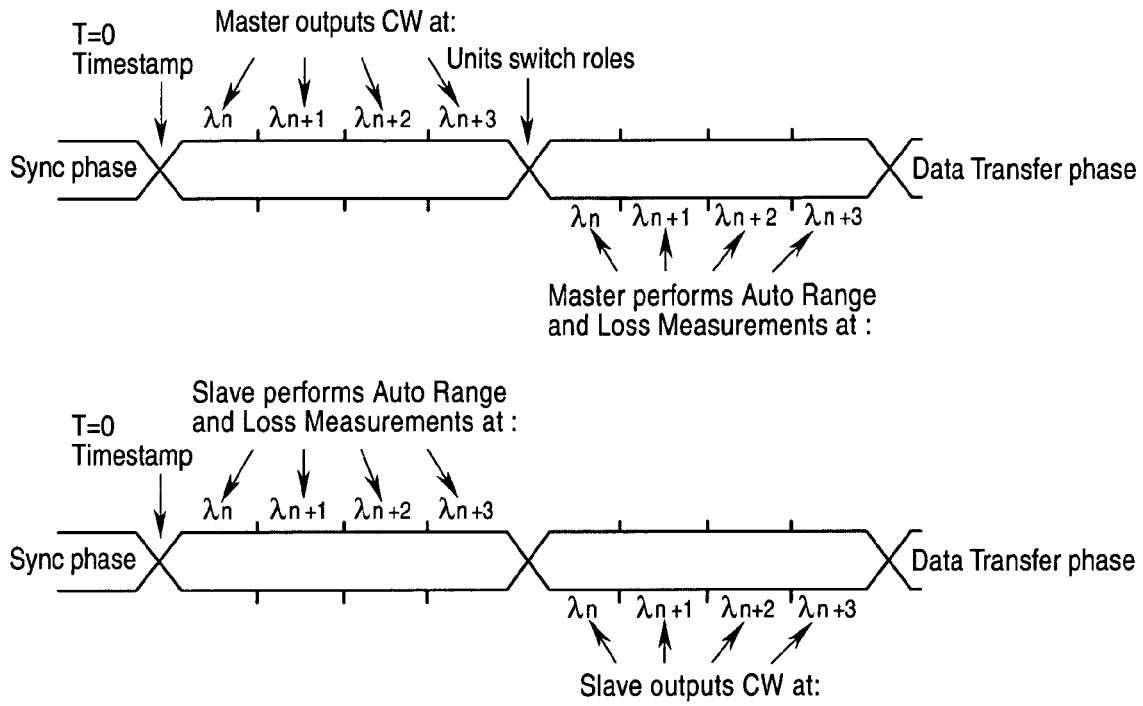

Table I describes some of the features of BPONs, EPONS, and other kinds of passive networks;

FIG. 4 is a diagram illustrating the bandwidths of different types of communication systems, and indicating the protocols and applications that can be implemented using PONs;

Table II lists a number of forms of transmission of electromagnetic signals, using media such as twisted pairs of copper wires, coaxial cable, and fiber optic cable;

FIG. 5 is a diagram that shows a plurality of bands of light that are used in optical communications in the infrared portion of the electromagnetic spectrum;

FIG. 6 is a diagram 600 that shows an illustrative ODTR trace of a PON system;

Table IIIA shows the general form of the optical budget calculation;

Table IIIB shows an illustrative example of the optical budget calculation, using the trace shown in FIG. 6 for the necessary data;

Table IIIC is a listing of procedures to be used to troubleshoot a live PON;

Table IVA interrelates a gain by an integral factor with an associated gain in decibels (dB);

Table IVB interrelates the number of ports in a splitter with the associated loss in dB (going in the downstream direction);

Table IVC indicates the conversion from loss in percent to loss in dB (or the opposite conversion);

Table IVD lists the typical attenuation in dB per km for zero water peak fiber as a function of wavelength;

Table IVE is a conversion table for power in dBm to power in watts, using 1 mW as the standard of reference;

FIG. 7 is a schematic diagram of a test meter that employs a multi-frequency tap apparatus, according to principles of the invention;

FIG. 8 is a schematic diagram of an integrated TPPM/LTS apparatus, according to principles of the invention;

FIG. 9 is a more detailed schematic diagram of an illustrative TPPM, according to principles of the invention;

FIGS. 9A-9C are diagrams illustrating three types of tool sets that can be used for loss (also known as attenuation) testing;

FIG. 9D is a diagram that illustrates the types of interfaces that can be encountered during measurement;

FIGS. 9E through 9I illustrate various configurations for referencing jumpers (also described as configurations 9E, 9F, 9G, 9H and 9I);

FIG. 9J is a diagram showing two test instruments (Unit A and Unit B) sending test signals to each other, according to principles of the invention;

FIG. 9K is a diagram showing two test instruments (Unit A and Unit B) sending digital signals such as the effective received power at the receiver unit and the jumper loss of the receiver unit to the unit that transmitted the test signal in FIG. 9J, according to principles of the invention;

FIG. 9L is a diagram that illustrates a configuration with Unit A as a source an unit B as the meter;

FIG. 9M is a diagram that illustrates a configuration with Unit B as the source and Unit A as the meter;

FIG. 9N is a diagram that illustrates a test of a two patch panel configuration;

FIG. 9O is a diagram that illustrates the presence of an inline adapter comprising a connector that causes a connector pair (and its associated loss) to appear in the configuration;

FIG. 9P is a diagram illustrating the test set-up for a patch panel having a fiber optic cable and connector attached thereto;

FIG. 9Q is a diagram illustrating a referencing step using a source connected to a meter using 3 jumpers and 2 in-line adapters;

FIG. 10 illustrates a prior art seven layer model that is conventionally used for describing the functions and interrelationships of some digital communication systems;

FIG. 11 illustrates in schematic form an example of encapsulation of a communication in a prior art digital communication system;

FIG. 12 is a schematic diagram of a generic frame or packet of bits;

FIG. 13 is a diagram showing in schematic form a packet suitable for use in a network that uses Media Access Control (MAC) addressing;

FIG. 14 is a schematic diagram that illustrates the format of an Ethernet frame comprising a VLAN tag;

FIG. 15 is a diagram showing in schematic form the structure of an IP message header;

FIG. 16 is a diagram showing an embodiment of a referencing configuration referred to herein as the Side by Side Referencing Mode;

FIG. 17 is a diiagram illustrating a test configuration in which Unit A is connected to the FUT using jumper JA, and Unit B connects to the other end of the FUT using jumper JB, according to principles of the invention;

FIG. 18 is a diagram illustrating how a jumper J1 is connected from the EZTest port to the Power Meter port of respective test instruments;

FIG. 19 is a diagram illustrating how a jumper J2 is connected from the EZTest port to the Power Meter port of respective test instruments;

FIG. 20 is a diagram that illustrates a test configuration for testing a FUT using two test instruments (Units A and B) and two respective jumpers J2A and J2B, according to principles of the invention;

FIG. 21 is a diagram that illustrates how Synchronization Phase Timing is performed, according to principles of the invention; and FIG. 22 is a diagram that illustrates how signals are transmitted and received by each unit during measurements, and represents an example of a Measurement Phase Timing Diagram, according to principles of the invention.

DETAILED DESCRIPTION OF THE INVENTION

The systems and methods of the invention provide an apparatus that can perform comprehensive testing and diagnosis of the "last mile" or "last kilometer" of fiber optic cable that connects a subscriber premises, such as a home or a business, to a communication (or telecommunication) network. In general, the problems associated with "last mile" use of fiber optic cable involve the difficulty and expense of installing the cable and of testing and maintaining the cable, and of configuring and maintaining the services provided over the cable. The present invention provides systems and apparatus that make such testing at the time of installation, and testing to maintain and repair fiber optic cable and the services provided by way of the fiber optic cable, a simple, automated, and inexpensive process. Not only can the apparatus and systems of the invention be used to test the cable for its basic optical performance, but the same apparatus can perform tests of the functionality of the communication link that the cable supports by testing at one or more levels of a standard multiple layer packet-based communication system, such as a communication system that supports any or all of Ethernet-based communications, Internet-based communications, and Voice-Over-Internet-Protocol ("VOIP") communications. In one embodiment, the provision of the capability to perform testing of the functionality of different levels or layers of a multiple-layer (or multilevel) packet-based communication system is accomplished by the incorporation of a network interface controller ("NIC") in the test apparatus. In some embodiments, the NIC has the ability to transmit, and also to receive, a packet-based message in accordance with a level of a communication system that complies with a packet-based communication standard or protocol, such as Ethernet, and TCP/IP. In some embodiments, the apparatus is small enough to be easily portable, or even held in one's hand. In some embodiments, the apparatus is inexpensive enough to be within the budget of the typical American household, so that it can be deployed as a substantially permanent component of the communication system at the subscriber premises.

We will first describe the technology of modern digital communication systems, which are often packet-based systems. A packet (or a frame) comprises a plurality of bits (or binary digits) that are arranged in a format specified by a protocol or other defining standard. Digital communication systems use frames or packets of data, comprising a header, a data payload, and a trailer, which will be described in more detail hereinbelow with regard to FIG. 12. In packet-based systems, such as Ethernet based communication systems, communication systems conforming to the protocols used in Internet communications, and other modern digital communication systems, the operation and status of the communication system is in principle amenable to testing at one or more levels.

As is known in the digital communication arts, a communication system can be described or modeled as comprising a plurality of layers or levels. Examples of layered communication system models are the Department of Defense Four-Layer Model and the Open Systems Interconnect ("OSI") Seven Layer Model. Depending on the model, a communication system may have one or more levels or layers that involve source and destination addresses.

In order to explain various aspects of the invention, it is useful to present a short introduction to exemplary digital information communication systems and methods that rely on a layered structure or model. For purposes of exposition, the OSI seven layer model, described in document OSI 7498, published by the International Standards Organization (hereinafter "ISO"), will be used as an example. Each of the seven layers describes a functionality or a protocol. Protocols are defined whereby equipment and systems provided by different vendors can interact with each other according to commonly agreed procedures. By using so-called "protocol layering" it is possible to simplify networking designs. Each layer provides a functionality or capability to the layer above it, and each layer calls on the capability provided by the layer immediately below it to accomplish a useful task.

Information that is relevant to the present invention is published by the Internet Engineering Task Force (IETF) of the Internet Society in the form of a document referred to as a Request for Comment ("RFC"). RFCs can be readily located at the web page http://www.ietf.org/rfc.html. Among the RFCs that are particularly relevant are RFC 791 (which describes the Internet Protocol), RFC 793 (which describes the Transmission Control Protocol) and RFC 2544 (which describes systems and methods for testing and reporting the performance of network interconnect devices). A copy of RFC 2544 is appended hereto as an Appendix. Appendix C of RFC 2544 describes in detail the formats to be used in testing TCP/IP over Ethernet.

Figure 1A:
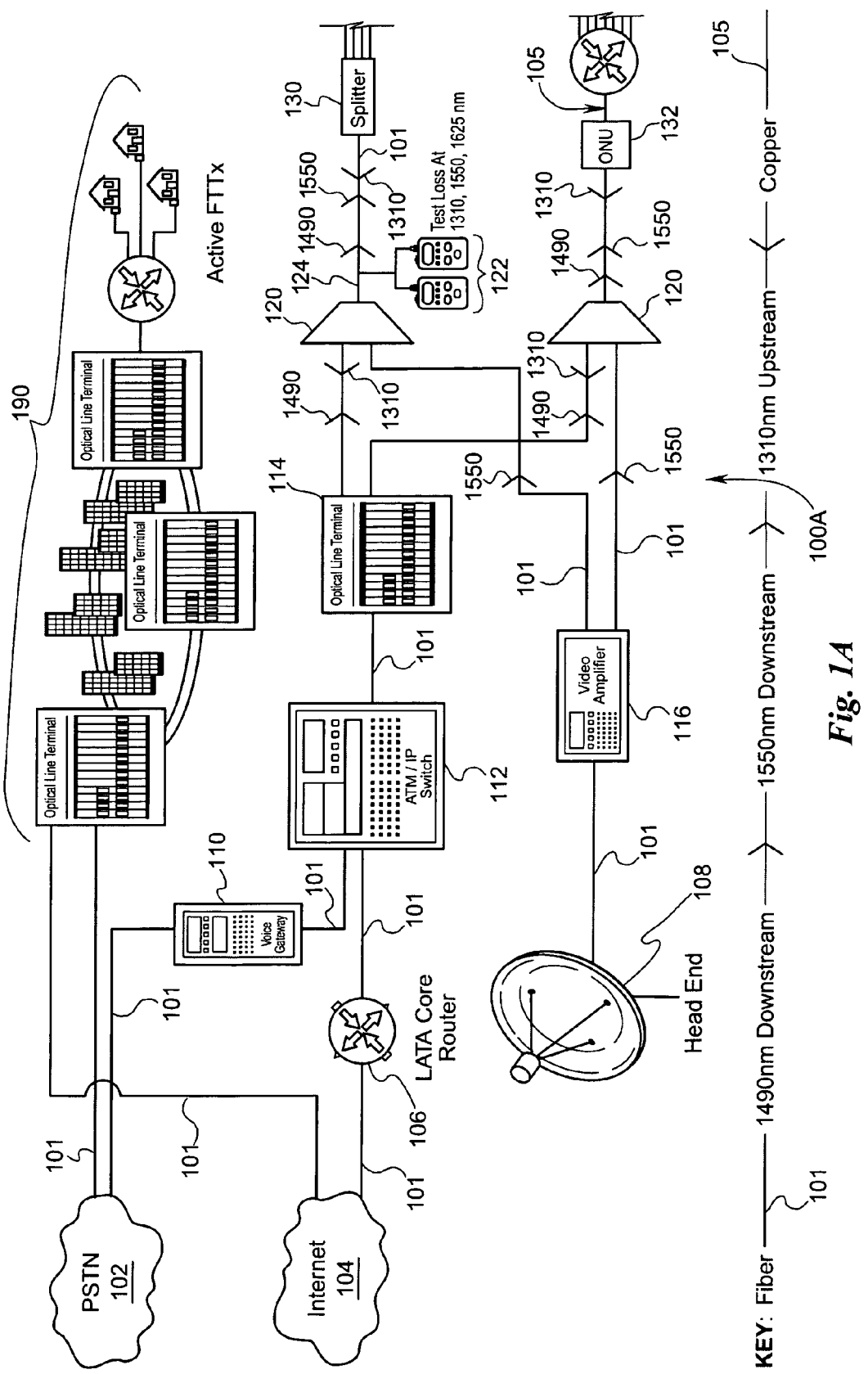

In overview, communication systems connect a user premises such as a home to other users of the system. FIGS. 1A and 1B are diagrams 100A and 100B, respectively, that show a communication system in high level schematic form. FIG. 1C shows the relationship between FIGS. 1A and 1B. In some embodiments, it is conventional to use wavelengths of substantially 1490 and 1550 nm to provide signals to a subscriber, and to use the wavelength of substantially 1310 nm to communicate signals from the user to the communications system.

In FIG. 1A there are shown at the left a Public Switched Telephone Network ("PSTN") 102 and an internet 104, both of which can act as sources and intermediate destinations for communications to and from a subscriber. Interconnections that can be made using optical fiber (or fiber optic cable) are indicated in the Drawings by the numeral 101. Communications carried using electromagnetic radiation of substantially 1550 nm are indicated by an arrow identified by the numeral 1550, communications carried using electromagnetic radiation of substantially 1490 nm are indicated by an arrow identified by the numeral 1490, and communications carried using electromagnetic radiation of substantially 1310 nm are indicated by an arrow identified by the numeral 1310. As is conventional in the fiber optic communication arts, the term "downstream" is used to connote a communication directed from a Central Office ("CO") to a user premises, and the term "upstream" is used to connote a communication directed from a user premises to a CO. Interconnections using copper wire are indicated in the Drawings by the numeral 105. The internet signals are switched by a Local Access Transport Area ("LATA") Core Router 106 to a particular Asynchronous Transfer Mode ("ATM")/Internet Protocol ("IP") switch 112 that in turn connects to the fiber optic network for the subscriber premises of interest (premises 144 shown in FIG. 1B). The PSTN 102 is connected to the switch 112 by way of a voice gateway 110. The switch 112 is connected to an Optical Line Terminal ("OLT") 114 that handles bidirectional communication with subscribers. Headend 108 is a source of video signals such as television broadcast information that can be distributed by any convenient communication medium, such as by broadcast, by satellite, and by cable or optical fiber. Headend 108 is connected to video amplifier 116 that conditions the signals received from the headend 108, and sends signals as needed to one or more optical mux/demux (or optical multiplexer/demultiplexer) 120. An optical mux/demux 120 is a device that can combine a plurality of different optical signals for transmission on a single optical fiber, and can separate a plurality of combined optical signals that it receives from an optical fiber. By comparison, a splitter 130 receives signals from one optical fiber on one side thereof, and transmits the same signal at a fractional intensity on each of a plurality of optical fibers on the other side thereof. The splitter 130 acts as a combiner for signals that enter it from the side having a plurality of optical fibers, and transmits the sum of such signals to the single optical fiber on the other side thereof. In general, a splitter/combiner can handle optical signals at a plurality of wavelengths, including wavelengths that may be used for purposes other than carrying communications, such as for testing and maintenance purposes. However, as will be discussed in greater detail hereinbelow, certain signal splitters can be designed to split the intensity of selected wavelengths in desired proportions, and to pass through optical power at other wavelengths with substantially no splitting into one or more selected output fibers.

An optical fiber 124 connects the optical mux/demux 120 and the splitter 130. A Loss Test Set ("LTS") apparatus 122 is shown connected to the optical fiber 124 carrying the communications at wavelengths of 1310, 1490, and 1550 nm. In one embodiment, the LTS 122 can be connected "in-line" with the optical fiber 124, for example at, or very close to, the optical mux/demux 120. Alternatively, the LTS 122 can be connected to an optical fiber of interest using one or more signal splitters. When used to test loss in a fiber, the LTS is used with all external signal sources turned off. The operation of the LTS 122 will be described in greater detail hereinbelow.

At the far right side of FIG. 1A there are shown a splitter 130 that handles optical communications at 1310, 1490 and 1550 nm, and an Optical Network Unit ("ONU") 132 that handles optical signals on one side thereof (here the upstream side), and handles electrical signals communicated on copper wires on the other side thereof (here the downstream side).

At the top of FIG. 1A is a schematic representation of optical fiber communication technology as applied to a distinct region 190, having a plurality of OLTs 114 and a plurality of subscriber premises of different types, some of which may be connected using routers.

Turning to FIG. 1B, there is shown at the far left of diagram 100B the same splitter 130 and ONU 132 that were just described with respect to the far right side of FIG. 1A, because, as is seen in FIG. 1C, FIGS. 1a and 1B overlap slightly. A second LTS 122 is shown at the downstream end of splitter 130. As will be described, the two LTS 122 can be used to test the optical fiber 124 connecting the optical mux/demux 120 and the splitter 130, in order to determine operating characteristics of the optical fiber 124, including how much loss occurs in transmitting signals in either direction in the optical fiber 124 as a function of wavelength.

In FIG. 1B there are several different examples of how optical fiber can be used to provide service in different scenarios. At the left upper corner of FIG. 1B is an example of "Fiber to the Curb" in which an ONU 132 is connected to splitter 130 with optical fiber. The ONU 132 connects by wire to a router 134 that connects by wire to each of one or more subscriber premises 136. At the left center of FIG. 1B is an example of "Fiber to the Building" in which an ONU 132 is connected to splitter 130 with optical fiber, and the ONU 132 services a multistory building, such as an apartment building or an office building. At the lower left of FIG. 1B is an example of "fiber to the Neighborhood" in which ONU 132 connects by wire to router 132, which then services by wire a neighborhood having a plurality of user premises 136, for example, residences, stores, and so forth.

In the center of FIG. 1B is an example of "fiber to the Home" in which a second splitter 138 is connected on the upstream side by optical fiber to splitter 130, and is connected to individual user premises 136 (here, homes) by optical fiber on the downstream side.

As is shown in FIG. 1B it is possible to connect one or more test instruments to a splitter 138 situated close to a user premises. Here, a power test instrument 140 is connected to splitter 138. Power test instrument 140 is configured in this example to test power at 1490 and 1550 nm, e.g., to test power flowing from the CO to the subscriber. As will be described, a meter that can measure at additional wavelengths can also be used. Also shown connected to the splitter 138 is an Optical Time Domain Reflectometer instrument (hereinafter "OTDR"). The use of ODTR instruments for measuring an Optical Return Loss (hereinafter "ORL") has been explained in detail in copending U.S. utility patent application Ser. No. 10/847,790. In the example shown, measurements at substantially 1625 nm are contemplated.

Turning attention to subscriber premises 144 in particular, there is shown at the far right of FIG. 1B an exploded view of the connections and interactions of the hardware at the subscriber premises 144. An optical fiber 101 connects splitter 138 to an Optical Network Terminal ("ONT") 150 located at the user premises 144. Within the ONT 150 is at least one optical mux/demux 120 that splits the incoming optical signals from optical fiber 101 into at least a substantially 1550 nm stream that is directed to optical to electrical converter 152, and at least a substantially 1490 nm stream that is directed to optical to electrical converter 154. Optical to electrical converter 152 provides video signals. In some embodiments, the video signals are communicated to a TV 160, a set top box for a TV, a video recorder, or similar video-based hardware. The video signals can be communicated by wire, or by any other communications means that are convenient, such as wireless communication, for example by infrared, IEEE 802.11, or Bluetooth methods and systems. If the video receiver is configured to receive optical signals at 1550 nm, it can be connected directly to the 1550 nm output of the optical mux/demux 120.

Optical to electrical converter 154 provides voice and data signals, for example voice signals to telephone 164, and data signals to home computer 162. In one embodiment, the connection between the optical to electrical converter 154 and the phone 164 or the computer 162 is by wire, although the connections in other embodiments can be wireless. Since telephones and computers are instruments that also generate signals for communication of information back to the CO, and from there to another subscriber, or to the communication system itself, a "back channel" that employs the substantially 1310 nm wavelength is commonly used. The electrical signals generated by the telephone 164 and the computer 162 for back channel communication are converted in optical to electrical converter 154 from electrical to optical signals at 1310 nm, and are transmitted back to optical mux/demux 120, from which point they travel over optical fiber 101 via splitters 138 and 130 back to the OLT 114, for distribution as needed to the system and to other subscribers.

FIG. 2 is a schematic diagram 200 that illustrates the traffic flow in a Broadband PON ("BPON"). BPON systems offer numerous broadband services including Ethernet access and video distribution. BPON networks are defined by the Full Service Access Network ("FSAN") Group and International Telecommunication Union ("ITU") committees comprised of both equipment vendors and service providers. BPONs employ ATM technology.

FIG. 3. is a schematic diagram 300 that illustrates the traffic flow in an Ethernet Passive Optical Network ("EPON"). An EPON is a network in which a point to multipoint (Pt-MPt) network topology is implemented with passive optical splitters. In addition, a mechanism for network Operations, Administration and Maintenance (OAM) is included to facilitate network operation and troubleshooting. EPON technology is based upon a mechanism named MPCP ("Multi-Point Control Protocol"), defined as a function within the MAC control sublayer. MPCP uses messages, state machines, and timers, to control access to a P2MP topology. Each ONU in the P2MP topology contains an instance of the MPCP protocol, which communicates with an instance of MPCP in the OLT. At the basis of the EPON/MPCP protocol lies the P2P Emulation Sublayer, which makes an underlying P2MP network appear as a collection of point to point links to the higher protocol layers (at and above the MAC Client). It achieves this by prepending a Logical Link Identification (LLID) to the beginning of each packet, replacing two octets of the preamble.

The physical characteristics of modern communication systems have been briefly described. One needs also to understand the operational features of such communication systems, including how information is formatted for communication, how it is possible to perform tests an to run applications (for example to operate computer programs) across networks, and how such networks are installed and maintained, including identifying communication faults and correcting them. Table I describes some of the features of BPONs, EPONS, and other kinds of passive networks.

FIG. 4 is a diagram 400 illustrating the bandwidths of different types of communication systems, and indicating the protocols and applications that can be implemented using PONs. Table II lists a number of forms of transmission of electromagnetic signals, using media such as twisted pairs of copper wires, coaxial cable, and fiber optic cable. Among the older systems, there is "Plain Old Telephone Service" ("POTS") that is commonly provided using twisted pairs of copper wires. Depending on the service that is provided, communication having a bandwidth from 64 kilohertz (1 voice channel) to approximately 6.3 Megahertz (up to 96 voice channels, or mixed voice and data channels, such as voice and DSL service) can be conducted using twisted pairs. Coaxial cables can be used to provide communication at somewhat higher bandwidths, ranging up to approximately 155 Megahertz. Fiber optic cable is used for extremely fast communication, for example at rates of 10 Gigahertz or higher.

Apparatus and Methods for Testing Attenuation Loss In Optical Fiber

FIG. 5 is a diagram that shows a plurality of bands of light that are used in optical communications in the infrared portion of the electromagnetic spectrum. In broad terms, the bands are labeled with a letter, such as the "O" band from 1260 to 1360 nm, the "E" band from 1360 to 1460 nm, and so forth as shown in FIG. 5. In greater detail, the bands identified by a letter can support a plurality of narrower bands of wavelengths of electromagnetic radiation (or IR light), such as the narrow bands centered at 1270, 1290, 1310, 1330 and 1350 nm in the "O" band, at 1370, 1390, 1410, 1430 and 1450 in the "E" band, and so forth, as also shown in FIG. 5. In FIG. 5, the vertical axis represents units of attenuation (which is a parameter to be measured by the test apparatus) and the horizontal axis is wavelength in nm.

In FIG. 5, the structure shown in broken line with the notation "water peak" is an absorption band due to water present in older optical fiber. There is also a solid line having a minor peak (a local maximum) at the same wavelength as the "water peak" (close to 1390 nm), which is the background absorption of a newer type of fiber that is termed "zero water peak" fiber, which exhibits a considerably reduced absorption attributable to water in the fiber.

Also shown in FIG. 5 are two ranges, one identified as "DWDM" (for Dense Wavelength Division Multiplexing), extending from approximately 1490 to 1630 nm, and one identified as "CWDM" (for Coarse Wave Division Multiplexing), extending from approximately 1270 to 1620 nm.

DWDM works by combining and transmitting multiple signals simultaneously at different wavelengths on the same fiber. In effect, one fiber is transformed into multiple virtual fibers. So, if one multiplexes eight OC −48 signals into one fiber, the carrying capacity of that fiber increases from 2.5 Gb/s to 20 Gb/s. Currently, because of DWDM, single fibers have been able to transmit data at speeds up to 400 Gb/s.

DWDM is protocol- and bit-rate-independent. DWDM-based networks can transmit data in IP, ATM, SONET/SDH, and Ethernet, and handle bit rates between 100 Mb/s and 2.5 Gb/s. Therefore, DWDM-based networks can carry different types of traffic at different speeds over an optical channel.

Coarse Wave Division Multiplexing (CWDM) combines up to 16 wavelengths onto a single fiber. CWDM technology uses an ITU standard 20 nm spacing between the wavelengths, from 1310 nm to 1610 nm. With CWDM technology, since the wavelengths are relatively far apart (compared to DWDM), the transponders are generally not very expensive.

FIG. 6 is a diagram 600 that shows an illustrative ODTR trace of a PON system, for example, as observed using a CMA5500 available from NetTest, Inc., of 6 Rhoads Drive, Utica, N.Y. 13502. In FIG. 6, the trace is marked with alphabetic symbols A, B, C, D, E, F, G and H. The symbols indicate points on the trace that are used to calculate various quantities that provide measured values associated with the characteristics of the fiber under test, from which a margin (e.g., a measure of how much capacity above that needed) is provided by the fiber. Table IIIA shows the general form of the optical budget calculation. Table IIIB shows an illustrative example of the optical budget calculation, using the trace shown in FIG. 6 for the necessary data.

Table IIIC is a listing of procedures to be used to troubleshoot a live PON. If all customers are out, it is useful to perform an OTDR test from the CO, for example to locate a fault in a cable, as described in copending U.S. utility patent application Ser. No. 10/847,790, which cable can then be repaired. If one or more individual customers are out, it is useful to verify that 1490 nm and 1550 nm power are being received at the customer premises, and if so, to identify a power level. If there is no power, one performs a test of the distribution fiber with an OTDR, and repairs any faults that are identified. If power is low, one can test the splitter serving that customer with a power meter, and repair or replace the splitter as needed. If the power is adequate, one can verify that the ONT is operating properly. If the ONT is working, the fault lies with the customer's equipment. Table IIIC can thus be understood as a flow chart for troubleshooting a live PON.

Tables IVA through IVE are tables that list various loss calculations. Table IVA interrelates a gain by an integral factor with an associated gain in decibels (dB). For example, a gain of a factor of 2 is equivalent to a gain of −3.0 dB, and a gain of a factor of 5 is a gain of −7.0 dB. Table IVB interrelates the number of ports in a splitter with the associated loss in dB (going in the downstream direction), because, as an example, a splitter having N ports will in general cause a reduction of light intensity by a factor of N in each of the downstream fibers. Table IVC indicates the conversion from loss in percent to loss in dB (or the opposite conversion). Table IVD lists the typical attenuation in dB per km for zero water peak fiber as a function of wavelength. Table IVE is a conversion table for power in dBm to power in watts, using 1 mW as the standard of reference. At the bottom of Table IVE are equations by which one can calculate power in dBm given power in mW, and the reciprocal relationship.

FIG. 7 is a schematic diagram 700 of a test meter that employs a multi-frequency tap apparatus. In the meter shown in FIG. 7, there is a portion 710 of the meter, which portion 710 is identified by the label "TPPM option" (for Triple Play Power Meter. e.g., a meter that can test voice, data, and video transmissions). The TPPM portion 710 includes an input 712 that is connected to the downstream apparatus and accepts as input illumination having substantially 1310 nm wavelength from a source 702. The TPPM portion 710 includes an input 714 that is connected to the upstream apparatus and accepts as input illumination having substantially 1490 nm wavelength and substantially 1550 nm wavelength from one or more sources 704. In one embodiment, the inputs 712, 714 comprise fiber optic connectors ("FOC") and the sources 702, 704 are connected to the inputs 712, 714 using optical fiber terminated with FOC. In one embodiment, internal to portion 710 are couplers 716, 718 that transmit 95% of the illumination of a particular wavelength provided at an input point to an output point (hereinafter "straight through illumination") and tap off approximately 5% of the illumination provided at the input point to a fiber that can be used for measurement purposes, the 95% of the signal conveyed as the straight through illumination being adequate for supporting communication in the communication network. The 5% portion of the signal tapped of for measurement purposes represents a portion of the respective communication signal of sufficiently small magnitude to avoid impeding a communication. Couplers that provide other relative amounts of an input signal to two outputs are also available. In the present example, the coupler 716 is configured to split only the signals having wavelengths of substantially 1310 nm, while passing through all of the signals having wavelengths of substantially 1490 nm and substantially 1550 nm. In the present example, the coupler 718 is configured to split the signals having wavelengths of substantially 1490 nm and substantially 1550 nm, while passing through all of the signals having wavelengths of substantially 1310 nm.

In the lower portion of FIG. 7, there is shown a section 750 labeled PLTS, for power loss test set. The tapped off 5% of the illumination having a wavelength of substantially 1310 nm is conveyed to a large area detector 720, where its strength is measured. The tapped off 5% of the illumination having wavelengths of substantially 1490 nm and 1550 nm is conveyed to a wavelength dependent multiplexer 722, where the 1490 nm component is sent into a first PIN detector 724, where its strength is measured, and the 1550 nm component is sent into a second PIN detector 726, where its strength is measured. The connection for the 1490/1550 tap between the section 750 and the portion 710 is shown in FIG. 7 as an unbroken optical fiber, but in alternative embodiments, an optional FOC 719 can be used to connect the portion 710 and the section 750 at the 1490/1550 nm tap line. The section 750 further includes at least one laser, and preferably a plurality of lasers 732, 734, 736, 738 each operating at a wavelength of interest (e.g., 1310, 1490, 1550, 1625 nm or other desired wavelengths). The lasers 732, 734, 736, 738 are connected by way of a FOC at light source port 740 to objects, such as fibers, that require illumination with a known wavelength for test purposes.

FIG. 8 is a schematic diagram 800 of an integrated TPPM/LTS apparatus 802. The components of the integrated TPPM/LTS apparatus 802 are identical to the correspondingly numbered items in FIG. 7. In FIG. 8 the tapped off illumination at a wavelength of substantially 1310 nm is measured using a PIN detector 721, rather than the large area detector 720, which is available for other uses.

FIG. 9 is a more detailed schematic diagram 900 of an illustrative TPPM. In FIG. 9, the connector 912 is connected to a portion of fiber optic cable that provides subscriber responses (e.g., it receives communications traveling upstream), and connector 914 is connected to receive communications traveling downstream. Splitter 916 is a splitter having similar capabilities to those of splitter 716 in FIG. 7, and splitter 918 is a splitter having similar capabilities to those of splitter 718 in FIG. 7. The straight through illumination from each of splitters 916 and 918, representing approximately 95% of the illumination coming into each splitter, is sent to the other splitter for transmission out of the TPPM meter 900. The 1310 nm illumination tapped off by splitter 916 is passed by an optical fiber to a PIN diode 921 where the illumination is converted to an electrical signal. The combined 1490/1550 nm illumination tapped off by splitter 918 is sent via optical fiber to a 1490/1550 nm wavelength dependent mux 922, where the 1490 nm and 1550 nm wavelength components are separated. The separated 1490 nm wavelength component is sent by optical fiber to PIN diode 924 where the illumination is converted to an electrical signal. The separated 1550 nm wavelength component is sent by optical fiber to PIN diode 926 where the illumination is converted to an electrical signal.

The electrical signals from PIN diodes 921, 924 and 926 are communicated to amplifiers, such as variable integration trans-impedance amplifiers (VI-TIA) 931, 934 and 936, respectively. An analog switch 940 is used to selectively connect the output of one of VI-TIA 931, 934 and 936 to an analog-to-digital converter 950, such as a sigma-delta A/D, and to the input of a power level peak detector circuit 960. A microprocessor 980 is provided to accept digital data output from the A/D converter 950, to accept a peak power reading from the power level peak detector circuit 960, to control the operation of an integration selector 970 that configures the integration parameters and characteristics of VI-TIA 931, 934, and 936, and generally to control the mode of operation of the TPPM 900, as well as to accept commands from and deliver output to a user of the TPPM 900.

The apparatus and methods of the invention provide the ability to measure optical power of live APON, BPON, and Ethernet protocols. This is accomplished by varying the integration time (i.e. bandwidth) of the receiver circuitry. Other methods such as peak detection may be used in conjunction with the VI TIA. The user and/or the equipment will determine the protocol being used and adjusts the receiver accordingly. The microprocessor 980 can determine which power levels are valid to be displayed and/or stored. Also, the receiver bandwidth may be set up strictly for a minimum burst width correlating to a given protocol (i.e. BPON, APON, or Ethernet).

A protocol detector can use frequency counting or other techniques to detect the speed, duty cycle or burst width of the incoming traffic. The signal can then be interpreted as a feature present in a certain type of protocol, thereby identifying the protocol that is active. This information optionally can also be displayed to the user for reference purposes.

Tests that can be performed during installation and upgrade include Loss Test using LTS, optionally with Bidirectional EZTest and ORL. Tests that can be performed during troubleshooting include tests of transmitted power using a Power Meter or TPPM. Tests that can be performed during troubleshooting of an installed network include tests of layers above the physical layer of a multi-layer packet-based communication system using the NIC.

Different types of meters can be used to test optical fiber or fiber optic cable during installation. In one embodiment, a PON Loss Test set with Wavelength Independent Coupler ("WIC") traditional port ("PLTS-WIC") is used during installation. This loss test has two (2) power meter ports: a 14/15 port which separates the 1490 and 1550 into two separate power readings, and a 1310/WIC port which is a large area detector capable of measuring all wavelengths in the InGaAs response range (i.e. wavelength independent). This port is similar to the standard loss test set.

In another embodiment a PON Loss Test set with a variable integration amplifier and WIC detector is employed ("PLTS-VI-WIC") during installation. This loss test also has two (2)

power meter ports: a 14/15 port which separates the 1490 and 1550 into two separate power readings, and a 1310/WIC port which is a large area detector capable of measuring all wavelengths in the InGaAs response range (i.e. wavelength independent). This port is similar to the standard loss test set power meter port unless it is used in the FTTX ("Fiber to the X") mode. When in the FTTX mode, the power meter port detects peak power via the use of a variable integration transimpedance amp.

The Triple play Power meter (TPPM) has already been described. In another embodiment, a Triple play Power meter with configurable PLTS ("TPPM/PLTS CF") is used during an installation and for turning on the communication system. The TPPM only taps off a small amount of power without interrupting transmission. The downstream tap enters the 14/15 port, while the upstream tap enters the WIC (1310) port. The power is detected using a variable integration transimpedance amp. The power taps are located outside the PON LTS such that this unit can be used as any of a traditional LTS, a PON LTS, a TPPM, or a PLTS-VI-WIC.

Apparatus and methods of the invention provide the ability to measure several wavelengths simultaneously, for example, 1310 nm, 1490 nm, and 1550 nm. Apparatus and methods of the invention provide the ability to measure power using a wavelength independent power meter. Apparatus and methods of the invention provide the ability to measuring several wavelengths simultaneously without breaking communication of a live fiber interface. The 1310 is the upstream traffic, and in general, requires some initiation from the downstream (1490/1550) traffic to be active. If the communication link is broken, the 1310 does not transmit. Therefore, in order to measure the 1310 power, it is helpful to have the link connected and active. This is accomplished by putting the TPPM inline, by for example the simple expedient of disconnecting a fiber optic connector and installing the TPPM as an inline device.

Test System Configuration and Operation

In one embodiment, the test system includes two compatible bidirectional loss test sets, two optical patch cords, and one optical fiber under test (FUT).

The apparatus performs a bidirectional test, which is some embodiments can be operated as a "one button" test procedure (hereinafter "Bidirectional EZtest").

Moreover the following methods optionally can be used in the test procedure.
1. No wavelength data will be transmitted prior to the test, or after the test is started.
2. The apparatus and method use a standard test sequence that is known to both test apparati before the test is conducted. The standard test procedure is predetermined as a result of analysis of efficient designs.
3. The apparatus and method uses a UART serial link to transmit the data, rather than using Frequency Shift Keying (FSK).

In one embodiment, the Bidirectional EZTest is a one button function to perform the complete characterization of the FUT as needed by the user. In this embodiment, the Bidirectional EZTest includes bidirectional loss testing at any one of several standard or commonly-used wavelengths, and an Optical Return Loss ("ORL") measurement. ORL measurements and methods of conducting the test shave been described in copending U.S. utility patent application Ser. No. 10/847,790.

The full procedure comprises the following steps:
1. A user selects s test configuration
2. Calibration of connections and external losses are performed.
3. A test signal is transmitted and a received signal is detected.
4. Information is encoded and transmitted from the receiver to the transmitter.
5. The transmitter calculates the loss occurring in the element under test.

The above steps will be detailed further in this document. It is useful to remember that steps 2, 3, 4, and 5 can be repeated how ever many times is appropriate as required by the user selected test configuration. The steps can all be repeated independently (for example, in a sequence denoted as 2, 2, 2; . . . 3, 3, 3; . . . ) or as a repeating sequence, for example denoted as 2, 3, 4, 5; 2, 3, 4, 5; . . . ). The choice of sequence that is used depends on the preferred optimization of time, and available tools or user resources.

User Selection of Test Configuration

The user selects from a menu a required number of different wavelengths at which the loss test should be done. The user can define which tests are to be included in the Bidirectional EZtest, (for example Loss, ORL, and any other future tests to be included in the unit), by interacting with a menu displayed on the apparatus, for example as a Graphical User Interface ("GUI").

There is no need to modulate, transmit and demodulate wavelength information between a transmitting unit and a receiving unit because a standard sequence of wavelengths may be employed, in which the wavelength sequence is selected and determined before the test is run. In the proposed instruments and methods, as will be explained in more detail later, it is possible to denote an entire sequence of test wavelengths merely by communicating a single identifier of the standard test sequence between the users of the transmitter and the receiver, which communication is not required to be carried out using the FUT, In operation, in one embodiment, the use of successive known wavelengths involves transmitting each wavelength for a predefined time period, with a predefined delay period between any two predefined wavelengths. The transmission time periods and delay periods can be any convenient time interval, and nothing requires them to be equal in duration, but equal durations are one possible choice.

One option allows the use of an identifier to describe the test sequence. The identifier to test sequence correspondence, for example, could be encoded in a look up table. In one embodiment, the unit initiating the test will transmit the identifier to the other unit through the FUT and the second unit will reply again through the FUT to verify compliance with the chosen test. If the second unit is not compatible with the chosen test a message will be transmitted to identify the types of tests allowed. Compatibility can also be verified by having the each unit transmit identity information to the other unit before sending any other information.

There is also another option that does not use wavelength identifiers, but rather uses a standard predefined, or "default," wavelength sequence. If one specific wavelength is omitted from the sequence entirely, the measured power at that wavelength will be zero, the loss will be infinite, and will be understood to represent one of two conditions: 1. the source is in fact not transmitting at the frequency being measured, or 2. the FUT has zero transmittance at the frequency being measured (i.e., the fiber is completely defective, for example, by being severed). If measurements at other frequencies of interest show that the fiber optic cable is functional, then the correct answer is the first condition rather than the second condition.

For the purposes of this exposition, the term "calibrate" or its derivates will be understood as a measurement, typically done in a laboratory or under highly controlled manufacturing conditions, that is intended to determine a highly precise value for a parameter, such as calibrating a light source as to its operating power, as a function of wavelength or calibrating the sensitivity of a detector when illuminated with electromagnetic radiation at a known wavelength and a known power. For the present discussion, the term "effective transmitted power" will be understood to be a value of power for electromagnetic illumination that is the net value of a calibrated power provided by a calibrated illumination source, less losses that may be present on account of attenuation in a known section of optical fiber (such as a jumper or a patch cord), less any additional losses that may be present on account of misalignment between the core section of the jumper and an inline connector, a misalignment between the core section of the jumper and the active area of a detector, or other such misalignments. In other words, the "effective transmitted power" is the amount of power expected to be observed at the distal end of the jumper when the calibrated source transmits electromagnetic radiation through the jumper.

Referencing of Connections and External Loss

Referencing needs to be performed at each test wavelength in order to account for connector losses when making calculations to obtain the fiber loss. It is also important to perform referencing in both direction in a jumper, patch cord, or other fiber used for connecting test equipment to an object to be tested, so as to identify and account for losses that may occur because of misalignment between the core of one optical fiber and another, or between the core of an optical fiber and a small aperture detector. As will be seen, in the referencing operation, one end of the fiber being referenced is measured with a large area detector, so the misalignment characteristics of the opposite end of the fiber being referenced can be measured.

At a higher level there are two types of referencing that are possible: Loopback referencing (Configurations A and B below), or Side by side referencing (Configurations C, D, and E). The configuration of how referencing will be performed depends on the type of unit that is used, and the type of equipment that is being tested.

In FIGS. 9A-9C there are three types of tool sets (shown as types 9a, 9b, and 9c respectively) that can be used for loss (also known as attenuation) testing.

A unit of type 9a will be called LTS with transceiver (TRX). One TRX is required at each end of the link under test (LUT). The TRX allows measurement of bidirectional loss in one fiber without the need to interrupt the measurement to disconnect and reconnect the two ports.

A unit of type 9b is a simple LTS unit. In this case also one LTS unit is required at each end of the LUT. The LTS allows bidirectional loss measurement, but after the link has been tested in one direction, the users at each end need to disconnect the fiber and connect it to the opposite port in each unit, that is to reconfigure the transmitter as a receiver, and the receiver as a transmitter.

A unit of type 9c is a source and power meter pair. A source is used at one end, and a power meter is used at the opposite end of the LUT. With this configuration if one is to do a bidirectional test the power meter and source need to be connected alternatively at opposite ends. This will be difficult if the opposite ends of the link are at distant locations making this type of configuration least optimal for bidirectional testing.

As will be shown, different types of unit configuration will require different set ups for referencing. Separate power meter and source units will in general be referenced with a side by side approach, whereas both the TRX and LTS units can be referenced with loopback methods.

Selecting the correct type of referencing requires consideration of the type of equipment being tested as well. In some cases it is important to measure contributions to loss introduced by the equipment's connectors, as is the case for patch panel interfaces. In other cases the loss measurement needs to disregard the loss due to connectors, as is typically done in connector type interfaces. In some embodiments, there can be mixed types of interfaces. FIG. 9D is a diagram that illustrates the types of interfaces that can be encountered during measurement, such as a patch panel to patch panel configuration in which patch panels are connected with optical fiber nor shown, a patch panel to connector configuration, and a connector to connector configuration (or a fiber to be tested, which may include one or more serially connected fibers).

Table V shows which type of referencing configuration should be used depending on the available tool and the equipment to be measured. It has been assumed that all jumpers are short (typically <10 m), that the jumper transmission loss is negligible, and that the main loss is caused by the connector loss. Attention has been taken principally to insuring that the correct number of connections is included in the referencing procedure. The configurations 9E, 9F, 9G, 9H and 9I referred to are illustrated in FIGS. 9E through 9I.

TABLE V

| | Number of connections to be referenced | LTS with TRX, or standard LTS testing on the source side | Standard LTS testing on the detector side | Power meter and Source tools |
| --- | --- | --- | --- | --- |
| Patch Panel to Patch panel | 0 | Configuration 9E at both ends | No referencing required | Configuration 9G |
| Patch Panel to Connector | 1 | Configuration 9E at patch panel end and Configuration 9F at connector end | No Referencing at patch panel end and configuration 9E at connector end | Configuration 9H |
| Connector to Connector | 2 | Configuration 9F at both ends | Configuration 9E | Configuration 9I |

In general it is best to test all referencing jumpers in both directions. This procedure insures that the lead-in jumpers are within the acceptable loss limits. Most industry standard jumpers will have a maximum connector loss of 0.5 dB or less. To perform the referencing of a jumper in both directions, one connects the jumper or patchcord between the meter and the source. The source is turned on and the reading of transmitted power in a first direction is recorded. Then the jumper is reversed, e.g., the end of the jumper connected to the source is connected to the meter) and one records the reading of transmitted power. The second reading should be within 0.5 dBm of the first reading. If it is not, it is advisable to clean the connectors and repeat the tests. This referencing is performed on all jumpers prior to using them for testing fiber.

Configuration 9E is a loopback configuration having a single jumper between either the TRX port or source port, and the meter port. Referencing values stored are the effective received power, and the loss caused by the jumper. For the Loss Test, disconnect the jumper from the meter and connect it to the fiber under test with the TRX unit or the LTS when the LTS is used as a source. When the LTS unit is used as a meter, disconnect the jumper from the source and connect it to the fiber under test.

Configuration 9F is a loopback configuration with two jumpers connected to each other by an in-line adapter between either the TRX port or source port and the meter port. An in-line adapter can be thought of as a female-to female connector that allows the connection of two male optical fiber terminal connectors to each other. Referencing values stored are the effective received power, and the loss caused by the connection of the jumper to the unit and the connection at adapter. To operate the unit for testing, remove the jumper at the meter end and connect the remaining jumper with the in-line adapter to the fiber under test.

Configuration 9G is a side by side configuration with one jumper connecting the source to the power meter. Referencing values are stored on the power meter side. They are the effective received power, which is power transmitted minus the loss caused by the jumper connection to the source. To operate the unit for testing, disconnect the power meter and connect the jumper to the fiber under test. Connect the patch panel to the meter with a second unreferenced jumper.

Configuration 9H is a side by side configuration with two jumpers connecting the source to the power meter. Referencing values that are stored on the power meter side include the effective received power, which is power transmitted minus the loss caused by the jumper connection to the source, and the loss at the adapter connecting the second jumper. To operate the unit for testing, disconnect the jumper on the patch panel side from the adapter and connect it to the patch panel, and connect the jumper with the adapter to the connector at the end of the fiber under test.

Configuration 9I is a side by side configuration with three jumpers and two adapters connecting the source to the power meter. Referencing values are stored on the power meter side. They are the effective received power, which is the power transmitted minus the loss caused by the jumper connection to the source, and the loss at the adapters. To operate the unit for testing, disconnect the middle jumper and connect the jumpers with the adapters to the fiber under test.

Transmission of Signal and Detection of Signal, Encoding Transmission of Information and Calculation of Loss in One Embodiment In order to conduct the test, the fiber under test (FUT) is connected to both jumper cables. The Bidirectional EZtest button is activated. The sequence of measurements at the chosen wavelengths begins. As has already been indicated, the two instruments can exchange information using the FUT as a medium for carrying the information. FIGS. 9J and 9K, as well as any of FIGS. 9F-9I, illustrate configurations in which such information exchange can be performed.

At each test wavelength then the loss test sequence proceeds as follows:

FIG. 9J is a diagram showing two test instruments (Unit A and Unit B) sending test signals to each other. In one embodiment, optical power is emitted from unit A first. Unit B receives the optical signal, converts the received power into a digital signal, and transmits a value representing the effective received power along with the referenced jumper loss (for its jumper) back to unit A. FIG. 9K is a diagram showing two test instruments (Unit A and Unit B) sending digital signals such as the effective received power at the receiver unit and the jumper loss of the receiver unit to the unit that transmitted the test signal in FIG. 9J. In another option the jumper loss for each unit is transmitted to the opposite unit before the test. Transmitting such information beforehand will avoid having to send the jumper loss data multiple times when multiple fibers are being tested. The loss for the FUT at this wavelength is calculated at unit A by subtracting the power measured at unit B ($P_{RB}$) from the total available power (or "effective transmitted power"), e.g., the source power less the losses in the jumper cables ($P_A$-$L_A$-$L_B$ in the example shown in FIG. 9K with two jumper losses).

The calculated FUT loss value at each wavelength is stored in unit A, and can optionally also be transmitted through the FUT to the other unit to be stored there as well. The steps given above will be repeated for the next measurement in the sequence. The next measurement could be the same wavelength in the reverse direction or a different wavelength in the sequence or a test performed on a different fiber.

The dynamic range for the communication should be as close as possible to the Loss Test Set ("LTS") dynamic range and preferably no less than 10 dB under the LTS dynamic range. Both units will be able to display and store the complete bidirectional results. The results can be kept automatically by pressing a next function button or the measurement can be taken again by pressing the EZtest button.

For the ORL test, the referencing values must be taken beforehand with a mandrel, for example, a fiber wrapped around a thin shaft to cause loss in the fiber and to eliminate any reflections independently in each unit. The end ORL value will be transmitted to the other unit together with the fiber loss values.

Considerations for Transmission

In some instances, communication with a CMA 5000 LTS will also be desirable for customers that own a CMA 5000 OTDR, which will allow them to run a test with a hand held LTS on one end and the CMA 5000 (or CMA 4500) on the other. Those familiar with test equipment will understand that other possible combinations of two test instruments may be selected to perform the tests described herein.

In this system, the physical communication takes place over the FUT. The laser fire signal is attached to a GPIO on the CPU of the loss test set that can double as a UART transmit, using one of the CPU's built-in UARTs. The modulation detect from the power meter is connected to a pin that doubles as the UART receive pin.

The CMA5000 has a UART designed into the DAU that uses the laser fire as a transmit signal when in communication mode, and the modulation detect from the optics module as the receiver.

In one embodiment, the system communicates at 12.28 kbps, and may be scaled to 6.144 kbps if the optics hardware requires the slower speeds. The format of the data words is 1 start bit, 8 data bits, odd parity, and two stop bits. The above rates and format were determined by the CMA5000 UART. Test instruments with other communication hardware may operate at other bit rates. Full duplex communication is possible, but not necessary. Half duplex communication is preferred since it will avoid issues with parasite reflections. One unit is set up as a master, and the other as a slave. The master initiates and controls all data transfers at the system level.

Because this is an optical setup, the "stop" condition should be inactive, i.e., laser off, so incoming signals will not be excessive—just the opposite of what the industry standard UARTs are set up for (i.e., idle condition is high). The signals, therefore, must be inverted as they leave and enter the UART. The CMA5000 UART can do this internally, since it is programmed into an FPGA. The LTS meters signals are inverted outside the processor.

Power and jumper (or Patch Cord) loss referencing is performed as described above. One of the meters is set up as a master and the other as a slave, which is accomplished manually through the GUI on the LTS meters, for example.

If the units are not referenced, a default value can be programmed into the meter for power out and patch cord loss. The default value can be an average value for these units, or it can be referenced in at the factory for the particular unit.

Master/slave communication operates as follows, for example using the configuration shown in FIG. 9J. Once the meters are connected to the FUT, the master attempts to establish communication with the slave by sending a wake-up string, and waiting a pre-set amount of time for a response. If the response is not detected after the predetermined time, the master tries at least one more time. The slave passively monitors the FUT for the wake-up string. On receiving the string, the slave acknowledges that the link is made by responding to the master, and waits for further instruction from the master. The default condition for a test unit is therefore set to "slave." An operator can override the condition and configure a particular unit as a master.

The test sequence comprises measuring the loss of the fiber in both directions at each one of the desired wavelengths. Since there are a finite number of test wavelength combinations, each combination is assigned a number. For example, Test 1 could be configured to use 1310 nm and 1550 nm illumination, test 2 could be 850 nm and 1300 nm illumination, and so on. The order of wavelengths for each test is predetermined by design for all tests, and is common to all meters of this design. The user of the master determines which test is to be conducted by selecting the wavelengths from a menu. The meter will assigns the test number from that information.

Once communication between the meters is established, the master tells the slave which test is desired. If the slave is capable of completing the tests, it will acknowledge the request. Otherwise it will indicate that it cannot complete the test, such as where the meters with mismatched wavelengths are connected together. If the units are compatible, the master then tells the slave to begin the test. The slave then turns on its light source for a predetermined length of time for the designated wavelength for that part of the test. The power reading is then taken. After a pre-set amount of time, the slave turns off its source. The master detects this condition, and then turns on its light source for a predetermined length of time, so the slave can take its power measurements. Once the measurements are taken, the master transmits its received power data to the slave and the slave transmits its data to the master. The test is then repeated for all wavelengths to be tested. When received power data is received, the receiving unit will use the power and patch cord loss reading to compute loss of the FUT. Alternatively, all the tests in one direction are completed, and then all the tests in the second direction are performed.

Once all of the tests on the current FUT are complete, and the user at the master side has not chosen to repeat the test, the master indicates to the slave that it is finished, and the slave will then inform the user that he or she may transfer to the next fiber. (Transfer to a new fiber may not be always necessary as for example in the case for PON type networks where several links terminate on a single fiber end.) The master also informs its user that it is ready for the next test, and begins transmitting the wake-up signal when the user indicates that the next FUT is connected. When communication is reestablished, the next test sequence, as described above, is repeated.

When all of the tests are completed for all of the FUTs, the master, at the command of the user, will send a special command to the slave to inform its user that all tests are complete. The slave could also be allowed to terminate the tests at the command of its user.

Another possible variant is an improved method in which the received power information, and jumper loss are sent from one unit to the other for each wavelength measured.

The purpose of Loss Readings is to determine the absolute loss of a fiber span. This is different from the OTDR method as the OTDR method is calculated and will not include the front and back connectors. The absolute loss readings are most crucial in the metro application.

There are 3 basic testing scenarios: Patch panel to patch panel, patch panel to connector, and connector to connector. The patch panel to patch panel is the most commonly used testing scenario. All three scenarios will be illustrated. The purpose of this document is to illustrate the proper referencing techniques. It is not the purpose of this document to describe how to use a power meter and light source. It is assumed the user has the basic knowledge of the instruments.

Patch Panel to Patch Panel (Leftmost Configuration of FIG. 9D)

Step One: Test all reference jumpers in both directions. This is to insure that the lead-in jumpers are within the acceptable loss limits. Most industry standard jumpers will have a maximum connector loss of 0.5 dB or less. Connect the patchcord between the meter and the source, for example as shown in FIG. 9L, with Unit A as source an unit B as the meter. Press the Tx button on the source and record the reading (approximately −8 dBm). Now, reverse the jumper between the source and meter, for example as shown in FIG. 9M using Unit B as the source and Unit A as the meter, and record the reading. The reading should be within 0.5 dBm of the first reading. If it is not, clean the connectors and repeat. Perform this on all jumpers prior to using to take a loss reading. For this test, you will need 2 "good" jumpers.

Step Two: Connect the source to the meter using one jumper, for example as in FIG. 9L. Make sure the source and meter are set to the same wavelength. Press the Tx button on the source and press the Reference button on the meter. This will eliminate the loss in the lead-in jumper. As you can see, no connector pairs have been referenced out.

Repeat as required for additional wavelengths.

Step Three: Refer to FIG. 9N, which illustrates a test of a two patch panel configuration. It is understood that the two patch panels are interconnected by cabling not shown. Do NOT disconnect the reference jumper from the Source; rather, remove it from the meter. Connect the source to one end of the system to be tested and the meter to the opposite end of the system to be tested, adding an additional tested reference jumper on the meter end of the system. The most important thing to remember is that the system under test has 2 connector pairs. The referencing step must not eliminate any connector pairs. Therefore, readings will include both connector pairs and the fiber. The loss readings can be taken and stored on the Meter. Repeat as required for additional wavelengths.

Patch Panel to Connector (Center Configuration of FIG. 9D)

Step One: Test all reference jumpers in both directions as described above with regard to FIGS. 9L and 9M.

Step Two: Connect the source to the meter using 2 jumpers and the in-line adapter for example as shown in FIG. 9O, which illustrates the presence of an inline adapter comprising a connector that causes a connector pair (and its associated loss) to appear in the configuration. Make sure the source and meter are set to the same wavelength. Press the Tx button on the source and press the Reference button on the meter. This will eliminate the loss in the lead-in jumpers. This procedure references out one connector pair. Repeat as required for additional wavelengths.

Step Three: FIG. 9P is a diagram illustrating the test set-up for a patch panel having a fiber optic cable and connector attached thereto. Disconnect the test set up at the in-line adapter only. Connect the source to one end of the system to be tested and the meter to the opposite end of the system to be tested. The most important thing to remember is that the system under test has 1 connector pair. The test set-up illustrated has 2 connector pairs, but one has been referenced out. Therefore, loss readings include one connector pair and the fiber. The loss readings can be taken and stored on the Meter. Repeat as required for additional wavelengths.

Connector to Connector (Rightmost Configuration of FIG. 9D)

Step One: Test all reference jumpers in both directions as described above with regard to FIGS. 9L and 9M.

Step Two: As illustrated in FIG. 9Q, connect the source to the meter using 3 jumpers and 2 in-line adapters. Make sure the source and meter are set to the same wavelength. Press the Tx button on the source and press the Reference button on the meter. This will eliminate the loss in the lead-in jumpers and 2 connector pairs. Repeat as required for additional wavelengths.

Step Three: Remove the "middle" jumper in the referencing step. Insert the FUT or jumper under test. Notice that the test set-up has induced 2 connector pairs. Since the connector under test has no connector pairs, the referencing out of 2 connector pairs gives the desired results of the fiber loss only. The loss readings can be taken and stored on the Meter. Repeat as required for additional wavelengths.

Second Embodiment

We now describe another embodiment of the Bidirectional EZTest. The comments made previously about the one button functionality of the Bidirectional EZTest and the overview of the testing procedure apply in this embodiment as well.

User Selection of Test Configuration

The user selects from a menu a required number of different wavelengths at which the loss test should be done. The user can define which tests are to be included in the Bidirectional EZTest, (for example Loss, ORL, and any other tests that are available to be conducted by the unit), by interacting with a menu displayed on the apparatus, for example as a Graphical User Interface ("GUI").

There is no need to modulate, transmit and demodulate wavelength information between a transmitting unit and a receiving unit because a standard sequence of wavelengths may be employed, in which the wavelength sequence is selected and determined before the test is run. In the instruments and methods described herein, it is possible to denote an entire sequence of test wavelengths merely by communicating a single identifier of the standard test sequence between the users of the transmitter and the receiver, which communication is not required to be carried out using the FUT. For example, the communication could be performed using wireless communication methods, such as radio or cell phone. In operation, in one embodiment, the use of successive known wavelengths involves transmitting each wavelength for a predefined time period, with a predefined delay period between any two predefined wavelengths. The transmission time periods and delay periods can be any convenient time interval, and nothing requires them to be equal in duration, but equal durations are one possible choice.

One option allows the use of an identifier to describe the test sequence. The identifier to test sequence correspondence, for example, may be encoded in a look up table, as will be explained in detail below. In one embodiment, the unit initiating the test transmits the identifier to the other unit through the FUT and the second unit replies again through the FUT to verify compliance with the chosen test. If the second unit is not compatible with the chosen test, a message is transmitted to indicate the lack of compatibility, and optionally to identify the types of tests allowed. Compatibility can also be verified by having each unit transmit identity information (such as one or more of a model number a serial number, and a version number of installed software or firmware) to the other unit before sending any other information.

There is also another option that does not use wavelength identifiers, but rather uses a standard predefined, or "default," wavelength sequence. If one specific wavelength is omitted from the sequence entirely, the measured power at that wavelength will be zero, the computed "loss" will be 100%, and the apparent attenuation will be infinite, and will be understood to represent one of two conditions: 1. the source is in fact not transmitting at the frequency being measured, or 2. the FUT has zero transmittance at the frequency being measured (i.e., the fiber is completely defective, for example, by being severed). If measurements at other frequencies of interest show that the fiber optic cable is functional, then the correct answer is the first condition rather than the second condition.

If the units are not referenced, a default value will be programmed into the meter for power out and jumper loss. The default value can be an average value for these units, or it can be calibrated in at the factory for the particular unit.

In one embodiment, a bidirectional test as described herein can be performed using two similar instruments that have compatible source/meter wavelength capabilities. The two instruments use the selected wavelengths for a given test to perform automated two-way Loss and ORL measurements on a fiber link or Fiber Under Test (FUT). The instruments in general are microprocessor-based instruments having a programmable microprocessor, program memory, memory for storing intermediate and final test results and results of computations, software configured when operating on a microprocessor to provide input, output and program control, and other hardware, such as optical sources, optical sensors, input and output hardware such as a keypad and a display or a touchscreen, and as may be useful, optionally an infrared port (which can be bidirectional) and/or wired or wireless communication capability. Other capabilities may optionally be provided in the instrument. The two similar instruments can be, for example, two CMA50 instruments, available from NetTest North America Inc., 6 Rhoads Drive, Utica, N.Y. 13502. In some instances, two different instruments that have similar capabilities can be employed to perform the tests described herein. The following description is provided using as an embodiment of a suitable test instrument one version of the CMA50 instrument having an Auto Bidirectional Test feature, including the mid-level communications strategy, Referencing Wizard, and Basic Test GUI. In the embodiment described, one instrument is configured as a master and one instrument is configured as a slave, although the roles of master and slave can be exchanged during the test.

In explaining various features of operation of the instruments, there are given lists of steps to be performed. The lists of steps provided are useful to explain the process, and also serve as an outline of the functions that software or firmware performs, or prompts a user to perform, when operating on a programmable microprocessor or other programmable computer.

In one embodiment, the Fiber Under Test provides a two-way communications path to provide a synchronized link for controlling the actual test and passing of results for local display and storage.

In one embodiment, the AutoBidirectional Test feature is accessed from the Main Menu. Two selections are available to a user or operator of the apparatus:
EZTest MASTER
EZTest SLAVE Communication between the two units using the FUT is established by using a combination of pulsed light at a frequency of 3 KHz and the internal UART present in each instrument which is configured for a 6 KHz baud rate. The pulsed light is used to by the Master and Slave units to negotiate optimum gain settings for the ensuing UART-generated data frames. The light pulses do not carry any test information or test data. In particular, information such as power levels, reference values and the like are not communicated between the Master and Slave units. Rather, the light pulses are used to insure that both instruments are capable of recognizing the transmission of laser power from both Master and Slave units and establishing internal gain stage settings for the ensuing test.

In this embodiment, there are three phases associated with the methods of operation. They are the Synchronization Phase, the Measurement Phase, and the Data Transfer Phase. A full description of all three phases are defined in the section entitled Technical Details, presented below. In the Synchronization Phase, the two units mutually detect the presence of the other, and agree on a test sequence, including which unit is the Master and which unit is the Slave. In the Measurement Phase, light signals are transmitted via the Fiber Under Test to make test measurements. In the Data Transfer Phase, data relating to raw measured light intensities, and to calculated Loss values and to ORL values are communicated between the units. In this embodiment, reference values are not communicated between the two units.

Test Procedures

Once the users have selected the EZTest mode, both instruments enter the Referencing Wizard mode which guides the users through the establishment of local power reference values. The Referencing Wizard is a software based tool that guides even a novice operator through the necessary referencing steps.

The first step of the Referencing Wizard prompts the users to select the wavelengths to be used for the EZTest measurements.

It is expected that future versions of the Referencing Wizard will also prompt the user to provide instructions as to whether ORL measurements are to be collected at the selected wavelengths in addition to standard Loss measurements.

Once the Reference values have been established for each instrument at all of the specified wavelengths, the Master and the Slave unit initiate the test, for example, by the user depressing the TEST Softkey.

Establishing References

The referencing procedure involves the following steps:
1) Each user presses the MENU key (or otherwise activates a menu).
2) The user of the Master (Unit A) selects the EZTest Master menu item.
3) The user of the Slave (Unit B) selects the EZTest Slave menu item.
4) Both instruments present the Referencing Wizard Screen. The Referencing Wizard steps the user through three possible procedures to establish instrument-specific reference values. Reference values are necessary to provide a Loss value, in both directions for the Fiber Under Test (FUT).
5) The users select one of three Referencing Methods.
   Side by Side
   Loopback
   None
6) The users connect referencing patchcords (also referred to as "jumpers" or "lead-ins") as described in the section entitled Referencing Methods below and as shown in the accompanying Figures and start the Referencing Wizard.

Referencing Methods

The selection of a referencing scheme is driven, in part, by the topology of the ensuing test. In cases where the two Loss Test Sets are in close proximity, the Side by Side referencing technique is more accurate than the Loopback method since the actual EZTest port (PIN diode port) is used on both instruments. In addition, the Reference values for the jumper losses are more accurate since the jumpers (or patchcords) remain connected to the port after the reference is taken.

Side by Side Referencing Mode

FIG. 16 is a diagram showing an embodiment of a referencing configuration referred to herein as the Side by Side Referencing Mode. In FIG. 16, two test instruments (Unit A and Unit B) are connected by two jumpers (jumper JA and jumper JB) which have one end of each respective jumper connected to an EZTest Port of a respective test unit, and a second end connected to the second end of the other jumper, using a standard connector, such as is used in connecting fibers in fiber optic cable.

In the Side by Side Referencing mode, the Wizard prompts the user to connect the two test units via two referencing jumpers, with a bulkhead connector. The Side by Side Referencing mode requires a fiber link between both instruments and therefore allows the units to communicate with each other. Once the connection is made, the user presses the STRT softkey.

The Master (Unit A) then initiates the Side by Side reference process. This process automatically synchronizes the units and establishes communications, and passes information identifying the desired test type to the Slave unit.

Once the test type is acknowledged by the Slave unit, the Master emits CW laser power at the established wavelengths, and Unit B (Slave) automatically establishes reference values for all test wavelengths.

The referencing operation is based on a timed interval scheme, which is illustrated in FIGS. 21 and 22 and described in greater detail hereinbelow. Each unit uses an internal clock to establish fixed length time slots in which each unit performs that unit's part of the Loss measurement function.

The Master emits a CW signal for a defined time interval, at the predetermined wavelengths, and switches to the next wavelength at the demarcation point of each time slot.

The Slave performs an Autorange algorithm and a Loss Measurement calculation within each of the time slots. The Slave unit stores each wavelength-dependent Loss value in an internal memory for future use.

When the Master has completed the CW phase for all wavelengths in the pre-determined test scheme, it then switches roles, behaving as a receiving unit (e.g., performing those function described above for the Slave unit), sets its receiver to the first wavelength in the selection list, and starts the Autorange and Loss Measurement task.

At the same time that the Master has assumed the measurement role, the Slave unit assumes the CW output mode, (e.g., performing those function described above for the Master unit), and emits CW laser power for each wavelength for the duration of each of the necessary number of time slots. The Master establishes reference values and saves them internally.

The Side by Side Reference Wizard controls the storage of these values on the respective instrument for future use. Reference values are not transmitted back to the unit that emitted light, but are retained in the memory of the receiving unit for future use.

In the example shown in FIG. 16, Jumper JA has a loss of 0.1 dB and Jumper JB has a loss of 0.2 dB. Assuming that Unit A has an output level of −8.0 dB at the example wavelength, then Unit B will read −8.3 dB (Power output of Unit A, less the total jumper losses of 0.3 dB). The bulkhead loss is ignored. Unit B then saves the current power level as its reference for the test wavelength in the EZTest to follow.

The roles are then reversed, and Unit B enables its source at the test wavelength. Assuming the Unit B has an output level of −9.0 dB, then Unit A will read −9.3 dB. Unit B then saves the current power level as its reference for the applicable test wavelength.

Example of Two-Way Loss Measurement Using Data Collected by the Side by Side Reference Wizard Using the example shown in FIG. 17, Unit A is connected to the FUT using jumper JA, and Unit B connects to the other end of the FUT using jumper JB.

Test in A->B Direction:

Unit A (Master) turns on its first source wavelength. The Loss value read at Unit B is:

| | |
|---|---|
| −8.0 dB | Nominal Output Power of Unit A |
| −0.1 dB | JA Loss |
| −21.0 dB | FUT Loss |
| −0.2 dB | JB Loss |
| −29.3 dB | |

The received power level at Unit B is −29.3 dB. Unit B subtracts its stored reference value of 8.3 dB and transmits the resultant value to Unit A digitally. The resultant value is −29.3−(−8.3)=−21.0 dB.

In this example, the resultant value represents the actual measured loss of the FUT, and takes into account the jumper jumper losses contributed by both instrument's jumpers.

Unit A and Unit B now both have the A->B test measurement value.

Once all wavelengths have been tested in the A->B direction, the test procedure switches over to testing in the B->A direction.

Test in B->A Direction:

Unit B (Slave) turns on its first source wavelength. The Loss value read at Unit B is:

| | |
|---|---|
| −9.0 dB | Nominal Output Power of Unit B |
| −0.2 dB | JB Loss |
| −21.0 dB | FUT Loss |
| −0.1 dB | JA Loss |
| −30.3 dB | |

The received power level at Unit A is −30.3 dB. Unit A subtracts its stored reference value of −9.3 dB and transmits the ressultant value to Unit B digitally. The resultant value is −30.3−(−9.3)=−21.0 dB.

Unit A and Unit B now both have the A->B test measurement value.

Loopback Referencing

For test procedures where the two Loss Test Sets are remotely located from each other, the only referencing method that is available is Loopback referencing, unless the two Loss Test Sets have been referenced when in proximity to each other and the values stored. In this procedure, a reference value for each instrument is established independently, using the source of each instrument to establish instrument references as well as test jumper loss values. The instruments make use of the EZTest port (PIN diode port) and the Power Meter port (Large area detector) which sacrifices a certain amount of accuracy since the Power Meter port is not used in the actual bi-directional test.

This procedure, when selected, steps the user through the establishment of a test reference value and a test jumper (patch cord) loss value to qualify the patch cord jumper loss value for the test. The reference values and jumper loss values are stored independently on each instrument and are not directly transmitted to other units to produce the Loss measurement in either direction.

The Loopback Referencing mode does not incorporate a fiber link between the Master and Slave units. References are established locally by virtue of each unit emitting CW laser power from the EZTest Port into the Power Meter port. The reference power values are stored in each unit's memory and are not transmitted to the other unit.

When Loopback Referencing is selected, the user is prompted to connect jumper J1 between the Power Meter port and the EZTest port and then presses the STRT softkey. The Power Meter port interfaces to a Large Area detector. The Large Area detector is less sensitive to variations in connection quality since the large surface area helps minimize these variations. The EZTest port interfaces to a PIN diode, which is a Laser source combined with a back detector and is therefore sensitive to variations in connection quality. The EZTest port is the only port which can emit laser signals as well as detect incoming laser source power, and is therefore the only port that can send and receive onto a single fiber.

For best results when using the Loopback Referencing method, the user is prompted to connect two separate jumpers (J1 and J2) during the Setup Wizard procedure. In order to best determine the jumper J2 loss, it is best to select a jumper J1 that has a very low loss, and a jumper J2 that has a higher loss. The purpose of this two step process is to determine the loss of the second jumper (J2) which will be used to connect to the Fiber Under Test.

During the Loopback Referencing procedure, the instrument generates CW signal at all selected wavelengths sequentially and internal algorithms establish local reference values based on the jumper J1 loss for all wavelengths. These results are stored locally.

The Wizard then prompts the user to connect the jumper J2 and repeats the above process for all wavelengths. The instrument software now has enough information to derive the jumper J2 loss, as the jumper J2 will be used to connect to the FUT.

The Wizard derives the loss of the jumper J2 during the Wizard setup process. This value, as well as the unit's current Reference value, is saved in the unit's non-volatile memory and is used during the two-way data transfer process after the FUT has been tested in both directions at each wavelength.

The jumper J2 loss and Reference values that apply to each unit are not directly transmitted to the other unit. The application of Reference and jumper loss values is performed by a two-way communication process outlined in the example that follows.

The loss of the jumper J2 is determined by the Wizard by connecting the jumper J1, establishing a reference, and then connecting the jumper J2 and taking a reference. The difference in reference values is saved internally as the jumper J2 loss.

The following list shows the step by step actions prompted by the Reference Wizard for the Loopback Referencing method.

1) The user connects jumper J1 from the EZTest port to the Power Meter port. Refer to FIG. 18.
2) A power reading is taken at all selected wavelengths and the values are stored internally.
3) The Wizard then prompts the user to remove jumper J1 and install jumper J2. Refer to FIG. 19.
4) A power reading is taken at all selected wavelengths and the values are stored internally. The Loss reading on the display indicates the loss of jumper J2 and is saved in memory.
5) This process is performed in an identical manner on both units, for all test wavelengths.

At this point, the Reference Wizard has stored the following information for each wavelength ($\lambda$):

Unit A:
Unit A—Test Reference value per $\lambda$ (with jumper J2A connected)
Unit A—jumper J2A Loss for each $\lambda$.
Unit B:
Unit B—Test Reference value per $\lambda$ (with jumper J2B connected)
Unit B—jumper J2B Loss for each $\lambda$.

Once both units have stepped through the above process, the user connects each unit to the Test Fiber using the respective jumper J2 via the EZTest port, establishes a Start Fiber number (for the auto-filename feature), and waits for the user to start the EZTest (e.g., by pressing the TEST softkey).

Example of Two-Way Loss Measurement Using Data Collected by the Loopback Reference Wizard Using the example shown in FIG. 20, Unit A is connected to the FUT using jumper J2A, and Unit B connects to the other end of the FUT using jumper J2B.

Test in A->B Direction:

Unit A (Master) enables its first source wavelength. The Loss value read at Unit B is:

| −8.0 dB | Nominal Output Power of Unit A |
| −0.5 dB | J2A Loss (at Unit A) |
| −21.0 dB | FUT Loss |
| −1.2 dB | J2B Loss (at Unit B) |
| −30.7 dB | |

The received power level at Unit B is −30.7 dB. Unit B subtracts the J2B loss value for the jumper J2B attached to Unit B from the unreferenced received power level and transmits this value to Unit A digitally. The resultant value is −30.7−(−1.2)=−29.5 dB.

Unit A receives this digitally transmitted loss value and subtracts out its reference information (e.g., nominal power of −8.0 dB and −0.5 dB for the J2A loss at Unit A=−8.5 dB) and the resultant value is −21.0 dB. This value represents the actual measured loss of the FUT in the A->B direction, and takes into account the jumper losses contributed by the jumpers at both instruments.

Unit A then digitally transmits the value of −21.0 dB, which is eventually displayed on both instrument's LCD screens as the measured A->B loss.

Once all wavelengths have been tested in the A->B direction, the test procedure switches over to testing in the B->A direction.

Test in B->A Direction:

Unit B (Slave) turns on its first source wavelength. The Loss value read at Unit A is:

| −9.0 dB | Nominal Output Power of Unit B |
| −1.2 dB | J2B Loss (at Unit B) |
| −21.0 dB | FUT Loss |
| −0.5 dB | J2A Loss (at Unit A) |
| −31.7 dB | |

The received power level at Unit A is −31.7 dB. Unit A subtracts the J2A loss value from the unreferenced received power level and transmits this value to Unit B digitally. The resultant value is −31.7−(−0.5)=−31.2 dB.

Unit B receives this digitally transmitted loss value and subtracts out its reference (e.g., Nominal power of −9.0 dB and −1.2 dB loss fo r jumper J2B at Unit B=−10.2 dB) and the resultant value is −21.0 dB. This value represents the actual measured loss of the FUT in the B->A direction, and takes into account the jumper losses contributed by both instrument's jumpers.

Unit B then digitally transmits the value of −21.0 dB, which is eventually displayed on both instrument's LCD screens as the measured B->A loss for the tested wavelength. The two Loss values for the two directions of testing are then available at each test instrument for display to the respective users.

Establishing Communications

Synchronization of Units

The unit that has been designated as the Master initiates a pulse train of light at a first frequency, such as 3 KHz, at the longest wavelength in the pre-selected test wavelength list (for example, at 1550 nm). The wavelength used for synchronization is designated as $\lambda$MTx.

The Slave is in a search loop attempting to sense the pulse train and optimize its internal gain settings for optimum signal detection. Once light is detected, the Slave emits a pulse train of light at the same first frequency (3 KHz) at $\lambda$MTx.

If no response is seen from the Slave unit within a pre-specified timeout period, the Master resends the pulse train of light for a maximum of 4 retries (approx 16 seconds). If there is still no response after 4 retries, the Master emits a beep tone and displays a "link failure" message on its LCD panel. The user is prompted to check the test fiber connection and restart the test.

Once the Master detects the Slave unit's return pulse train of light, the Master emits a pulse train of light at $\lambda$MTx at a second frequency, such as 2.5 KHz. This signifies to the Slave unit that the Master is aware that the Slave unit is capable of receiving UART generated data. The Slave, upon recognizing the 2.5 KHz pulse train of light, assumes UART Read Mode and polls the UART for received data. The Master assumes UART Write mode and transmits encoded test information.

Test Identification

Upon establishing a communications link, the Master and Slave unit utilize their internal UARTs for generation and detection of data streams.

The first stage of this element consists of the test identification stage.

The Master unit sends a data packet (the "Test ID" packet) which contains information pertinent to the test cycle. This information includes a Wavelength Count, a Fiber Start number, and an encoded "test type" which is used as a pointer to a list of test wavelengths. The list of test wavelengths is a table programmed into each unit as shipped from the factory. Field upgrades are possible. The software decodes the pointer which identifies the wavelengths and wavelength ordering for the ensuing test. Refer to Tables VI, VII and VIII.

The Slave unit, upon receipt of the Test ID packet, inspects its internal capabilities to ensure that it is equipped with laser sources that match the wavelengths required for the ensuing test.

In the event that Master-requested test wavelengths are not supported by the Slave unit, a message is sent to the Master from the Slave, and both units display a "No Go" message on their local LCD panels.

Test ID Packet Mode:

MASTER (TALK Mode):

The Master unit sends a 5-byte frame that provides all pertinent test information. Refer to Tables VI, VII and VIII. The Master unit then assumes LISTEN mode to catch a "Go/No Go" response from the Slave unit.

Within a predetermined timeout period, the Master expects one of three possible responses from the Slave:

ACK—Slave accepts and can support the requested test

NAK—Slave does not support the requested test

No response—(Link Down)—Post Link down on Master LCD

The Master unit is now in the LISTEN mode.

SLAVE (LISTEN Mode):

The Slave unit inspects its internal Laser Source list to ensure that it is capable of supporting the number and identity of the requested wavelengths.

The Slave then assumes the TALK mode and responds with one of two response characters:

ACK—Slave acknowledges and can support the requested test

NAK—Slave acknowledges request but cannot support the test

The Master and Slave units perform an internal time stamp. This time stamp provides a reference time for the test initiation. The SLAVE assumes the Power Meter measurement role, and the MASTER assumes the CW Laser Power output mode.

Test ID Packet

TABLE VI

| Byte 0 | Byte 1 | Byte 2 | Byte 3 | Byte 4 |
|--------|--------|--------|--------|--------|

Byte 0: Test Type
　　　　0 = Loss
　　　　1 = ORL
　　　　2 = BOTH
Byte 1: Num Lambda (number of wavelengths in test)
　　　　1 = 1
　　　　2 = 2
　　　　3 = 3
　　　　4 = 4
Byte 2: Lambda (wavelength) ID
　　　　See Test ID (Wavelength) Table VII Single mode or Table VIII Multimode
Byte 3/4: Fiber Start Number
　　　　000 to 999
　　　　(Byte 3 is MSB)

Data Preamble and Header

All data packets are preceded by a preamble, which consists of a series of known data values (0x55 and 0xAA, e.g., hexadecimal 55 and hexadecimal AA), which allow the UARTs to synchronize for correct identification of Start and Stop bits. This is a technique that is commonly used for synchronization.

The preamble is followed by a Header which contains a byte count for the packet, a Flag variable, and a 4-byte CRC value for data integrity determination.

The Flag variable is used to indicate, via bit positions, certain attributes of the current message packet. These may include a bit to indicate that the packet requires a response, a bit to specify a particular data structure into which the data is to be stored, and many other possible instructions.

Data Packet

Data packets are used to transmit data that specifies the test type and test attributes, as well as transmit actual test results. Data packets are defined for each of the types of data that are transmitted from one unit to the other.

Test ID (Wavelength) Table—Single mode

TABLE VII

| ID Code | 1310 nm | 1490 nm | 1550 nm | 1625 nm |
|---------|---------|---------|---------|---------|
| 00 | — | — | — | — |
| 01 | X | — | — | — |
| 02 | — | X | — | — |
| 03 | X | X | — | — |
| 04 | — | — | X | — |
| 05 | X | — | X | — |
| 06 | — | X | X | — |
| 07 | X | X | X | — |
| 08 | — | — | — | X |
| 09 | X | — | — | X |
| 10 | — | X | — | X |
| 11 | X | X | — | X |
| 12 | — | — | X | X |
| 13 | X | — | X | X |
| 14 | — | X | X | X |
| 15 | X | X | X | X |

Test ID (Wavelength) Table—Multimode

TABLE VIII

| ID Code | 850 nm | 1300 nm |
|---------|--------|---------|
| 16      | —      | —       |
| 17      | X      | —       |
| 18      | —      | X       |
| 19      | X      | X       |

X indicates an active (requested) wavelength.

Measurement Phase Sequence

If the Slave has acknowledged the Master's test request affirmnatively, the test sequence can begin. Each unit has established a time-stamped "Test Start" time after the Synchronization phase has completed. Each unit now performs certain tasks, within a series of time "windows" of a fixed period, such as 1 second. The time windows are synchronized between the two units. During each 1 second window the Master and Slave perform the following tasks:

A->B Direction Test:

The Master generates CW at applicable test wavelength(s).
The Slave performs Autorange and Loss Measurement at applicable test wavelength(s).

B->A Direction Test:

The Slave generates CW at applicable test wavelength(s).
The Master performs Autorange and Loss Measurement at applicable test wavelength(s).

Test Sequence

The Master unit initiates a Test Sequence loop which comprises the following steps:

MASTER:

I. Current Source Lambda=Lambda 1 and set "n"=Lambda 1.
II. Set Rx Gain as established in Synchronization phase (Establishment of communication link).

Loop:

III. Select Lambda "n" Source and enable in CW mode for 1 second.
IV. After 1 second, turn laser off for 200 ms. And then advance to next wavelength (e.g., increment "n") and enable CW mode for 1 second.
Repeat steps III. and IV. until all wavelengths in the test sequence have been employed.
V. When all Wavelengths have been generated, switch to Power Meter mode and set "n" to 1.
VI. Perform Autorange/PM loss calculation for 1 second.
VII. After 1 second, switch detector calibration to next wavelength (e.g., increment "n") and perform autorange/PM Loss calculation.
VIII. Repeat until Loss measurements at all wavelengths issued from Slave have been measured.
IX. Enter Data Transfer Mode

SLAVE:

The Slave unit has assumed a POWER METER measurement mode at the end of the Test ID stage and enters the following loop:

I. Set Calibrated Meter wavelength to Lambda 1 and set "n"=Lambda 1.
II. Force Gain setting to maximum gain state.

Loop:

III. Set meter calibration factor to Lambda "n".
IV. Perform Autorange/1M loss calculation for 1 second.
V. After 1 second, switch detector calibration to next wavelength (e.g., increment "n") and perform autorange/PM Loss calculation.
Repeat steps III, IV. and V. until all wavelengths in the test sequence have been employed.
VI. When all Wavelengths have been tested, switch to Laser CW mode and enable Lambda 1, setting "n"=1.
VII. After 1 second, advance to next wavelength (e.g., increment "n") and enable CW mode for 1 second.
VIII. Repeat until all wavelengths have been generated.
IX. Enter Data Transfer Mode Transfer of Measurement Results (Data Transfer)

After bidirectional Loss measurement tests for all selected wavelengths have been collected on the Master and Slave units as receiving units, each receiving unit subtracts its respective stored reference for the applicable wavelength and sends the resultant value to the light transmitting unit.

A->B Direction Loss Values:

If the Side by Side Referencing method was used, the value sent from the Slave unit (receiver) to the Master unit (transmitter) represents the A->B Loss value and is displayed on both instruments. No further correction is needed because the receiver in the Side by Side Referencing Method already has as reference values all of the relevant jumper losses and the apparent source power.

If the Loopback Referencing method was used, the Master unit receives the reading from the Slave unit, corrects all readings by subtracting its own established reference values for each wavelength, and sends the corrected measurement values back to the Slave unit, as well as displaying the A->B results on the Master unit. Upon receipt, the Slave unit also displays the same A->B test results.

The units now switch the direction of Data transfer, and the Master unit subtracts its stored reference for the applicable wavelength and sends the resultant Loss value to the Slave unit.

B->A Direction Loss Values:

If the Side by Side Referencing method was used, the value sent from the Master unit to the Slave unit represents the B->A Loss value and is displayed on both instruments.

If the Loopback Referencing method was used, the Slave unit receives partially corrected measured values from the Master unit, corrects all readings by subtracting its own established reference values for each wavelength, and sends the corrected measurement values back to the Master unit, as well as displaying the B->A results on the Slave unit. Upon receipt, the Master unit also displays the same B->A test results.

The measurement results sent from either unit must not be a relative measurement, that is, the measurement values must not have the reference value of the unit performing the measurement (called the Meter or receiving unit) subtracted from the Loss value since it is the source unit's reference value that must eventually be subtracted.

For this reason, when the reference method is of the Loopback type, measurement readings with only the corrections of the receiver unit applied are sent back to the source unit, then the source unit subtracts its reference value for the applicable wavelength, and then the source unit sends the corrected values back to the Meter unit for local Loss results display. Both units now display the same values for the applicable direction.

The measurement results data packet contains the following data for each wavelength tested:

Fiber Number;
SubTest Number (to correlate the actual Lambda from the pre-established list); and Loss measurement (this may be in linear (Watts) format for increased accuracy).

Technical Details

Communication States

The EZTest feature requires the Master and Slave units to communicate in both directions in order to perform automated bi-directional Loss measurements.

The software design incorporates three distinct phases to accomplish this.

Synchronization Phase

Measurement Phase

Data Transfer Phase

The first phase is the Synchronization Phase. This phase is responsible for establishing internal gain settings in order to successfully perform Loss measurements and transfer results for fibers whose length (instrument dynamic range) will vary based on customer test procedures.

The second phase is called the Measurement Phase. This phase is responsible for the actual Loss Measurement task for all selected wavelengths. This phase uses synchronized time-stamped measurement windows. Any direct transfer of current wavelength, Loss values, or reference values established in the Referencing stage is precluded.

The third phase is the Data Transfer phase. This phase is responsible for two-way communication of measurement data and Loss Values. This phase makes use of the instrument's internal UART to perform serial byte data transmission. The UARTs are configured to operate at a 6 KHz baud rate, and all data is transmitted using a 8/16 bit encoding scheme. This scheme forces each data byte (8 bits) to be represented in a 16 bit format, which ensures that the number of data "marks" (logic HI) and data "spaces" (logic LOW) are equally distributed so that internal gain amplifiers baseline noise level is stabilized.

Synchronization Phase

Laser Power Pulse Train

The Synchronization stage involves the use of pulsed (3 KHz and 2.5 KHz) laser power, emitted by both the Master and the Slave units, with the sole purpose of determining each other's presence. The pulsed signal does not carry any information. The pulsed signals are used for the establishment of internal gain settings to ensure that both units can communicate successfully in the ensuing test.

UART Signaling

FIG. 21 is a diagram that illustrates how Synchronization Phase Timing is performed.

Each unit's UART is used to transfer basic test information between the units. This information is in the form of encoded data to define the EZTest parameters.

Direct transmission of wavelengths and reference values are not performed. The Master unit transmits a Test Identifier packet. The Test Identifier packet includes a pointer that points to a table entry that resides in both the Master and Slaves internal memory. The table enables each unit to negotiate the test wavelengths, number of wavelengths and the starting fiber number for the ensuing test.

The Slave then acknowledges the test parameters and at the completion of the Synchronization phase, both units are aware of the test sequence parameters.

Each unit performs an internal time stamp which establishes a time based demarcation for the ensuing Measurement Phase.

The UART data sent during the Synchronization phase is specified in Tables VI, VII and VIII.

Measurement Phase

FIG. 22 is a diagram that illustrates how signals are transmitted and received by each unit during measurements, and represents an example of a Measurement Phase Timing Diagram.

The Measurement Phase is based on a timed interval scheme. Each unit uses its internal clock to establish fixed length time slots in which each unit performs its part of the Loss measurement function.

The Master emits a CW signal, at the predetermined wavelengths, and switches to the next wavelength at the demarcation point of each time slot.

The Slave performs an Autorange algorithm and a Loss Measurement calculation within each of the time slots. The Slave unit stores each wavelength-dependent Loss value in its internal memory for future use.

When the Master has completed its CW phase for all wavelengths in the pre-determined test scheme, it then switches roles, sets its receiver to the first wavelength in the selection list, and starts the Autorange and Loss Measurement task.

At the same time that the Master has assumed the measurement role, the Slave unit assumes the CW output mode, and emits CW laser power for each wavelength for each of the time slots.

Once the Slave has completed its CW output mode for all pre-determined wavelengths, both units switch into UART mode (Data Transfer Phase).

Once the Data transfer phase has taken place, the units prompt both users to connect the next fiber for test, or offer the option of retesting the currently attached fiber.

FIG. 22 provides an example for a 4 wavelength, bi-directional Loss test. At the end of the sequence shown above, the Data transfer phase takes place. Other tests can be performed using other than 4 wavelengths.

At the end of the Data transfer phase, both instruments display test results for both test directions, and the Master (and/or the Slave) instrument saves the readings to the current Loss measurement file.

The users then connect the next fiber and start the entire sequence over again, or prompt the units to repeat the test for the same fiber.

In either case, the Synchronization, Measurement and Data Transfer phases are repeated for each fiber to be tested.

As can be seen from the timing diagram in FIG. 22, no results are displayed on either instrument until two-way measurements have been taken for all wavelengths.

Data Transfer Phase

The Data Transfer Phase uses the internal UARTs in both instruments to perform data transfer between both units.

After bi-directional Loss measurement tests for all selected wavelengths have been collected on the Master and Slave units, the Slave unit sends its partially corrected results (for all wavelengths) to the Master unit. These are the A->B results.

As necessary, the Master unit corrects all readings by subtracting its own established reference values for each wavelength, and sends the corrected measurement values back to the Slave unit, as well as displaying the A->B results on the Master unit. Both instruments are now displaying the A->B test results.

In like manner, the Master sends its partially corrected results (for all wavelengths) to the Slave unit. These are the B->A results.

As necessary, the Slave unit corrects all readings by subtracting its own established reference values for each wavelength, and sends the corrected measurement values back to the Master unit, as well as displaying the B->A results on the Slave unit. Both instruments are now displaying the B->A test results.

The Master (and/or the Slave unit, based on SETUP options) saves the readings into a file, such as the currently opened Loss Data file.

Data Definition

The measurement results, which may be partially corrected results, are sent in a packet of information preceded by a preamble and a header.

The measurement data packet is defined in Table IX as follows:

TABLE IX

| Byte 0 | Byte 1 | Byte 2 | ... | Byte N |
| --- | --- | --- | --- | --- |

Bytes 0–1: Fiber Number (Decimal 0–999)
Byte 2: Lambda Number
 1 = 1
 2 = 2
 3 = 3
 4 = 4
Bytes 3–N: Loss Value, in dBm - unreferenced reading (in some embodiments, the value can require as many as 8 or more bytes)

Testing Packet-Based Communication Protocols

Attention turns now to a brief description of the structure and mode of operation of packet-based communication protocols.—FIG. 10 illustrates schematically a prior art seven layer model (the OSI Basic Reference Model) that is conventionally used for describing the functions and interrelationships of some digital communication systems. The operation of a communication system can be explained in general term using the model before describing the layers of the model in further detail. For example, if a user of a computer wants to visit the United States Patent and Trademark Office (hereinafter "USPTO") web site, and places the command "http://www.uspto.gov/" in the address line of his or her browser (an application layer program), the home page of the requested web site appears in the browser. The process by which this occurrence takes place involves interpretation of the high level command given above in quotes, generation of one or more digital packets, transmission by hardware (such as a modem) of those one or more packets to the web server of the USPTO web site, and receipt and interpretation of the transmitted packets at the targeted web site server. In response to the request for the contents of the desired web page, the USPTO server transmits back one or more packets of data, which are received by the person's computer and manipulated so as to display the requested page. The steps performed from receiving and interpreting the command "http://www.uspto.gov/" through the physical transmission of packets of data at the user's computer are carried out by a successive sequence beginning with general steps at level 7 through more and more detailed and atomistic steps down to level 1. Upon receipt of packets of data at a level 1 device (such as the modem of the user's computer) from the web server, the user's computer manipulates the packets according to the protocols of levels 1 through 7, finally displaying the desired information using a level 7 application such as the browser. The more explicit explanation of the properties and actions of the various layers follows.

The lowest layer is the Physical layer, or level 1. The Physical layer describes the physical properties of the various communications media, such as modems, as well as the electrical properties and interpretation of the exchanged signals, for example, the size of Ethernet coaxial cable, pinouts, electrical characteristics, and modulation and encoding of data bits on carrier signals. This layer ensures bit synchronization and places the binary pattern that it receives into a receive buffer. Once it decodes the bit stream, the physical layer notifies the data link layer (layer 2) that a frame has been received and passes it up. Examples of specifications include V.24, V.35, EIA/TIA-232, EIA/TIA-449, FDDI, 802.3, 802.5, Ethernet, RJ45, NRZ, and NRZI. Some protocols span a number of layers (e.g. NFS, 802.3 etc.). A benefit of the seven layer model is that software can be written in a modular way to deal specifically with one or two layers only. This is often called modular engineering.

Above the Physical layer is the Data Link layer, or level 2. The Data Link layer describes the logical organization of data bits transmitted on a particular medium, for example, for Ethernet, the second layer describes such properties as framing, addressing and the structure of check sums of the packets. Other examples include IEEE 802.2, IEEE 802.3, 802.5—Token Ring, HDLC, Frame Relay, FDDI, ATM, T1, E1, SONET, ISDN, DSL, DOCSIS, and PPP. This layer deals with getting data across a specific medium and individual links by providing one or more data link connections between two network entities. End points are specifically identified, if required by the Network layer Sequencing. The frames are maintained in the correct sequence and there are facilities for flow control and Quality of Service (QoS) parameters such as Throughput, Service Availability and Transit Delay. As will be seen, addresses are defined for level 2 data structures in packet-based digital communication systems and methods. The Data Link layer was split into two sublayers by the 802.11 Committee of the IEEE, which sublayers are the Media Access Control (MAC) sub-layer and the 802.2 Logical Link Control (LLC) sub-layer.

The Data link layer performs error checking using the Frame Check Sequence (FCS) in a trailer and discards the frame if an error is detected. It then looks at the addresses to see if it needs to process the rest of the frame itself or whether to pass it on to another host. The data between the header and the trailer is passed to layer 3. The MAC layer concerns itself with the access control method and determines how use of the physical transmission is controlled. The LLC shields the higher level layers from concerns with the specific LAN implementation.

The third level, also referred to as the Network layer, describes how data links can deliver data between any two nodes in a network by exchanging information in packet format, for example, by describing the addressing and routing structure of the Internet. The third level also handles the ordering and reassembly of packets that may have been broken up to travel across certain physical media. Some protocols in this layer also perform error recovery. The Internet Protocol (IP) is an example of a level 3 protocol, as are IPX and AppleTalk DDP. As will be seen, addresses are defined for level 3 data structures in packet-based digital communication systems and methods, and such addresses are in general different from the level 2 addresses mentioned in the previous paragraph.

The fourth level, also called the Transport layer, defines the quality and nature of the data delivery, including such features as whether and how retransmissions will be used to ensure data delivery, and the ordering and reassembly of packets that may have been broken up to travel across certain media. Some protocols in this layer also perform error recovery. The Transmission Control Protocol (TCP) of the Internet is an example of a fourth level protocol, as are UPD and SPX.

A fifth level, commonly called the Session layer, describes the organization of data sequences larger than the packets handled by lower layers, for example, how request and reply packets are paired in a remote procedure call, and how data conversations are started, controlled and finished. Examples of Session layer protocols include RPC, SQL, NetBIOS names, AppleTalk ASP, and DECnet SCP.

A sixth level, also known as the Presentation layer, provides the syntax of data being transferred. For example, the sixth level explains how floating point numbers can be exchanged between hosts with different math formats. Examples of layer 6 formats and protocols include MIDI, HTML, GIF, TIFF, JPEG, ASCII, and EBCDIC.

The Application layer, or the level seven layer, describes the operation of systems at a level where users interact with the systems and methods, to accomplish tasks that people wish to performs, for example, the implementation of file system operations, such as retrieving information from a desired location on a remote computer, e.g., browsing a web site, downloading or uploading files, or remotely operating an application program to perform a task. Examples of services within the application layer include HTTP, FTP, DNS, SNMP, SMTP gateways, a Web browser, a Network File System (NFS), Telnet and Remote Login (rlogin), X.400, FTAM, database software, and print server software.

An example of how protocol layering works can be observed and understood by considering the feature of encapsulation. In the encapsulation process, each successive layer encapsulates, or treats as data, the information packets generated by the layer above it. Each layer has its own header containing information relevant to its role. This header is passed down to the layer below which in turn adds its own header (encapsulates) until eventually the Physical layer adds the layer 2 information for passage to the next device which understands the layer 2 information and can then strip each of the layers' headers in turn to get at the data in the right location. Each layer within an end station communicates at the same layer within another end station.

FIG. 11 illustrates in schematic form an example of encapsulation of a communication in a prior art digital communication system. The example involves the encapsulation of a command, such as a request to obtain a hypertext page from a web site over the internet from an Internet server, using a modem or other hardware for the actual communication of information between different apparatus. The top level of FIG. 11 schematically shows a Protocol Data Unit (PDU) or frame of data generated at the Application layer (or level 7). The frame has an application header (denoted AH), application data (here denoted "file"), and an application trailer (denoted AT). As the Application PDU is communicated to the next lower level, the Presentation layer, the PDU of the Application layer is encapsulated within the PDU generated by the Presentation layer, as schematically indicated by the Presentation Data portion of the Presentation PDU having an extent at least as long as the Application PDU in its entirety. The Presentation PDU also has a header (denoted PH) and a trailer (denoted PT) which delimit the presentation data portion. As an example, a command issued to construct a message requesting the page in HyperText Transfer Protocol (HTTP) format could be "http://www.uspto.gov," e.g., requesting a copy of the USPTO home page. The exact form of the message is not important for the present explanation. It is sufficient to recognize that the message is handled as described hereinbelow. HTTP is a level seven, or application layer, protocol. HTTP 1.0 is described in RFC 1945.

As the request for the web page moves from one layer to the next lower layer, each layer can encapsulate the previous level's message, comprising a header, data and a trailer. The layer performing the encapsulation treats the message it receives as data, and adds its own header and trailer. The encapsulating layer may rearrange, compress, expand, encrypt, or otherwise change the data, so long as a corresponding layer can recover the original information by applying an inverse operation to the resulting encapsulated message. The header and trailer of a higher level are treated as data by the lower levels. As seen schematically in FIG. 11, the physical layer packet (or multiple packets) that result is viewed as strings of bits that the hardware can transmit and can receive.

To further explain our example, FIG. 11 depicts the encapsulation of the HTTP message to get the web page within a message generated by the Transmission Control Protocol at the Transport layer. TCP provides the connection management and reliable delivery that HTTP requires, but that HTTP does not provide itself. TCP defines a message header format, which can be followed by arbitrary data. The encapsulated message comprises a TCP header attached to the HTTP message. As already indicated, TCP is a level 4 protocol.

Referring again to FIG. 11, the next step in the encapsulation process is performed by the level 3 IP protocol. The TCP protocol does not provide any facilities for actually relaying a message from one machine to another in order to reach its destination, but rather assures that a message that is sent is actual received, and if needed, that replacement copies of packets are sent until the message is completely transferred. The addressing feature is provided by the Internet Protocol (IP), which defines its own message header format. An IP message is constructed by attaching an IP header to the combined TCP/HTTP message, forming an encapsulated message having the form indicated schematically by FIG. 11 at the Network layer as a network datagram.

Although IP can direct messages between machines, it can not actually transmit the message from one machine to the next. The physical transmission function is dependent on the actual communications hardware. For example, we suppose that a dialup modem connection has been specified. Therefore, a first step in transmitting the message will involve the Point-to-Point Protocol (PPP), which is a common protocol used by dial-up modems. The encapsulated message will appear as shown schematically in FIG. 11 at the Physical layer, in which the PPP encapsulation encloses the entire message, and creates one or more packets, rather than simply attaching a header. This is because PPP may modify the message. The receiving modem operating according to PPP reverses these changes, and the message emerges intact. The encapsulating protocol can manipulate the format of the message in any necessary or useful way, including breaking the message into packets of manageable length, provided that the original message is extracted and restored upon receipt.

FIG. 12 is a schematic diagram of a generic frame or packet of bits. In FIG. 12, a sequence of structures is presented, from left to right. A packet can comprise a preamble that provides information about the packet, and may include timing information indicating when the packet is to be considered to have started. The packet can comprise one or more addresses, including a destination address (e.g., to address of an intended recipient) and a source address (e.g., the address of the device that transmits the packet). The packet can comprise a control field that identifies the type of information that is being sent as data. The packet header comprises the preamble, one or more addresses, and control field. The packet further comprises data, and in some embodiments comprises padding. The data is the information that the packet is carrying. When the amount of information is represented by a small number of bits, padding may be added to cause the data length in bits to reach a minimum required value, or to reach a predefined length. In general, padding is provided as bits of zero value. The packet can further comprise a trailer, including a frame check sequence, such as error checking code (for example a cyclic redundancy check or CRC value) and may optionally comprise an end frame delimiter (such as a predefined sequence of bits indicating that the end of the packet or frame has been reached). For packets of defined length, an end frame delimiter may be superfluous, as the receiving hardware can count bits (or groups of 8 bits, e.g., bytes or octets) to determine the end of a packet. Packets can be more detailed than the simple generic packet indicated in FIG. 12.

Turning to FIG. 13, there is shown in schematic form a packet suitable for use in a network that uses Media Access Control (MAC) addressing. FIG. 13 is a diagram that schematically illustrates the format of an Ethernet frame, according to the original IEEE 802.3 standard. FIG. 13 shows a packet comprising a preamble having a length of 7 bytes, a one byte start frame delimiter, a destination MAC address having a length of 6 bytes, a source MAC address having a length of 6 bytes, a Type/Length field having a length of 2 bytes, an options field having an undefined length (e.g., options field may not be present), a data field of sufficient length to reach the minimum packet size of 64 bytes (with padding as may be needed) and not to exceed the maximum packet size of 1518 bytes, and a FCS field of 4 bytes. The total count of bytes in the packet does not include the length of the preamble.

FIG. 14 is a schematic diagram that illustrates the format of an Ethernet frame comprising a VLAN tag, as described in the IEEE 802.3ac standard. The VLAN tag of the frame of FIG. 14 comprises a 2 byte field identified as Length/Type=802.1Q Tag Type (e.g., a tag defined in IEEE standard 802.1Q as having the value hexadecimal 8100 or 0x8100), and a 2-byte field identified as Tag Control Information. In a digital communication system employing VLANs, the maximum Ethernet frame length is 1522 bytes.

VLANs are employed in order to optimize the utilization of a high capacity transmission medium (e.g., cable or fiber). A Local Area Network (LAN) can be thought of as an interconnection of devices that can communicate without requiring a router. In a system employing VLANs, data is sent between devices that are part of a virtual network that has been defined on a physical LAN. A communication intended for members of a VLAN includes a VLAN tag as part of the header. A communication having a VLAN tag is read and acted upon by devices that are members of the VLAN, while other devices that are not members of the VLAN ignore the message, even though the devices may be physically connected to the transmission medium.

IP addresses are represented in a form convenient for humans to read as a quartet of numbers separated by periods in a string, such as 151.207.245.67 (e.g., the IP address of the server that responds to http://www.uspto.gov), where each decimal number falls within the range of 0 to 255 (e.g., within the range that can be represented by an 8-bit unsigned binary number). The same address can equally be represented by a sequence of four 8-bit bytes (e.g., 32 bits), separated by periods, such as 10010111.11001111.11110101.01000011, which is readily utilized by computers. FIG. 15 is a diagram showing in schematic form the structure of an IP message header according to Internet Protocol version 4 (IPv4). The fourth and fifth rows of FIG. 4 represent 32 bit representations that are used to encode an IP source address and an IP destination address, respectively. The other contents of the header are not important for the discussion of the present invention. The interested reader can find information about the IP header according to IPv4 in RFC 791. In addition, a later version of the Internet Protocol, referred to as Internet Protocol version 6 (IPv6) and discussed in RFC 2460, describes an IP header having IP source and destination addresses that comprise 16 bytes, or 128 bits. While a 128-bit address offers a considerable increase in the range of permitted addresses as compared to a 32-bit address, the use of 128-bit addressing as in IPv6 can represent a considerable burden on the testing system, and can reduce the number of communication channels amenable to test at a given time, all other factors being equal.

The encapsulation feature of a layered model of a communication protocol provides benefits, but also can create potential problems. One problem involves the use of a VLAN. When a VLAN is defined, the addressing procedure of level 2 is modified, as may be seen by comparing FIGS. 13 and 14, by the inclusion of a VLAN tag. However, this change is not reflected in the level 3 addressing (for example IP addressing) that becomes encapsulated in the level 2 frame (for example an Ethernet frame). Accordingly, when the VLAN is defined, attempts to change the IP addresses in the test message could result in undesired results.

The apparatus and methods of the invention tests Triple Play (voice, video and data) services. Therefore, it is useful to test the physical layer characteristics of the system to prove it can carry the optical signals to specifications. In addition, it is useful to test the system at layer 2 and above to prove connectivity, addressing, and transport of data services. To this end, the same apparatus additionally includes a $10/100$ Mb/s (or other speed) Ethernet interface with an external electrical or optical connector, and a microprocessor and operating system firmware capable of controlling the Ethernet interface. For example, a network interface controller ("NIC") that handles Ethernet communications is the kind of hardware that is contemplated as a possible Ethernet interface.

Typically each residential or commercial customer subscribes with an Internet Service Provider (ISP) to gain access to the public Internet. One of the functions of the ISP is to provide either a fixed or dynamic IP address to the subscriber. A fixed address is assigned only once, from the ISP's owned address block, and does not change over the duration of the contract. A fixed address has the advantage that it can be added to DNS server tables where it can be used to map 1-to-1 onto a registered domain name such as a website address.

A dynamic address is assigned on demand, on a session by session basis, from an address pool owned by the ISP. A dynamic address is typically less expensive for the subscriber but is not guaranteed to be the same from session to session, and therefore is not suitable for use in DNS lookup tables.

The provider of the PON physical infrastructure to a subscriber premise may also serve as the ISP for one or more subscribers at the premise (for example Verizon). Therefore, it is useful for the installation crews to test data link connectivity, address allocation, transport reliability, and bandwidth capacity, subsequent to the physical connection and turn up of the infrastructure.

Some of the capabilities of the apparatus having the Ethernet interface and control hardware, firmware, and/or software include:

At layer 2 of the OSI seven layer model, the apparatus and methods of the invention provide the ability to test Ethernet transport. This capability includes optional Auto-negotiation to determine speed and duplexity (HDX, FDX) and other parameters of the adjacent network device; determining link availability, in either or both the Upstream and/or Downstream directions; performing and maintaining a count of valid Ethernet frames transmitted and received; performing and maintaining a count of errored Ethernet frames received; performing and maintaining byte count total of frames transmitted and received; providing a traffic generation function; controlling the format and content of transmitted Ethernet frames; and generating errored (invalid) Ethernet frames.

The apparatus and methods of the invention provide the ability to support the ARP protocol, that is, to request the MAC (layer 2) address of a network device, including the capability to initiate an ARP request, and to respond to an ARP request.

At higher layers, the apparatus and methods of the invention provide the ability to test TCP/IP protocols, including such capabilities as accepting an IP address; accepting a netmask; and accept a Gateway address (IP address and netmask).

The apparatus and methods of the invention provide the ability to support the Ping protocol, which can be used to establish layer 3 connectivity to another network device, including the capability to initiate a Ping request; and respond to a Ping request.

The apparatus and methods of the invention provide the ability to support the DHCP protocol, that is to establish connectivity to an Internet Service Provider ("ISP") including the capability to initiate a DHCP request to dynamically obtain an IP address from a DHCP server, and to dynamically determine the address of a DHCP server.

The apparatus and methods of the invention provide the ability to support the HTTP protocol, that is, to establish connectivity to a DNS server through the ISP, including the capability to function as a Web server, and to display full or partial Web pages.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

What is claimed is:

1. A method of measuring attenuation of an optical fiber having a first end and a second end, comprising the steps of:
   connecting with a first jumper a first test apparatus at said first end of said optical fiber, a reference loss value for at least said first jumper being accessible to said first test apparatus;
   connecting with a second jumper a second test apparatus at said second end of said optical fiber, a reference loss value for at least said second jumper being accessible to said second test apparatus;
   performing a synchronization between said first test apparatus and said second test apparatus, said synchronization including sending a digital signal representing a plurality of test wavelengths from said first test apparatus to said second test apparatus;
   transmitting at least one continuous wave test signal from said first test apparatus acting as a transmitter by way of said optical fiber to said second test apparatus acting as a receiver, said at least one continuous wave test signal having a specified wavelength;
   receiving at said second test apparatus said at least one continuous wave test signal;
   measuring an apparent strength of said at least one continuous wave test signal received at said second test apparatus;
   subtracting from said apparent strength of said received at least one continuous wave test signal said reference loss value for at least said second jumper connected to said second test apparatus;
   digitally communicating from said second test apparatus to said first test apparatus a value representing said apparent strength of said received at least one continuous wave test signal less said reference loss value for at least said jumper connected to said second test apparatus;
   as necessary, depending on the referencing method used to measure said reference loss values for said first jumper and said second jumper, subtracting at said first test apparatus a reference loss value for said first jumper to provide a resultant value; and
   as necessary, communicating said resultant value digitally to said second test apparatus;
   whereby, said first test apparatus and said second test apparatus each has available for display an attenuation value for said optical fiber measured from said first end to said second end.

2. The method of measuring attenuation of an optical fiber having a first end and a second end of claim 1, further comprising the additional steps of:
   transmitting at least one continuous wave test signal from said second test apparatus acting as a transmitter by way of said optical fiber to said first test apparatus acting as a receiver, said at least one continuous wave test signal having a specified wavelength;

receiving at said first test apparatus said at least one continuous wave test signal;

measuring an apparent strength of said at least one continuous wave test signal received at said first test apparatus;

subtracting from said apparent strength of said received at least one continuous wave test signal said reference loss value for at least said jumper connected to said first test apparatus;

digitally communicating from said first test apparatus to said second test apparatus a value representing said apparent strength of said received at least one continuous wave test signal less said reference loss value for at least said jumper connected to said first test apparatus;

as necessary, depending on the referencing method used to measure said reference loss values for said first jumper and said second jumper, subtracting at said second test apparatus a reference loss value for said second jumper to provide a resultant value; and as necessary, communicating said resultant value digitally to said first test apparatus;

whereby, said first test apparatus and said second test apparatus each has available for display an attenuation value for said optical fiber measured from said second end to said first end.

3. The method of measuring attenuation of an optical fiber having a first end and a second end of claim 1, wherein said digital signal representing a plurality of test wavelengths is a packet based digital signal that includes at least one of a value representing at least one type of test to be performed, a value representing a number of wavelengths to be used in a test, a value representing the sequence of wavelengths to be used, and a value representing a fiber to be tested.

4. The method of measuring attenuation of an optical fiber having a first end and a second end of claim 1, wherein the step of digitally communicating from said second test apparatus to said first test apparatus a value representing said apparent strength of said received at least one continuous wave test signal less said reference loss value for at least said jumper connected to said second test apparatus comprises transmitting digital information that include a value representing the number of the optical fiber, a value that permits correlation of the wavelength used, and a value representing the loss measurement.

5. The method of measuring attenuation of an optical fiber having a first end and a second end of claim 1, wherein said value representing said apparent strength of said received at least one continuous wave test signal less said reference loss value for at least said jumper connected to said second test apparatus is expressed according to a logarithmic scale.

6. The method of measuring attenuation of an optical fiber having a first end and a second end of claim 1, wherein said value representing said apparent strength of said received at least one continuous wave test signal less said reference loss value for at least said jumper connected to said second test apparatus is expressed according to a linear scale.

7. The method of measuring attenuation of an optical fiber having a first end and a second end of claim 1, wherein the step of measuring an apparent strength of said at least one continuous wave test signal comprises performing an autorange step and a loss measurement calculation.

8. The method of measuring attenuation of an optical fiber having a first end and a second end of claim 1, wherein the optical fiber is a selected one of a continuous optical fiber and an optical fiber having a plurality of optical fiber segments serially connected so as to have a first end and a second end.

9. The method of measuring attenuation of an optical fiber having a first end and a second end of claim 1, wherein said at least one continuous wave test signal having a specified wavelength is defined by a pointer to a look-up table.

10. The method of claim 1 further comprising the step of communicating said resultant value digitally to said second test apparatus.

11. The method of claim 1, wherein said first test apparatus and said second test apparatus each has available for display an attenuation value for said optical fiber measured from said first end to said second end.

12. The method of claim 1, wherein said plurality of test wavelengths is a sequence of test wavelengths.

13. A test apparatus, useful for bidirectional attenuation testing of an optical fiber, said test apparatus when performing said bidirectional attenuation testing being connected to a first end of said optical fiber by way of a calibrated jumper and communicating via said optical fiber with a second similar test apparatus connected to a second end of said optical fiber by way of a calibrated jumper, comprising:

a microprocessor-based programmable computer having input and output capability including a user interface, and having memory for holding programs and data;

a source of at least one continuous wave optical signal having a specified wavelength in electrical communication with and controlled by said microprocessor-based programmable computer, said source configured to be connected to an end of an optical fiber under test;

an optical detector configured to detect radiation at said specified wavelength in electrical communication with and controlled by said microprocessor-based programmable computer, said optical detector configured to be connected to said end of an optical fiber under test;

a bidirectional digital communication port in electrical communication with and controlled by said microprocessor-based programmable computer; and a computer program module recorded on a machine-readable medium, which when operating on said programmable computer to test said optical fiber in a direction from said test apparatus to said second similar test apparatus, controls the steps of:

performing a synchronization between said test apparatus and said second similar test apparatus, said synchronization including sending a digital signal representing a plurality of test wavelengths from said first test apparatus to said second test apparatus;

transmitting at least one continuous wave test signal from said test apparatus acting as a transmitter by way of said optical fiber to said second similar test apparatus acting as a receiver, said at least one continuous wave test signal having a specified wavelength;

receiving at said test apparatus a digital communication from said second similar test apparatus a value representing an apparent strength of said at least one continuous wave test signal less said reference loss value for at least said jumper connected to said second similar test apparatus;

as necessary, depending on the referencing method used to measure said reference loss values for said first jumper and said second jumper, subtracting at said first test apparatus a reference loss value for said first jumper to provide a resultant value; and as necessary, communicating said resultant value digitally to said second similar test apparatus.

14. The test apparatus of claim 13, wherein, when said optical fiber is being tested in a direction from said second similar test apparatus to said test apparatus, said computer program module controls the steps of:

receiving at said test apparatus said at least one continuous wave test signal;

measuring an apparent strength of said at least one continuous wave test signal received at said test apparatus;

subtracting from said apparent strength of said received at least one continuous wave test signal said reference loss value for at least said jumper connected to said test apparatus; and digitally communicating from said test apparatus to said second similar apparatus a value representing said apparent strength of said received at least one continuous wave test signal less said reference loss value for at least said jumper connected to said test apparatus.

15. The test apparatus of claim 13, wherein the step of performing a synchronization between said first test apparatus and said second similar test apparatus comprises:

sending a first digital signal from said test apparatus to said second similar test apparatus, said digital signal representing a handshake signal;

receiving at said test apparatus a return handshake signal from said second similar test apparatus;

sending a second digital signal representing an acknowledgment of said second handshake signal from said test apparatus to said second similar test apparatus;

sending a digital signal representing a desired sequence of test wavelengths from said test apparatus to said second similar test apparatus; and receiving at said test apparatus a digital signal representing an acknowledgement that said second similar test apparatus can perform tests using the desired sequence of test wavelengths.

16. The test apparatus of claim 13, wherein said a bidirectional digital communication port comprises a UART.

17. The test apparatus of claim 13, wherein said at least one continuous wave optical signal having a specified wavelength is defined by a pointer to a look-up table.

18. The test apparatus of claim 13, wherein, during said step of measuring an apparent strength of said at least one continuous wave test signal, said computer program module controls an autorange step and a loss measurement calculation.

19. The test apparatus of claim 13, wherein said plurality of test wavelengths is a sequence of test wavelengths.

* * * * *